US011175413B2

(12) United States Patent
Marshall et al.

(10) Patent No.: US 11,175,413 B2
(45) Date of Patent: Nov. 16, 2021

(54) PHASE-COMPARISON FOR ASSISTING THE DETERMINATION OF POSITION OR TIME

(71) Applicant: u-blox AG, Thalwil (CH)

(72) Inventors: Christopher Marshall, Reigate (GB); Marco Driusso, Cambridge (GB)

(73) Assignee: u-blox AG, Thalwil (CH)

( * ) Notice: Subject to any disclaimer, the term of this patent is extended or adjusted under 35 U.S.C. 154(b) by 253 days.

(21) Appl. No.: 16/093,105

(22) PCT Filed: Apr. 12, 2017

(86) PCT No.: PCT/EP2017/058892
§ 371 (c)(1),
(2) Date: Oct. 11, 2018

(87) PCT Pub. No.: WO2017/178573
PCT Pub. Date: Oct. 19, 2017

(65) Prior Publication Data
US 2020/0333472 A1      Oct. 22, 2020

(30) Foreign Application Priority Data

Apr. 12, 2016   (WO) ................. PCT/EP2016/058032

(51) Int. Cl.
*G01S 19/43*   (2010.01)
*G01S 5/10*    (2006.01)

(52) U.S. Cl.
CPC ............. *G01S 19/43* (2013.01); *G01S 5/10* (2013.01)

(58) Field of Classification Search
CPC .......... G01S 19/43; G01S 19/44; G01S 19/04; G01S 5/10; G01S 5/02; G01C 15/00
(Continued)

(56) References Cited

U.S. PATENT DOCUMENTS 3,967,277 A    6/1976  Hastings et al.
5,596,330 A *  1/1997  Yokev ................. G01S 1/026
                                                    342/387
(Continued)

FOREIGN PATENT DOCUMENTS

DE   42 23 194 C1     8/1993
JP   2006/0133142 A   5/2006

OTHER PUBLICATIONS

International Search Report and Written Opinion dated Oct. 26, 2017, in International Application No. PCT/EP2017/058892 (21 pgs.).
(Continued)

*Primary Examiner* — Harry K Liu
(74) *Attorney, Agent, or Firm* — Finnegan, Henderson, Farabow, Garrett & Dunner LLP

(57) ABSTRACT

Two wireless signals are received from transmitters in different locations transmitting at different frequencies. Phase information from the two signals is gathered for use in positioning and/or timing calculations. Calibration information is preferably also gathered to support the calculations. Information about the rate of change of phase may be gathered for use in velocity and timing drift calculations. The transmitters may be stations in a wireless infrastructure network. Assistance information may be gathered and shared to support the interception of uplink/downlink signals from the stations. Also disclosed are User Equipment, Base Stations, remote supporting services, elliptic hyperbolic relationships for interpreting and using the spatial variation of the phase difference, and positioning engines for use in the system.

10 Claims, 26 Drawing Sheets

(58) Field of Classification Search
USPC .................................................. 342/357.26
See application file for complete search history.

(56) References Cited

U.S. PATENT DOCUMENTS

| | | | | |
|---|---|---|---|---|
| 9,482,741 | B1* | 11/2016 | Min | G01S 5/0242 |
| 9,621,255 | B1* | 4/2017 | Chu | H04B 7/18515 |
| 9,699,611 | B1* | 7/2017 | Zhang | G01S 5/021 |
| 2002/0033769 | A1* | 3/2002 | Bass | G01S 5/12 |
| | | | | 342/418 |
| 2007/0285308 | A1* | 12/2007 | Bauregger | G01S 19/10 |
| | | | | 342/357.27 |
| 2010/0173592 | A1* | 7/2010 | Yamazaki | H04B 7/0615 |
| | | | | 455/69 |
| 2010/0208649 | A1* | 8/2010 | Chang | G01S 5/0257 |
| | | | | 370/328 |
| 2013/0242952 | A1* | 9/2013 | Chu | H04L 25/03343 |
| | | | | 370/336 |
| 2015/0006073 | A1 | 1/2015 | Moshfeghi | |
| 2017/0034804 | A1* | 2/2017 | Jiang | H04W 72/044 |

OTHER PUBLICATIONS

Partial International Search Report dated Sep. 1, 2017, in International Application No. PCT/EP2017/058892 (17 pgs.).

\* cited by examiner

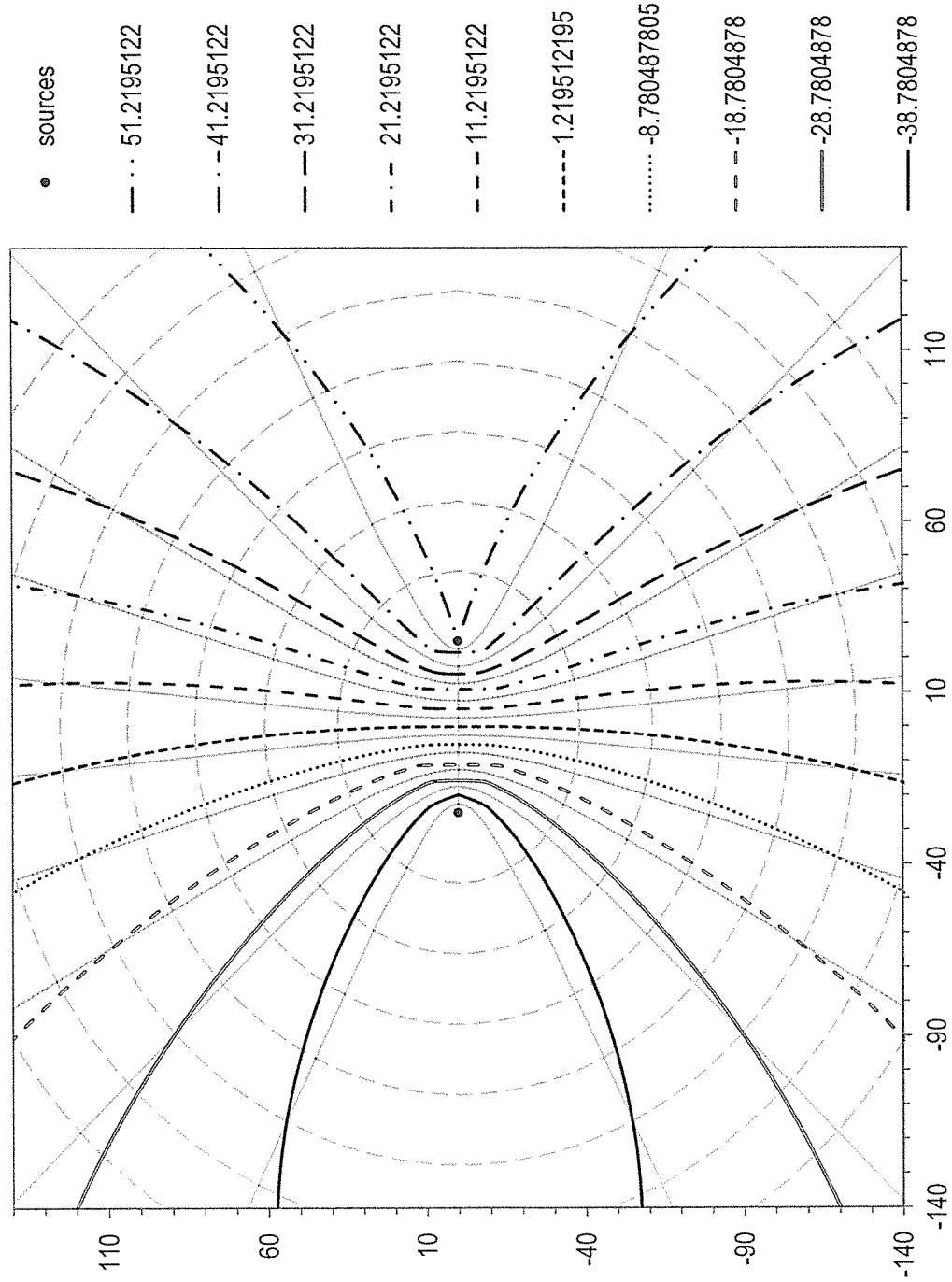

PHASE-COMPARISON FOR ASSISTING THE DETERMINATION OF POSITION OR TIME

CLAIM FOR PRIORITY

This application is a U.S. national phase entry under 35 U.S.C. § 371 from PCT International Application No. PCT/EP2017/058892, filed Apr. 12, 2017, which claims the benefit of priority of PCT International Application No. PCT/EP2016/058032, filed Apr. 12, 2016, both of which this application claims priority and both of which are incorporated herein by reference.

FIELD OF THE INVENTION

This invention relates to positioning and/or timing determination. It relates in particular to the determination of position and/or time by observing the phase of wireless signals from different sources (transmitters). In some embodiments it relates to the determination of a velocity and/or timing drift by observing a rate of change of phase.

BACKGROUND OF THE INVENTION

Positioning using Global Navigation Satellite Systems (GNSS), such as the Global Positioning System (GPS) is known. Traditionally, the calculation of position relies on trilateration, based on the time of arrival of signals from multiple different satellites. In the case of GPS, for example, satellite signals in the L1 band are conventionally used for the trilateration. The GPS satellites also transmit a signal in the L2 band, which is traditionally used for measuring ionospheric error.

With all positioning systems, it would be desirable to increase the positioning accuracy. GNSS systems in particular also suffer from the problem of availability: there are many environments in which it is difficult or impossible to receive satellite signals reliably—especially in dense urban environments or indoors. It would therefore be desirable to develop a positioning system that offers greater coverage and can calculate position in circumstances when traditional GNSS positioning would fail or become unreliable.

SUMMARY OF THE INVENTION

The invention is defined by the claims.

According to a first aspect, there is provided a method for assisting a determination of a position and/or a time, the method comprising:
receiving at a receiver a first wireless signal transmitted at a first frequency by a first transmitter;
receiving at the receiver a second wireless signal transmitted at a second frequency by a second transmitter, wherein the second transmitter is at a different location from the first transmitter and the second frequency is different from the first frequency;
obtaining phase information, said obtaining comprising at least one of:
measuring at the receiver a first phase of the received first wireless signal and a second phase of the received second wireless signal, wherein the phase information comprises the measured first phase and the measured second phase, and
determining at the receiver a phase-comparison between the first phase and the second phase, wherein the phase information comprises the phase-comparison; and
using the phase information and at least one associated measurement reference time to assist in the calculation of the position and/or the time.

Using phase-relationships between sources at different frequencies to assist in positioning (or timing determination) can have several potential benefits. It can allow more sources to be used for positioning purposes, because additional measurements can be created from pairs of sources which are transmitted at respective pairs of different frequencies. This can increase both coverage and precision. The positioning precision can also be improved by using signals that extend over a wider frequency range, because the phase-comparison provides a greater effective measurement bandwidth. The approach can also be applied to terrestrial signals of opportunity, such as cellular base station signals. In this context, it can allow signals from multiple different network operators, whose networks use different bandwidth in the frequency spectrum, to be combined. This further increases the availability of measurements. Particular benefits can be derived by combining measurements from terrestrial and satellite signals. As well as further increasing the number of sources of information, this also increases their geometric diversity. It can improve vertical positioning, in particular, as the vertical range of angle (and dilution of precision) is much greater than when using GNSS signals alone or terrestrial signals of opportunity alone. Using signals from airborne transmitters can also bring similar benefits. Use of the phase of the difference signal between these sources particularly increases the detailed positional information that can be gleaned from their use.

The position to be determined may be a position of the receiver, or a position of one of the first and second transmitters. The time to be determined may be a time at one of the transmitters or a time at the receiver.

The position may be the position of the receiver when it received the first radio signal and the second radio signal. That is, the first and second radio signals may have been received at substantially the same position and time. Accordingly, the time whose determination is assisted may be the time at which the first radio signal and the second radio signal were received. However, it is possible that the receiver changes position between receiving the first radio signal and receiving the second radio signal. This need not affect the ability to calculate the position—in particular, if a displacement vector describing the change of position is known. Similarly, it is possible that the receiver receives the first radio signal and second radio signal at different times. Again, this need not affect the ability to calculate the position—in particular, if the time difference is known.

The phase comparison is preferably a phase difference between the first phase and the second phase.

The method preferably comprises associating at least one measurement reference time with the obtained phase information, optionally using a local clock of the receiver, followed by using the phase information and the at least one associated measurement reference time to assist in the calculation of the position and/or the time.

The phase of each signal evolves constantly over time. And, because the signals are at different frequencies, the phase difference between them evolves constantly as well. The measurement reference time associated with the phase information is the time at which the phase information is valid—that is, the time at which each signal has the given phase or the time at which the signals have the given phase difference between them.

When the phase information comprises the measured first phase and the measured second phase, the at least one measurement reference time may comprise one or both of: a first time at which the first wireless signal was received; and a second time at which the second wireless signal was received. In other words, the first phase and second phase may conveniently be referenced to the time or times at which they were measured. However, this is not essential. In general, the measurement reference time can be chosen arbitrarily, by projecting the evolution of the measured phases forwards or backwards in time to the chosen measurement reference time. For instance, although the first phase and second phase may be measured at different times, they may be referenced to a common measurement reference time. This might be the time at which one of them was measured. If the other signal was measured at a different time, its measured phase can be projected forwards or backwards in time so that both phases are referenced to the same time.

Likewise, when the phase information comprises the phase-comparison, the associated measurement reference time may be the time at which the phase comparison was measured, but this is not essential. In some cases, for example, the phase comparison may be calculated as a phase difference between phases that were measured at different times. To do this, one or both of the phases can be projected forwards or backwards in time so that they both refer to a common time reference. Once referenced to this common time reference, the phases may be compared by subtracting one phase from the other. The measurement reference time may then be the common time reference. However, even this is not essential—the phase comparison may again be projected forwards or backwards in time, to some other desired measurement reference time.

By using the measurement reference time in the calculation of position/time, the method can avoid the need for simultaneous measurements. For example, it can avoid the need for simultaneous measurement of the first phase and second phase.

In general, the first time and second time may be the same or different times. The measurement reference time may be the same as one or both of the first time and second time, or it may be a different time.

The measurement reference time, first time, and/or second time may be determined by a local clock of the receiver. At least one of the measurement reference time, the first time, and the second time may be recorded and associated with the phase information.

In some embodiments, the phase information may consist solely of the measured first phase and the measured second phase. In some other embodiments, the phase information may consist solely of the phase-comparison.

In some embodiments, the time at the receiver is known and the method uses the phase-comparison to assist in determining the position of the receiver.

In other embodiments, the position of the receiver is known and the method uses the phase-comparison to assist in determining the time at the receiver.

In still other embodiments, both the position and the time are unknown, and the method uses the phase-comparison to assist in a joint determination of the position and time.

Alternatively, in some embodiments, the position and/or time to be determined are the position of and/or time at one of the transmitters. Again, one of the position and time may be known and the other may be desired to be determined.

The step of using the phase-information may be performed at the receiver. Alternatively, this step may be performed remotely from the receiver, at another device. For example, it may be performed by a server computer, which communicates with the receiver over a communications network. Optionally, if the position of the receiver is calculated remotely from the receiver, it may be transmitted to the receiver over the communications network.

When the goal is to calculate the position or time of the receiver, the method may further comprise obtaining additional information, comprising one or more of: the location of the first transmitter; the location of the second transmitter; or the location of the first transmitter relative to the second transmitter.

If the goal is to calculate the position or time of one of the transmitters, then the location of the other transmitter and the location of the receiver may be known and the method may further comprise obtaining these locations, or relative locations.

Each phase or phase-comparison may include an ambiguity and the step of using the phase-information to assist in the calculation of the position of the receiver and/or the time at the receiver may comprise resolving the ambiguity.

The ambiguity may comprise an integer number of cycles (periods) at a difference-frequency, which is the difference between the first frequency and the second frequency.

Using the phase information and the associated measurement reference time to assist in the calculation of the position and/or the time first equation may comprise constructing a first equation that defines a locus in position and time.

The first equation may relate the phase information to: a first distance between the receiver and the first transmitter; a second distance between the receiver and the second transmitter; and the at least one measurement reference time.

The first equation can include: at least one first term in which the first distance is scaled by the first frequency; and at least one second term in which the second distance is scaled by the second frequency.

In some embodiments, scaling by frequency may be achieved by inversely scaling by wavelength, because the two signals are assumed to travel at the same speed—namely, the speed of light, c.

The first equation can optionally be decomposed into: a third term in which a difference between the first and second distances is scaled by a sum of the first and second frequencies; and a fourth term in which a sum of the first and second distances is scaled by a difference between the first and second frequencies.

The locus in position and time may comprise a locus of positions at which the receiver could be located at the measurement reference time, or a locus of positions at which one of the transmitters could be located at the measurement reference time, depending on which device is the target whose position it is desired to calculate.

The locus of positions may comprise a set of curves. The curves may be non-intersecting. The set of curves may be a combination of a set of ellipses and a set of hyperbolae. In particular, each curve in the set of curves may pass through the intersections of a set of ellipses with a set of hyperbolae. The ellipses are parameterised by the sum of the first and second distances. The hyperbolae are parameterised by the difference between the first and second distances. The different curves in the set of curves arise from an ambiguity in the phase-comparison, because it is not known which cycle (period) of the first radio signal has been compared with which cycle (period) of the second radio signal. This causes an integer-ambiguity in the phase-comparison. Each curve in the set of curves is a locus of positions representing one possible resolution of this integer-ambiguity. That is, if the ambiguity were to be resolved, the locus of positions would reduce to a single curve.

The method optionally further comprises: constructing one or more further equations each of which defines a further locus in position and time; and solving the first equation and the one or more further equations together, to calculate the position and/or time.

This can comprise solving a set of simultaneous equations.

The first equation preferably relates the phase-information to the measurement reference time.

Each of the one or more further equations may include respective time terms.

Optionally, the first frequency differs from the second frequency by at least 2 kHz, preferably at least 100 kHz, more preferably at least 1 MHz, most preferably at least 10 MHz.

The method may further comprise: obtaining Doppler information, said obtaining comprising determining at the receiver a rate of change of a phase difference between the first phase and the second phase, wherein the Doppler information comprises the determined rate of change of the phase difference; and using the obtained Doppler information to assist in the calculation of a velocity or timing drift.

According to another aspect there is provided a method for assisting a determination of a velocity and/or timing drift, the method comprising:

receiving at a receiver at a first time a first wireless signal transmitted at a first frequency by a first transmitter;

receiving at the receiver at a second time a second wireless signal transmitted at a second frequency by a second transmitter, wherein the second transmitter is at a different location from the first transmitter and the second frequency is different from the first frequency;

obtaining Doppler information, said obtaining comprising determining at the receiver a rate of change of a phase difference between the first phase and the second phase, wherein the Doppler information comprises the determined rate of change; and using the Doppler information to assist in the calculation of the velocity or timing drift.

The velocity to be determined may be a velocity of the receiver or a velocity of the first transmitter or second transmitter. Likewise, the timing drift to be determined may be a timing drift at the receiver or a timing drift at one of the transmitters. The timing drift in question may be a drift of a local oscillator of the relevant transmitter or receiver.

The Doppler information preferably consists solely of the rate of change of the phase difference.

Determining the rate of change of the phase difference may comprise determining at the receiver a first rate of change of the first phase and a second rate of change of the second phase, and forming the difference between these two rates of change. Alternatively, determining the rate of change of the phase difference may comprise firstly obtaining the phase difference and then determining the rate of change of the phase difference. In the latter case, the phase difference may be obtained in at least two ways, as described elsewhere in this document: (i) by determining the first phase and the second phase and subtracting one from the other to obtain the phase difference; or (ii) by mixing the first signal with the second signal and obtaining the phase difference from the mixed signal, without necessarily obtaining the first phase or the second phase separately.

The rate of change of a phase (or of a phase difference) may be determined, in some embodiments, by a quadrature detector.

The method may further comprise obtaining calibration information, wherein the step of using the phase information to assist in the calculation of the position and/or the time employs the calibration information, wherein the calibration information comprises at least one of: a phase of the first wireless signal and a phase of the second wireless signal, at respective associated calibration reference times; and a phase-offset between the first wireless signal and the second wireless signal, at an associated calibration reference time.

The calibration reference time has a similar meaning, in the context of the calibration information, to the measurement reference time described above in relation to the phase information. It represents the time at which each signal has the given phase, or the time at which the pair of signals has the given phase-offset. Note that the respective calibration reference times may be the same time, but this is not essential. The calibration reference time may be the same as or different from the measurement reference time.

In each case, the calibration information may also explicitly include the calibration reference time (or respective calibration reference times). However, in some embodiments, there may be a universal, implicit calibration reference time (such as GPS time zero) that is agreed between all devices, such that the inclusion of an explicit calibration reference time in the calibration information may not be essential.

The phase of the first wireless signal and/or the phase of the second wireless signal may be defined with reference to a known calibration location. In some embodiments, the phase of the first wireless signal may be defined with reference to a first known calibration location and the phase of the second wireless signal may be defined with reference to a second known calibration location. By way of example, the first known calibration location may be the location of the first transmitter and/or the second known calibration location may be the location of the second transmitter.

Similarly, the phase-offset may be defined with reference to a known calibration location.

Note that although each phase or phase-offset is preferably defined relative to a (specified or implicit) calibration reference time, this does not necessarily mean that they are measured at that calibration reference time. Likewise, although defined with reference to a known calibration location (or known calibration locations) they are not necessarily measured at the calibration location (or calibration locations).

The calibration information may be generated by measurements at a time different from the first time and the second time.

In other words, the present method can avoid the need for the generation of calibration information simultaneously with the measurement of the phase information. This is made possible because the phase information from the measurement receiver can be related to the calibration information by the time information (measurement reference time and calibration reference time) associated with each of them.

These measurements may be made by the receiver (that is, the same receiver that measures or determines the phase information as summarised above). The measurements may be made at a known calibration location at a known calibration time.

The calibration information may be obtained from a database of known phase-offsets between pairs of transmitters.

The method may further comprise: measuring a first time-of-arrival of the first wireless signal; measuring a second time-of-arrival of the second wireless signal; and using the measured first and second times of arrival to assist in the calculation of the position and/or time.

In this way, the use of phase information can be combined with the well-known use of time of arrival (or time difference of arrival) of signals for positioning and/or timing calculations.

Each time-of-arrival preferably represents the time of arrival of a particular portion of the modulation of the wireless signal, such as the time of arrival of a synchronisation symbol.

According to a second aspect, there is provided a method of producing calibration information, the method comprising:
  receiving at a receiver a first wireless signal transmitted at a first frequency by a first transmitter;
  receiving at the receiver a second wireless signal transmitted at a second frequency by a second transmitter, wherein the second transmitter is at a different location from the first transmitter and the second frequency is different from the first frequency,
  wherein each signal is received at a known calibration location at a known calibration time,
  the method further comprising producing calibration information, said producing comprising at least one of:
    measuring a first phase of the received first wireless signal and a second phase of the received second wireless signal, wherein the calibration information comprises the measured first phase and the measured second phase, and
    determining a phase-offset between the first wireless signal and the second wireless signal, wherein the calibration information comprises the determined phase-offset,
  the calibration information further comprising at least one associated calibration reference time.

As explained above, the at least one calibration reference time represents the time at which each signal has the given phase (first phase and second phase) or the time at which the pair of signals has the given phase-offset. The calibration reference time may be the same as the (or each) known calibration time, or it may be a different time.

The receiver used to produce the calibration information may be the same receiver as the receiver used to produce the phase information for assisting the determination of the position or time, as summarised above, or it may be a different receiver.

Each calibration location may be determined using another positioning system—for example, using a satellite positioning system. Each calibration time may be determined similarly.

The calibration information may further comprise the known calibration location(s).

The method may further comprise supplying the calibration information to another device (that is, a device different from the receiver that was used to generate the calibration information).

This calibration information can be used in a method as summarised previously above, for assisting a determination of a position and/or time. That is, the first and second aspects can be combined advantageously.

According to a third aspect, related to the second aspect, there is provided a method of providing calibration information for assisting a determination of a position and/or a time, the method comprising:
  maintaining a database of calibration information, the calibration information comprising at least one of:
    phases, at respective calibration reference times, of wireless signals transmitted by respective transmitters, and
    phase-offsets, at respective calibration reference times, between pairs of wireless signals transmitted by respective pairs of transmitters;
  receiving a request for calibration information, wherein the request identifies two or more transmitters whose calibration information is required;
  searching the database to find the calibration information of the identified transmitters; and
  providing the found calibration information in response to the request,
  wherein at least some of the transmitters in the database are at different locations from one another and the wireless signals that they transmit are at different frequencies.

The calibration reference times may be the same or different. In some embodiments, the calibration information comprises the calibration reference time or times. In other embodiments, the calibration reference time may be implicit.

The calibration information may be produced by a plurality of receivers, and the step of maintaining the database may comprise obtaining the calibration information from the receivers.

The calibration information is preferably produced by a method according to the second aspect, summarised above.

According to a fourth aspect, there is provided a method of transmitting a wireless signal for assisting a determination of a position and/or a time, the method comprising:
  receiving a request to transmit the wireless signal, the request including a predetermined phase and a predefined time; and
  transmitting the wireless signal with that predetermined phase at the predefined time.

The predefined time may be defined in absolute terms or may be defined relative to some other reference—for example, it may be defined relative to the start of a particular frame.

Preferably, the method comprises receiving requests to transmit two wireless signals at different frequencies from transmitters at different locations, the requests including respective predetermined phases for each wireless signal and predefined times, the method further comprising transmitting the two wireless signals with the respective predetermined phases at the respective predefined times.

The method of any one of the preceding claims, wherein one of the following conditions is met: each of the first transmitter and the second transmitter is a terrestrial transmitter; each of the first transmitter and the second transmitter is an orbiting satellite transmitter or airborne transmitter; or the first transmitter is a terrestrial transmitter and the second transmitter is an orbiting satellite transmitter or airborne transmitter.

Airborne transmitters, such as transmitters on balloons, drones, or other aerial vehicles may be useful for calculating a vertical position. A mixture of terrestrial transmitters together with at least one of: airborne transmitters and space-vehicle transmitters, may offer improved accuracy for vertical positioning.

Optionally, the first transmitter is part of a first wireless network and the second transmitter is part of a second, different wireless network.

In some embodiments, one or both of the wireless networks may be a wireless communications network. For example, the first transmitter may be a base station in a first terrestrial mobile communications network, operated by a first network operator and the second transmitter may be a base station in a second terrestrial mobile communications network, operated by a second network operator. In other embodiments, one or both of the wireless network may be a broadcast network. For satellite systems, the first transmitter may be, for example, a GPS satellite and the second transmitter may be a GLONASS satellite.

Optionally, the first communications network and the second communications network are not synchronised. That is, their clocks and timekeeping may drift apart. They may or may not ultimately have a common reference, such as UTC, GPS time, or some other network time service. In the event that they do have a common reference, they may also correspondingly have some internal timing alignment mechanism within each network that keeps the clocks accurate to the common reference to a greater or lesser extent. But although there may nominally be a certain relationship between the frequencies and timekeeping of the networks, the actual frequency and timing measured over any particular period may vary. This is true of the frequency and timing of each network and also true of the timing- and frequency-difference between the networks. From the point of view of the receiver, the frequency and timing of each signal and transmitter and network can be handled separately (relative to some common reference, or relative to each other), in order to measure and use not only the nominal offset between them, but also the actual drift between them.

Optionally, the first wireless signal and the second wireless signal are transmitted by the first transmitter and the second transmitter, respectively, at different times.

This will often be the case for transmitters in different wireless networks, for example. In particular, the transmitters of two different terrestrial mobile communications networks (such as two different LTE networks) will typically transmit synchronisation symbols at different times.

At least one of the wireless signals may be an uplink signal transmitted by a first user equipment, hereinafter UE, in a wireless infrastructure network.

Another of the wireless signals may be a downlink signal transmitted by a base station, hereinafter BS, in a wireless infrastructure network.

For example, the first wireless signal may be an uplink signal and the second wireless signal may be a downlink signal. The first transmitter and the second transmitter (UE and BS, respectively) may be part of the same wireless infrastructure network or different wireless infrastructure networks. If they are part of the same wireless infrastructure network, then the BS may be the BS currently serving the UE. That is, the uplink signal may be transmitted from the UE to the BS.

The method may further comprise obtaining first assistance information for assisting the receiver to receive at least one of: the uplink signal and the downlink signal.

Obtaining assistance information to assist the receiver to receive the downlink signal may be particularly desirable if the BS is not part of the same network as the receiver. If the receiver and the BS are part of the same network, then the receiver may be able to receive the downlink signal without assistance.

The method preferably comprises using the assistance information to intercept the uplink/downlink signal.

The method may further comprise obtaining second assistance information for assisting the calculation of the position and/or time.

At least one of the first assistance information and the second assistance information may comprise at least one of: a phase of the uplink or downlink signal at a reference time, as reported by the first UE; and a phase of the uplink or downlink signal at a reference time, as reported by one or more base stations.

Also provided is a computer program comprising computer program code adapted to control an electronic device to perform all the steps of any one of the preceding claims if said program is run on a processor of said electronic device.

The computer program may be embodied on a non-transitory computer readable medium.

According to the first aspect there is also provided an electronic device operable to assist in a determination of a position and/or a time, the electronic device comprising:
 a receiver, adapted to:
  receive a first wireless signal transmitted at a first frequency by a first transmitter; and
  receive a second wireless signal transmitted at a second frequency by a second transmitter, wherein the second transmitter is at a different location from the first transmitter and the second frequency is different from the first frequency; and
 at least one processor, adapted to:
  obtain phase information, by at least one of:
   measuring at the receiver a first phase of the received first wireless signal and a second phase of the received second wireless signal, wherein the phase information comprises the measured first phase and the measured second phase, and
   determining at the receiver a phase-comparison between the first phase and the second phase, wherein the phase information comprises the phase-comparison; and
  use the phase information and at least one associated measurement reference time to assist in the calculation of the position and/or the time.

The processor is preferably further adapted to: obtain calibration information; and employ the calibration information when using the phase-comparison to assist in the calculation of the position and/or the time, wherein the processor is adapted to obtain the calibration information from a database and the database is stored: at least in part in a memory of the electronic device; and/or at least in part remotely from the electronic device, and wherein the calibration information comprises at least one of: a phase of the first wireless signal and a phase of the second wireless signal, at respective associated calibration reference times; and a phase-offset between the first wireless signal and the second wireless signal, at an associated calibration reference time.

According to the second aspect there is also provided an electronic device operable to produce calibration information for determining position and/or time, the electronic device comprising:
 a receiver, adapted to:
  receive a first wireless signal transmitted at a first frequency by a first transmitter;
  receive a second wireless signal transmitted at a second frequency by a second transmitter, wherein the second transmitter is at a different location from the first transmitter and the second frequency is different from the first frequency, wherein each signal is received at a known calibration location at a known calibration time and a processor, adapted to produce calibration information by at least one of:

measuring a first phase of the received first wireless signal and a second phase of the received second wireless signal, wherein the calibration information comprises the measured first phase and the measured second phase, and determining a phase-offset between the first wireless signal and the second wireless signal, wherein the calibration information comprises the determined phase-offset, the calibration information further comprising at least one associated calibration reference time.

According to still another aspect there is provided an electronic device operable to assist in a determination of a velocity and/or timing drift, the electronic device comprising:

a receiver, adapted to:

receive at a first time a first wireless signal transmitted at a first frequency by a first transmitter; and receive at a second time a second wireless signal transmitted at a second frequency by a second transmitter, wherein the second transmitter is at a different location from the first transmitter and the second frequency is different from the first frequency; and at least one processor, adapted:

to obtain Doppler information, by determining at the receiver a rate of change of a phase difference between the first phase and the second phase, wherein the Doppler information comprises the determined rate of change; and to use the Doppler information to assist in the calculation of the velocity or timing drift.

According to a fifth aspect there is provided a UE for use in a wireless infrastructure network, said UE comprising:

a transmitter, configured to transmit an uplink signal to a BS serving the first UE in the wireless infrastructure network;

a receiver, configured to receive a downlink signal from the BS; and a processor, configured to share assistance information with another device, for use in calculating a position and/or a time, the assistance information comprising at least one or any combination of two or more of:

a phase of the uplink signal at a reference time;

a phase of the downlink signal at a reference time; and a phase offset between the uplink signal and the downlink signal at a reference time.

The phase of the downlink signal is preferably determined at the UE.

The uplink signal is preferably at a different frequency to the downlink signal.

The UE may be configured to transmit the uplink signal in response to a received request.

The request may be received by the UE from the BS or another station in the wireless infrastructure network. The request may originate from a base station, another station in the wireless infrastructure network, or from a server computer providing a supporting service for positioning or timing measurements.

The received request preferably includes a predetermined phase and the transmitter is preferably configured to transmit the uplink signal to the BS with that predetermined phase at a predefined time.

The predefined time may be defined in absolute terms or may be defined relative to some other reference—for example, it may be defined relative to the start of a particular frame.

According to a sixth aspect, related to the fourth aspect, there is provided a UE for use in a wireless infrastructure network, said UE comprising:

a transmitter, configured to transmit an uplink signal to a BS serving the first UE in the wireless infrastructure network;

a receiver, configured to receive a downlink signal from the BS; and a processor, configured to receive a request to transmit the uplink signal and to control the transmitter to transmit the uplink signal in response to the received request, wherein the received request includes a predetermined phase and a predefined time, and the transmitter is configured to transmit the uplink signal to the BS with that predetermined phase at the predefined time.

The request may be received by the UE from one of the sources mentioned above.

The predetermined phase may be defined relative to an external reference—for example, relative to GNSS time or relative to a phase of the downlink signal at a predefined time.

The uplink signal is preferably at a different frequency to the downlink signal.

According to a seventh aspect, related to the fifth aspect, there is provided a BS for use in a wireless infrastructure network, said BS comprising:

a transmitter, configured to transmit a downlink signal;

a receiver, configured to receive an uplink signal from a UE; and a processor, configured to share assistance information with another device, for use in calculating a position and/or a time, the assistance information comprising at least one or any combination of two or more of:

a phase of the uplink signal at a reference time;

a phase of the downlink signal at a reference time; and a phase offset between the uplink signal and the downlink signal at a reference time.

The phase of the uplink signal is preferably determined at the BS.

The uplink signal is preferably at a different frequency to the downlink signal.

According to an eighth aspect, related to the sixth aspect, there is provided a BS for use in a wireless infrastructure network, said BS comprising:

a transmitter, configured to transmit a downlink signal;

a receiver, configured to receive an uplink signal from a UE; and a processor, configured to receive a request to transmit the downlink signal and to control the transmitter to transmit the downlink signal in response to the received request, wherein the received request includes a predetermined phase and a predefined time and the transmitter is configured to transmit the downlink signal to the UE with that predetermined phase at the predefined time.

The uplink signal is preferably at a different frequency to the downlink signal.

The request is preferably received from a source external to the BS, such as a server computer providing a supporting service for positioning and/or timing measurements.

The predetermined phase may be defined relative to an external reference—for example, relative to GNSS time.

The uplink signal is preferably at a different frequency to the downlink signal.

According to a ninth aspect, related to the fifth and seventh aspects, there is provided a server computer for providing a supporting service for positioning or timing measurements, the server computer comprising:
  a memory; and
  a processor, configured to:
    obtain assistance information relating to at least one of:
      uplink signals to be transmitted by a plurality of first UEs and downlink signals to be transmitted by a plurality of BSs; and
    provide the assistance information to a plurality of wireless communication devices,
  wherein the assistance information comprises at least one of:
    a phase of at least one of the signals at a reference time; and
    a phase offset between at least one of the signals and another signal at a reference time,
  wherein at least two of the signals are to be transmitted at different frequencies.

The wireless communication devices may wish to intercept the uplink/downlink signals, to use them to assist in positioning or timing calculations. The assistance information may assist the wireless communication devices to intercept the uplink/downlink signals and/or may assist the wireless communication devices to perform the positioning or timing calculations.

Optionally, the assistance information also includes the reference time. Alternatively or in addition, the reference time may comprise a universal reference, such as GNSS time.

The processor, to obtain the assistance information, may be configured to request the assistance information from the plurality of first UEs and/or the plurality of BSs.

According to a tenth aspect, related to the sixth and eighth aspects, there is provided a server computer for providing a supporting service for positioning or timing measurements, the server computer comprising:
  a memory; and
  a processor, configured to:
    generate an instruction for at least one station in a wireless infrastructure network, to cause the station to transmit a wireless signal; and
    send the instruction to the station,
  wherein the instruction comprises a request to transmit the signal; a predefined time at which the signal is to be transmitted; and a predetermined phase with which the signal is to be transmitted.

The at least one station may comprise a BS, in which case the wireless signal comprises a downlink signal. Alternatively or in addition, the at least one station may comprise a UE, in which case the wireless signal comprises an uplink signal.

Optionally, the processor may generate instructions for a plurality of stations and send the instructions to those stations. The stations may be BSs or UEs or a mixture of both. Preferably, at least two of the wireless signals to be transmitted by the stations are transmitted at different frequencies.

The predetermined phase may be defined relative to an external reference—for example, relative to GNSS time.

Note that the server computer of the ninth aspect may be combined with the server computer of the tenth aspect to perform both functions.

According to an eleventh aspect, there is provided a server computer for centralised positioning and/or timing calculations, comprising:
  a memory; and
  a processor, configured to:
    obtain phase information, comprising at least one of:
      a first phase of a first wireless signal measured by a receiver and a second phase of a second wireless signal measured by the receiver, wherein the phase information comprises the measured first phase and the measured second phase, and
      a phase-comparison determined by the receiver between the first phase and the second phase, wherein the phase information comprises the phase-comparison; and
    use the phase information and at least one associated measurement reference time to calculate a position and/or a time.

The phase information is defined relative to the associated measurement reference time. Optionally, the measurement reference time may be included in the phase information. In some embodiments, the measurement reference time may be an external reference—for example, GNSS time.

The processor may be further configured to obtain calibration information, the calibration information comprising at least one of: phases, at respective associated calibration reference times, of the first and second wireless signals, and a phase-offset, at an associated calibration reference time, between the first and second wireless signals, and to use the calibration information together with the phase information and the at least one associated measurement reference time to calculate the position and/or the time.

The processor may be further configured to obtain Doppler information and to use the obtained Doppler information to calculate a velocity or timing drift, wherein the Doppler information comprises a rate of change determined at the receiver of a phase difference between the first phase and the second phase.

Note that the server computer of the ninth and/or tenth aspects may be combined with the server computer of the eleventh aspect to perform both functions.

BRIEF DESCRIPTION OF THE DRAWINGS

The invention will now be described by way of example with reference to the accompanying drawings, in which.

Figure 1:
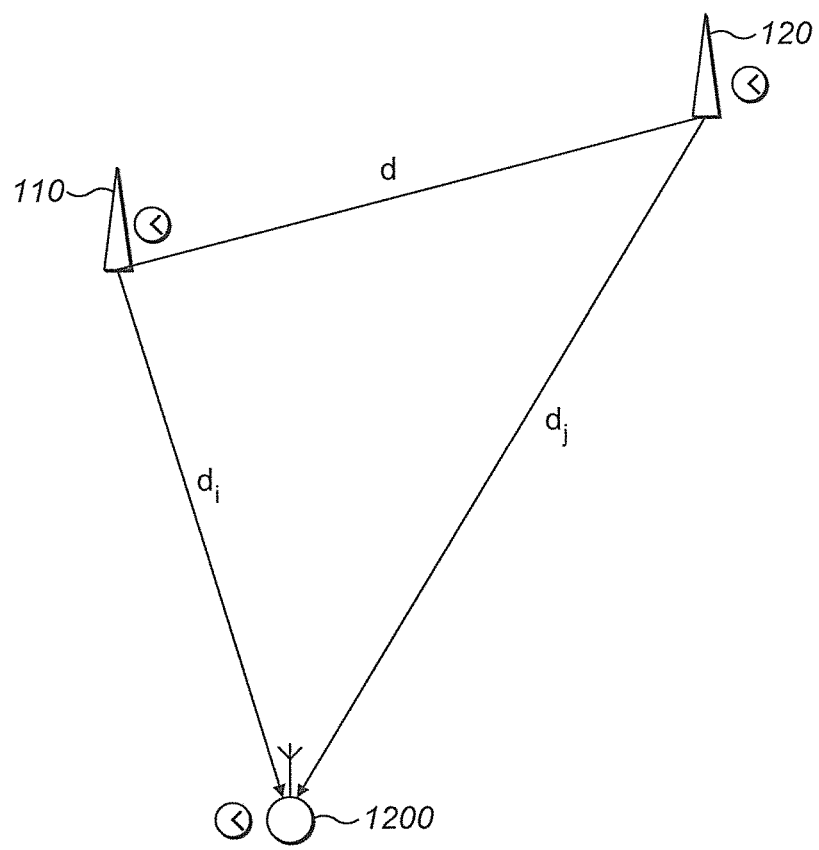
FIG. 1 shows a receiver receiving two radio signals from respective transmitters transmitting at different frequencies.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Positioning systems normally work by measuring the time difference between similar signals received on the same frequency from multiple sources. For high precision applications it is also possible to receive multiple frequencies transmitted from a single source, and to exploit the different phase measured on the two frequencies to estimate the distance from the source. According to embodiments of the present invention, positioning (or timing determination) can use signals from different sources that are transmitting on different frequencies, by measuring and using the changing phase between them to estimate the position. Also disclosed is a method of using the rate of change of phase (or phase difference) to calculate velocity or timing drift.

The situation for two sources at different frequencies is shown in FIG. 1 and can be expressed by the equations below. A first radio signal is transmitted by a first transmitter 110 and a second radio signal is transmitted by a second transmitter 120. These signals are received at a receiver of an electronic device 1200. The first transmitter will be referred to as source i and the second transmitter will be referred to as source j. With the two sources i and j emitting signals at different frequencies $f_i$ and $f_j$, at distances $d_i$ and $d_j$ the observed phase of the first radio signal is $\theta_{it_0}(t, d_i) = \alpha_{it_0} + 2\pi f_i(t-t_0-d_i/c)$, with a similar equation using the subscript j for the second radio signal. Here, $\alpha_{it_0}$ indicates the value of the phase of the signal emitted by transmitter i at the reference time $t_0$.

The total phase-difference observed at the receiver is:

$$\Delta\theta_{ijt_0}(t, d_i, d_j) = (\alpha_{it_0} - \alpha_{jt_0}) + 2\pi f_i\left(t - t_0 - \frac{d_i}{c}\right) - 2\pi f_j\left(t - t_0 - \frac{d_j}{c}\right) \quad (1)$$

$$\Delta\theta_{ijt_0}(t, d_i, d_j) = (\alpha_{it_0} - \alpha_{jt_0}) + 2\pi \Delta f_{ij}(t - t_0) - 2\pi\left(\frac{f_i d_i - f_j d_j}{c}\right)$$

$$\Delta\theta_{ijt_0}(t, d_i, d_j) = \Delta\alpha_{ijt_0} + 2\pi \Delta f_{ij}(t - t_0) - \Delta\varphi_{ij}(d_i, d_j)$$

Here, the $\Delta$ symbol is purely a descriptive precursor denoting an observed difference term, to assist in understanding. Equation (1) expresses the total observed phase-difference as the sum of three separate terms:

$2\pi\Delta f_{ij}(t-t_0)=2\pi(f_i-f_j)(t-t_0)$ is the continuing phase rotation due to the observed frequency offset between the two sources. It is worth noticing that the term in equation (1) defining the continuing phase rotation is referred to the reference time $t_0$.

$$\Delta\varphi_{ij}(d_i, d_j) = 2\pi\left(\frac{f_i d_i - f_j d_j}{c}\right)$$

is the phase difference (or phase shift) due to the position of the electronic device 1200 compared with the two transmitters 110, 120. For the sake of brevity in the notation, the dependence on ($d_i$, $d_j$) will be suppressed in the rest of the description.

$\Delta\alpha_{ijt_0}=\alpha_{it_0}-\alpha_{jt_0}$ is the phase-offset between the two sources at the reference time t=$t_0$. The phase offset $\Delta\alpha_{ijt_0}$ can be derived from equation (1) during a calibration procedure when, for example, distances $d_i$, $d_j$, and time are known, $\Delta\alpha_{ijt_0}=\Delta\theta_{ijt_0}(t,d_i,d_j)-2\pi\Delta f_{ij}(t-t_0)+\Delta\varphi_{ij}(d_i,d_j)$ For the sake of clarity, the dependence on $t_0$ will be suppressed in the notation. Initially, for simplicity, it will be assumed (without loss of generality) that $t_0$=0.

Equation (1) then provides the basis for both position and time estimates. Specifically, the phase difference (or phase shift) $\Delta\varphi_{ij}$ due to position is related to the distances $d_i$, $d_j$ by the relationship:

$$\frac{\Delta\varphi_{ij}}{2\pi} = \left(\frac{f_i d_i - f_j d_j}{c}\right) \quad (2)$$

Equivalently, this can be expressed in terms of the wavelengths of the signals from the two sources, using $\lambda=c/f$:

$$\frac{\Delta\varphi_{ij}}{2\pi} = \frac{d_i}{\lambda_i} - \frac{d_j}{\lambda_j} \quad (3)$$

This phase-difference (or phase shift), in Equations (2) and (3), between the signals received from the two sources then provides the basis for a position estimate. Equations (2) and (3) can be considered as a kind of "differential pseudorange" or "phase pseudorange", compared with the pseudoranges used in conventional positioning systems.

As discussed in greater detail later below, the phase-shift $\Delta\varphi_{ij}$, in Equations (2) and (3), (that is, the phase-difference due to position) can be derived either directly from the observed phase difference of Equation (1) for the combination of the two received signals or it can be derived by subtracting the separate phase measurements $\theta_i(t)$, $\theta_j(t)$ on each received signal. In order to derive the value of $\Delta\varphi_{ij}$, the continuing phase rotation can be either predicted at each time instant and then removed from equation (1) or simply filtered out by appropriate low-pass filters.

Once the phase-shift $\Delta\varphi_{ij}$ has been estimated then the difference term in Equation (1) representing the continuing phase rotation $2\pi\Delta f_{ij} t$ can be used to provide the basis for a detailed time estimate.

The sources may be:
- satellites (such as within and between GNSS systems, and within or between bands);
- terrestrial transmitters (such as cellular base stations, broadcast transmitters, which are commonly placed at different frequencies to avoid mutual interference—within or between bands, and within or between systems); or
- a mix of the two: some satellite and some terrestrial transmitters.

Calibration

Knowledge is needed, in some form, of the phase-offset $\Delta\alpha_{ij}$, between the sources, as well of as the difference in frequency between them. Each source on its own will not usually be aware of or responsible for the phase and time offset compared with another source. Therefore, this is preferably obtained by some additional device, third party, or the receiver itself.

The phase reference may be obtained by measurement of the phase-offset either:
- concurrently at a known location by a reference device;
- previously at a known location and time by a reference device;
- previously at a known location and time by the receiver itself In tracking applications, the receiver can readily calibrate the phase-offset from previous observations.

The usefulness of the measurement and of the calibration will depend on the stability of any relative drift between the two sources. Some transmitter systems are designed such that the relative drift between transmitters is closely controlled, even though the absolute frequency may drift significantly. If the position information is desired occasionally, after long intervals, then well-controlled sources or a recent calibration should preferably be used.

Note that, according to some embodiments, it is not necessary to know the phase of each source, $\alpha_i, \alpha_j$—although if this is available it may be a means of establishing the phase-offset $\Delta\alpha_{ij}$. It is the phase-offset $\Delta\alpha_{ij}$ that is desired to be calibrated.

Ambiguities

Measurement of phase means that there is an ambiguity of a multiple of $2\pi$ in the measurement. This will have an effect on the calculation of the phase difference (or phase shift) $\Delta\varphi_{ij}$ due to position, as shown below:

$$\Delta\varphi_{ij} = 2\pi\left(\frac{f_i d_i - f_j d_j}{c}\right) + 2\pi N_{ij} \text{ or}$$

$$\frac{\Delta\phi_{ij}}{2\pi} = \frac{d_i}{\lambda_i} - \frac{d_j}{\lambda_j} + N_{ij}$$

Note that the integer $N_{ij}$ can be either positive or negative considering that it corresponds to the difference relationship between the two signals—not necessarily corresponding to the measurement of each of the signal at each of the carrier frequencies. This can be important, because the frequency difference, although substantive, may typically be a (small) fraction of the signal frequency, and hence the ambiguity interval for the "difference signal" will be much larger than each of the signal frequencies. It should therefore be easier to resolve by other means. The ambiguity and its effect depend on the geometry. This will be discussed in greater detail later, below.

In some implementations, the phase-difference may be measured by first measuring each signal phase, and then performing a subtraction to find the difference. When each signal is measured there will be ambiguities in each signal phase measurement:

$$\frac{\varphi_i}{2\pi} = \frac{d_i}{\lambda_i} + N_i$$

$$\frac{\varphi_j}{2\pi} = \frac{d_j}{\lambda_j} + N_j$$

From these we can similarly form a difference phase metric $$\frac{\Delta\varphi_{ij}}{2\pi} = \frac{d_i}{\lambda_i} - \frac{d_j}{\lambda_j} + (N_i - N_j)$$

This is analogous to the integer ambiguity $N_{ij}$ discussed above for direct differencing, with $N_{ij}=N_i-N_j$. However, the integers in this case arise in each of the individual carrier phase measurements, rather than as a result of the difference measurement.

The Phase-Difference for Multiple Different Signal Sources

This section will discuss the behaviour and properties of the phase-difference $\Delta\varphi_{ij}$ (or phase shift) due to position derived between two signals received on different frequencies, coming from different sources. It should be remembered that the value of the derived phase-difference $\Delta\varphi_{ij}$ (or phase shift) as well as all plots shown in the following depend on the value of the phase-offset between the two sources referred to the reference time $t_0$.

We can understand further how the phase-difference behaves by expressing the frequencies and distance differences for the two sources;

$$f_i = (\Delta f_{ij} + f_j)$$

$$d_i = (\Delta d_{ij} + d_j)$$

Next, we expand the equations in the form of these differences:

$$\frac{\Delta\varphi_{ij}}{2\pi} c = (\Delta f_{ij} + f_j)(\Delta d_{ij} + d_j) - f_j d_j + N_{ij} \cdot c$$

$$\frac{\Delta\varphi_{ij}}{2\pi} c = f_j \Delta d_{ij} + \Delta f_{ij} d_j + \Delta f_{ij} \Delta d_{ij} + N_{ij} \cdot c$$

This leads to the equation:

$$\frac{\Delta\varphi_{ij}}{2\pi} = \frac{\Delta d_{ij}}{\lambda_j} + \frac{d_j}{\lambda_{\Delta ij}} + \frac{\Delta d_{ij}}{\lambda_{\Delta ij}} + N_{ij}$$

where $\lambda_{\Delta ij} = c/\Delta f_{ij}$, a wavelength corresponding to the frequency difference. For convenience and without loss of generality, we can assume $\Delta f_{ij} > 0$, because the choice of the ordering of i and j is arbitrary.

We now consider some illustrative cases to explore the behaviour before turning to the general geometrical case.

Firstly, we note that the phase-difference increases as the distance from both the sources increases. Ultimately, when the difference between the distances to the two sources is small (for example when the receiver is far from the two sources), the metric reduces to:

$$\frac{\Delta\phi_{ij}}{2\pi} \approx \frac{d_i}{\lambda_{\Delta ij}} + N_{ij}$$

This can be simplified as:

$$\frac{\Delta\varphi_{ij}}{2\pi} = \frac{f_i - f_j}{c} d_i + N_{ij}$$

Figure 2:
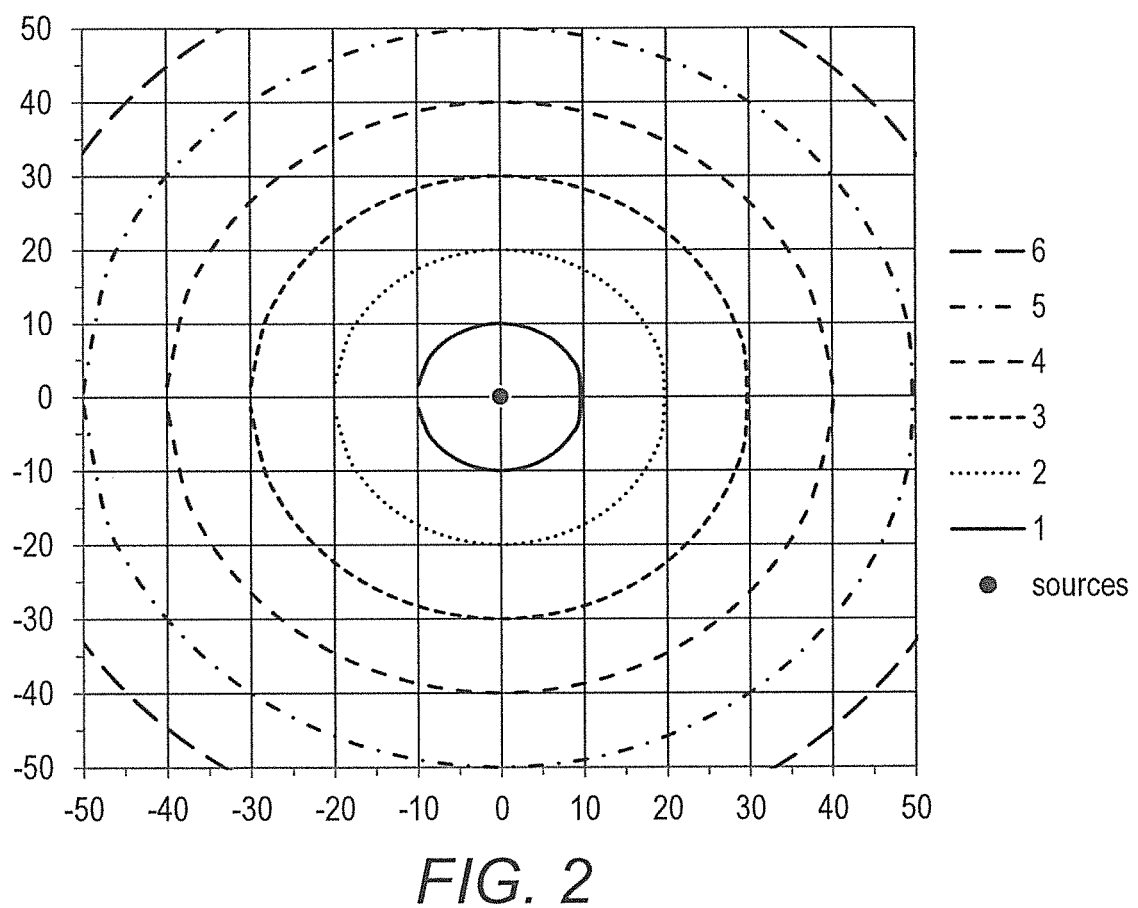
FIG. 2 shows the locus of constant phase-difference for signals from two transmitters close to one another.

This situation approximates to a single source transmitting on two frequencies. In this case, there is an ambiguity corresponding to the wavelength of the frequency difference, $\lambda_{\Delta ij} = c/\Delta f_{ij}$. Curves of constant phase-difference are then simply circles (in two dimensions, or spheres in three dimensions), propagating outwards, as illustrated in FIG. 2. For a given measured phase-difference at a certain time, these curves represent a locus of positions at which the receiver could be located at that time. The phase-difference simply increases according to the distance from the two signal sources. In this example, the sources are physically separated by 0.1% of a wavelength. The different curves are for successive $2\pi$ ambiguities $N_{ij}$, so the plot gives a feel for the resolution and accuracy, as well as the ambiguity of the measurement.

Secondly, the phase-difference also increases as the difference between the distances to the sources increases.

Considering a different example case, in which the fractional difference between the frequencies is small compared with the fractional difference between the distances to the sources, the metric reduces to $$\frac{\Delta\varphi_{ij}}{2\pi} \approx \frac{\Delta d_{ij}}{\lambda_j} + N_{ij}$$

This can be simplified as $$\frac{\Delta\varphi_{ij}}{2\pi} = \frac{f_i}{c}(d_i - d_j) + N_{ij}$$

Figure 3:
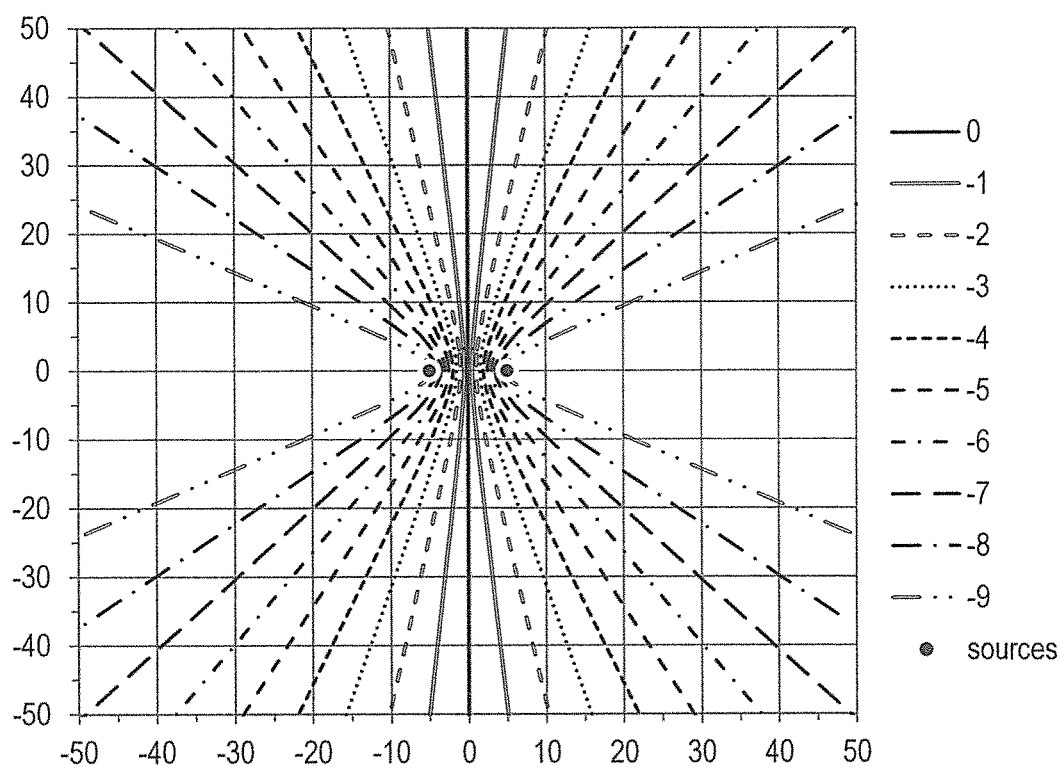
FIG. 3 shows the locus of constant phase-difference for two spaced-apart sources transmitting at the same frequency.
Figure 3:
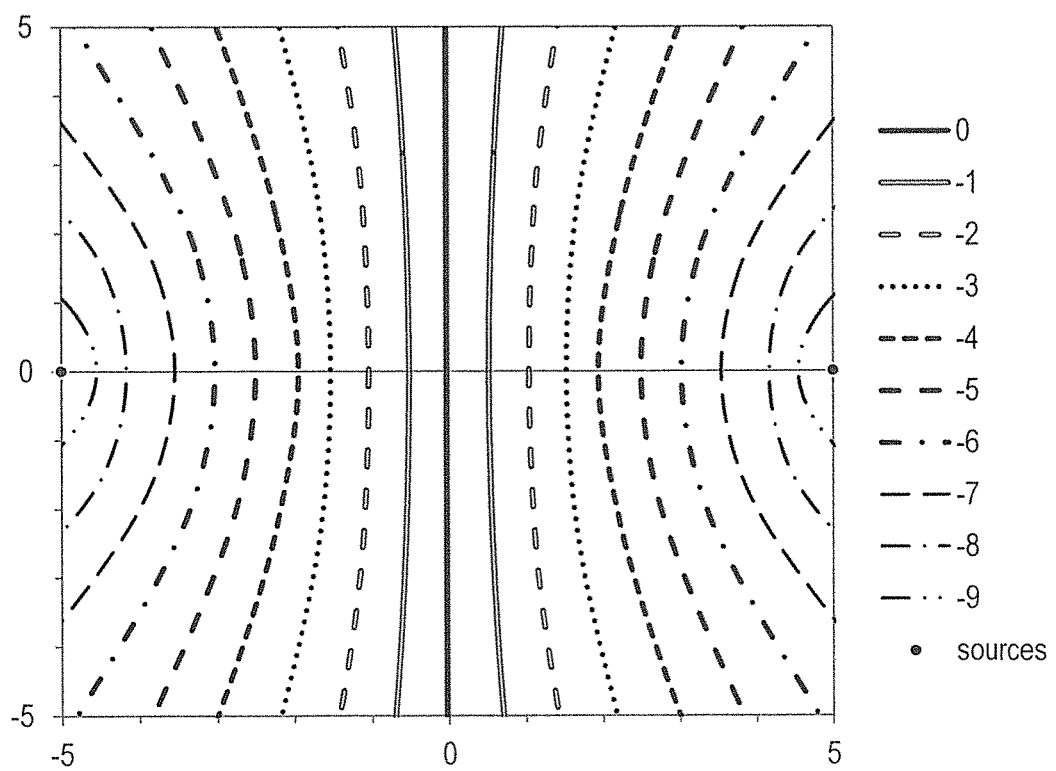

This corresponds to a difference in the path corresponding to a single frequency. In this case, there is an ambiguity corresponding to the wavelength of the (approximately common) frequency of the sources, $\lambda_j = c/f_j$. With the two signals on approximately the same frequency, the curves of constant phase-difference are hyperbolae, in two dimensions, as shown in FIG. 3. Again, for a given measured phase-difference, these curves represent a locus of positions at which the receiver could be located. Again, the different curves are for successive $2\pi$ ambiguities $N_{ij}$, with the detail of the central region shown in the lower plot. The curves with the same value of plus and minus phase-difference are marked the same; and at $\pm 10$ phase the curves of constant phase-difference lie along the axis, outside the two sources. The difference between the frequencies in this example is small (i.e., 0.01%).

In general, the phase depends on both the distance and the difference in distances between path lengths, with different effects depending on the frequency offset and the physical spacing between the sources.

Let's define the ratio of the frequencies:

$$r_{ij} = \frac{f_i}{f_j} = \frac{\Delta f_{ij} + f_j}{f_j}$$

This gives:

$$\frac{\Delta\varphi_{ij}}{2\pi} = \frac{(r_{ij} d_i - d_j)}{\lambda_j} + N_{ij}$$

Figure 4:
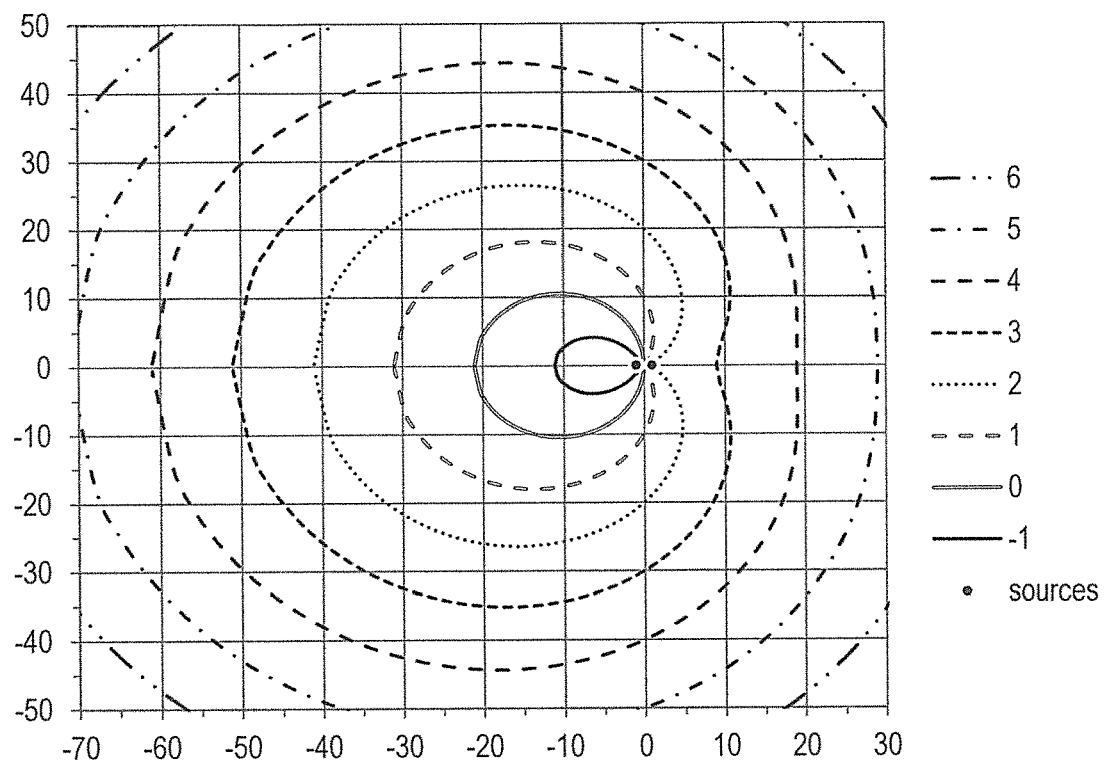
FIG. 4 shows the family of curves of constant phase-difference for sources with a modest frequency and location offset, $r_{ij}=1.1$, sources at $d=\pm\lambda_j$.
Figure 4:
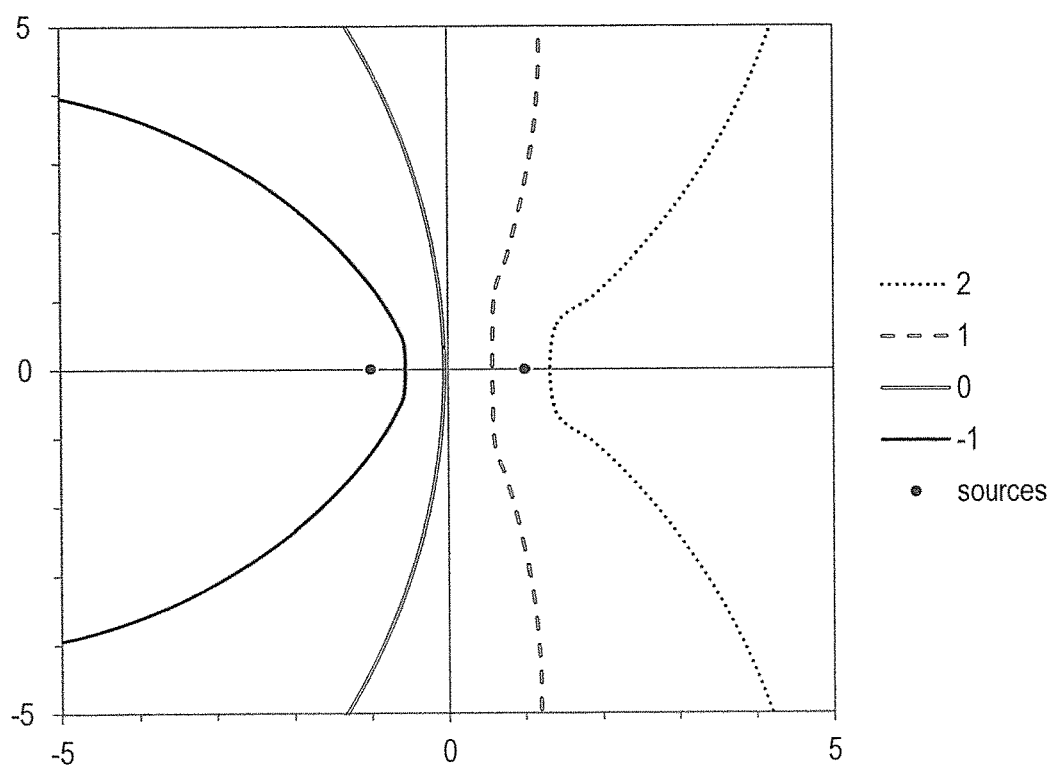

This is a different criterion or metric from the difference measurement of the phase between two sources at the same frequency, and so provides distinct information compared to that case. The effect depends on the frequency difference and the geometry. Interestingly, compared with two signals from the same location, the separation of the sources results in a displacement and some deformation of the curves of constant phase-difference, as can be seen from the example of FIG. 4. This shows the phase-difference element of the circles, combined with the squeezing of the curves and the angular relationship in the central region between the sources, reminiscent of the hyperbolae. Note that some artefacts can be seen in FIG. 4, which are consequences of the sampling of the points on the curve.

Figure 5:
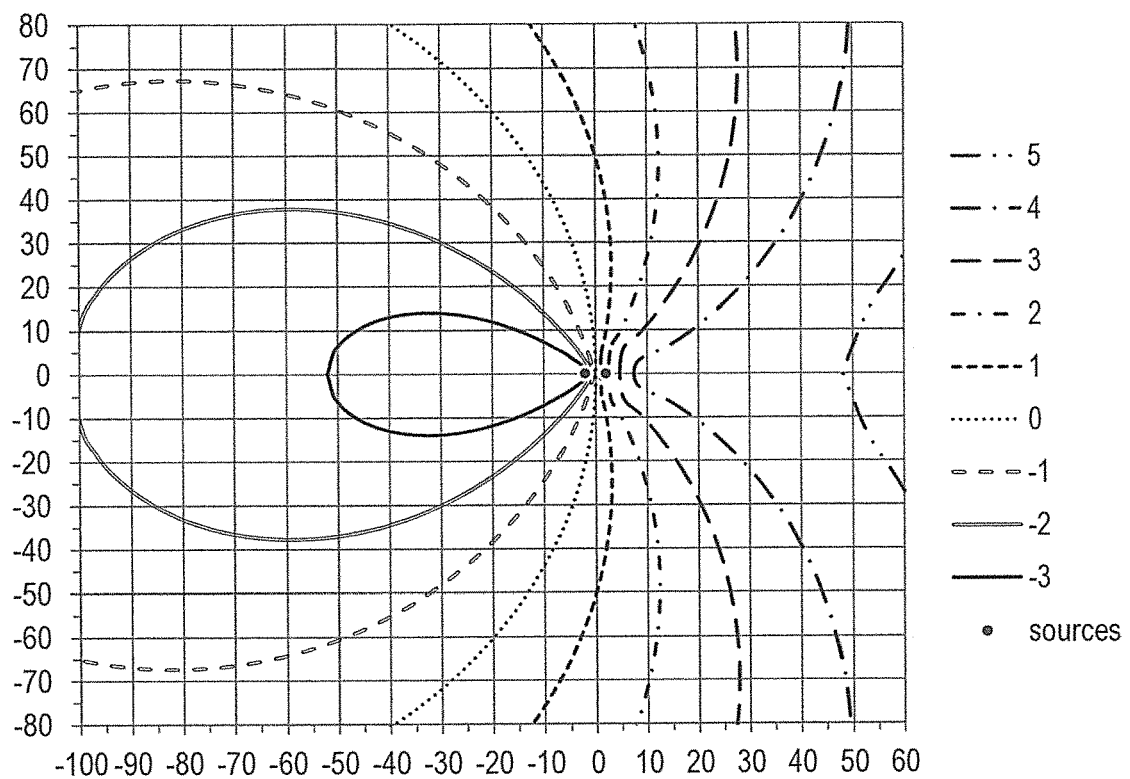
FIG. 5 shows the family of curves of constant phase-difference for spaced sources with a small frequency offset $r_{ij}=1.02$, sources at $d=\pm 2\lambda_j$.
Figure 5:
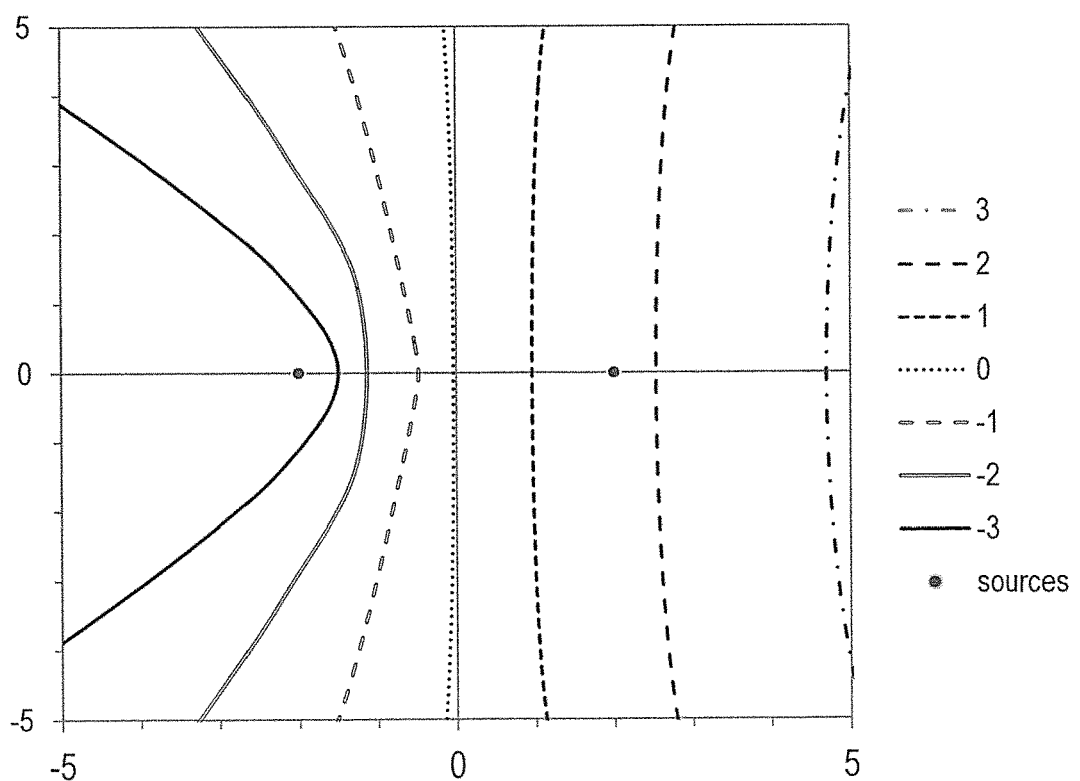

FIG. 5 shows an example with a smaller frequency difference and a greater spacing between the sources in terms of the wavelengths of the difference frequency. The family of curves again gives successive $2\pi$ ambiguities $N_{ij}$, showing the effect of the frequency offset and the geometry. The small frequency difference in combination with a greater spacing between the sources resulted in a change in the shape of the curves compared with those in FIG. 3. Even though the frequency offset is small, its effect is still strong: one side of the sources forms a loop; and, on the other side, the variation of the phase-difference can now be observed even along the axis. Far away from the sources, the curves all tend towards circles—thus, even the curves initially diverging away from the sources still ultimately end up bending around to form a closed loop. Very far from the sources compared with the distance between them, the effect approximates to that for a single source transmitting on two frequencies. Note that some artefacts are also visible in FIG. 5 (notably around the shape of the −2 curve when it crosses the x axis).

We have seen already that the curves of constant phase-difference show some similarity to circles, dependent on the distance from both sources and some similarity to hyperbolae, dependent on the difference in distance to the sources. In fact, we can decompose the phase-difference directly into: (i) that due to the sum of the distances to the two sources; and (ii) that due to the difference between the distances to the two sources.

The phase-difference can usefully be expressed in terms of the sum and difference of the distances to the sources, as follows. Our starting point, putting on one side the calibration and ambiguity terms, is $$\frac{\Delta \varphi_{ij}}{2\pi} = \frac{d_i}{\lambda_i} - \frac{d_j}{\lambda_j}$$

We wish to express this in the form:

$$\frac{\Delta \varphi_{ij}}{2\pi} = p(d_i - d_j) + q(d_i + d_j)$$

Comparing terms gives:

$$p + q = \frac{1}{\lambda_i}$$

$$p - q = \frac{1}{\lambda_j}$$

Therefore:

$$p = \frac{1}{2}\left(\frac{1}{\lambda_i} + \frac{1}{\lambda_j}\right) = \frac{f_i + f_j}{2c}$$

$$q = \frac{1}{2}\left(\frac{1}{\lambda_i} - \frac{1}{\lambda_j}\right) = \frac{f_i - f_j}{2c}$$

These are, respectively, the reciprocals of the wavelength of the average frequency and of the wavelength of the half frequency difference. We can now, as desired, express the phase-difference as:

$$\frac{\Delta \varphi_{ij}}{2\pi} = \frac{f_i + f_j}{2c}(d_i - d_j) + \frac{f_i - f_j}{2c}(d_i + d_j)$$

The variation according to the difference in distance is the normal hyperbola, while the variation subject to the constraint that the sum of the distances to the two sources is a constant is an ellipse. An example of these two sets of curves plotted together is shown in FIG. 6.

Figure 6:
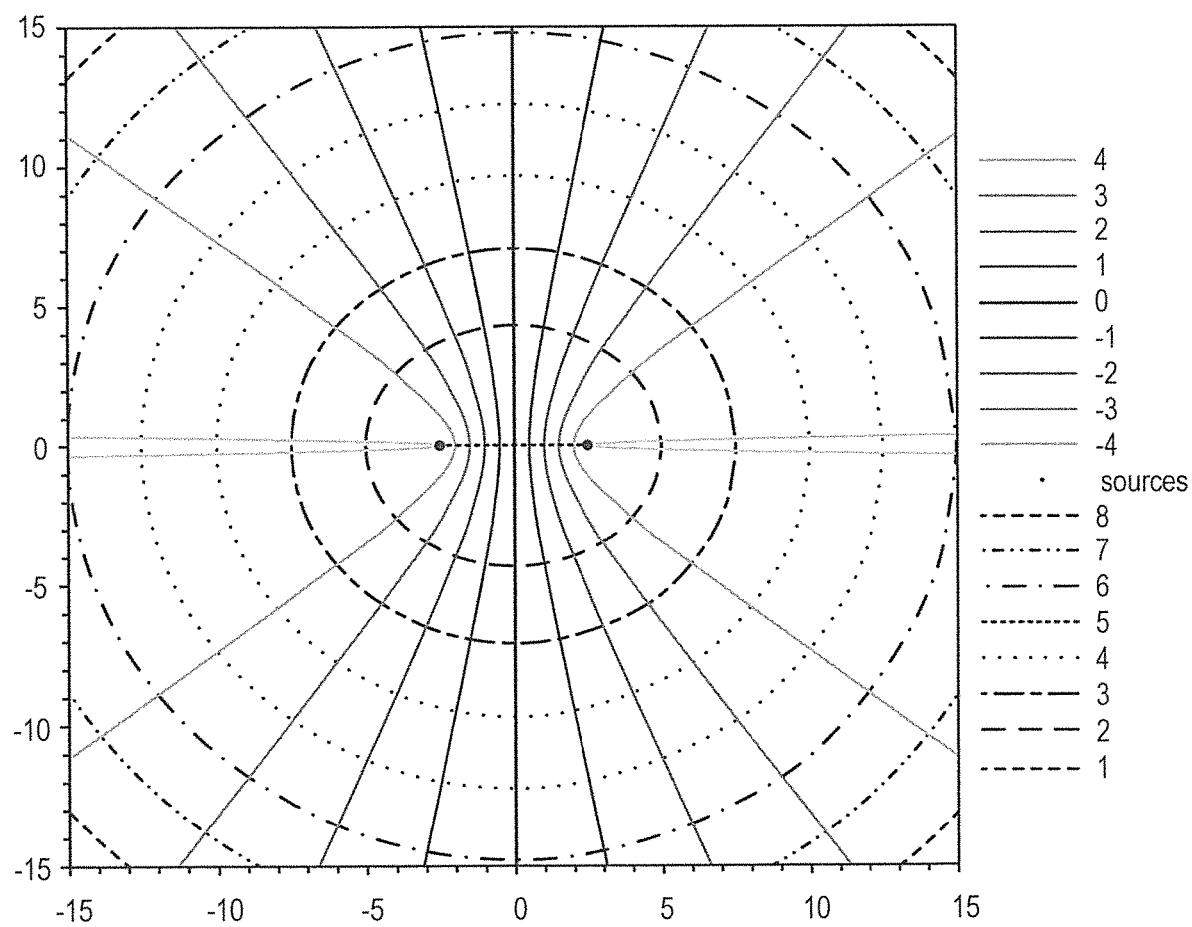
FIG. 6 shows a family of curves of constant phase-difference for spaced sources with a frequency offset $r_{ij}$=1.5, with sources separated by 10 wavelengths at the mid-frequency.

The curves shown in FIG. 6 are significant. The hyperbolae show the effect of the difference between the distance to the two sources. The ellipses show the effect of a change in the sum of the distances to the two sources. The interval between the hyperbolae curves is determined by a combination of the wavelength of the average frequency, $2c/(f_i+f_j)$, and the separation between the sources. The interval between the ellipses is constant and equal to the wavelength of the half frequency difference, $2c/(f_i-f_j)$. The form of the hyperbolae and ellipses can clearly be seen to be locally orthogonal; in other words, if there is a change in the difference between the distances to the sources (while keeping the sum constant) then the device location moves onto a different hyperbola (while keeping on the same ellipse), while if there is a change in the sum of the distances to the sources (while keeping the difference between the distances constant) then the device location moves onto a different ellipse (while keeping on the same hyperbola). Note that, for clarity in plots of the hyperbolae, such as FIG. 6, parameter values are chosen close to those stated, in order to give curves that can be plotted (in particular, when the points are close to lying on the axis).

Figure 7:
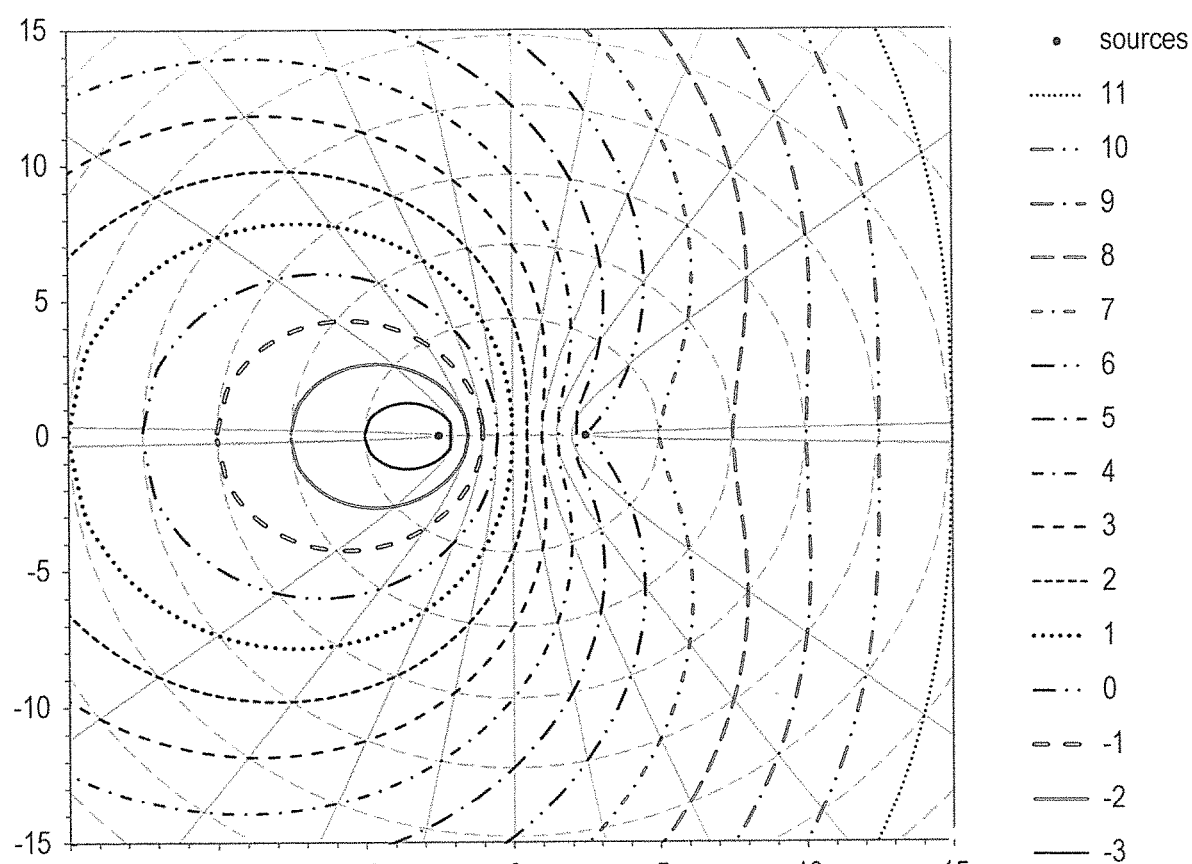
FIG. 7 shows a family of curves of constant phase-difference for spaced sources with a frequency offset $r_{ij}$=1.5, with sources separated by 10 wavelengths at the mid-frequency.

The observed variation of the phase-difference between the two signals is the combination of these two effects, as illustrated in FIG. 7. It can be seen how the asymmetrical curves of constant phase-difference are formed by the combination of the radial variation according to the set of ellipses combined with the transverse variation according to the set of hyperbolae. The elliptic-hyperbolic curves of constant phase-difference at a particular measurement time pass through the set of intersections of each.

This decomposition makes clear how the family of curves of constant phase-difference and the tangential and radial spacing vary with the frequencies and geometry. The radial variation is determined by the separation of the frequencies. The transverse variation is determined by the number of wavelengths of the mid-frequency between the sources. At any particular location, at a particular measurement time, the overall phase-difference is the sum of the radial and transverse components.

Satellite Example

Within the L1 band, there is a small but significant frequency offset between the frequency of the GPS satellites and the centre of the band used by the GLONASS satellites. This offset is around 25 MHz—a fractional ratio of 1.017. Larger offsets are available if the L2 satellite signals are also used—for example, comparing a GLONASS L2 signal with GPS L1 signals—but the advantage of exploiting only the L1 signals is that only one receiver band is needed.

It is informative to compare the results obtained when using phase-difference, according to an embodiment, with the information available from other measurements from the L1 signals from individual GPS and GLONASS satellites. Assuming satellites at ±5° overhead the user on the earth the following comparison of geometrical information can be derived:

The individual code bits of the L1 signals have a data rate of 1.023 Mb/s for GPS and 511 Kb/s for GLONASS. Measuring the phase of the individual code bits translates to a vertical accuracy of 293 m and 587 m respectively.

The individual carriers are at a frequency of 1.575 GHz and 1.602 GHz respectively. Measuring the carrier phase separately for each signal therefore translates to vertical ambiguity of 0.190 m and 0.187 m, respectively.

The "difference frequency" (the difference between the carrier frequencies, which is the effective bandwidth of the phase-difference function) is about 27 MHz. Using phase-difference measurements, according to an embodiment, translates to ambiguity of 1 m horizontally and 11 m vertically.

Note that the GPS and GLONASS satellites are in orbits at different altitudes above the earth. This affects the geometry of the arrangement, particularly at times when they are relatively aligned to one another (from the perspective of the receiver), because the GPS satellite will be farther away from the receiver on the earth than the GLONASS satellite. Consequently, the difference phase pattern will be inclined.

Terrestrial Example

Cellular networks are widespread, and operate on a set of channels across a frequency band. Multiple cellular base stations are therefore transmitting signals on a set of different frequencies—both within a frequency band, and on different bands. This gives rise to a variety of opportunities for measuring the phase-difference between signals coming from different transmitters, as a measurement to support positioning.

To calculate a position using terrestrial base stations only, an electronic device should make measurements from more than one base station. This is in contrast to the use of cellular base stations for communication, for which it is sufficient to be within the communication range of just one base station. Fortunately, in practice, signals from multiple base stations are observable in most places, for the following reasons:

A network operator will deploy a set of base stations to give a wide coverage, and it will often be possible to receive the signals from neighbouring cells of the same network;

Multiple network operators compete for business and so there are multiple cellular network deployments, with overlapping coverage;

A single network operator may operate across multiple channels or bands, in order to provide sufficient communications capacity.

The different network operators are usually assigned different (sets of) frequencies, on which to use their base stations. In some systems, such as GSM, each base station in a locality transmits on a different frequency in order to avoid interference (Frequency Division Multiple Access, FDMA).

Figure 8:
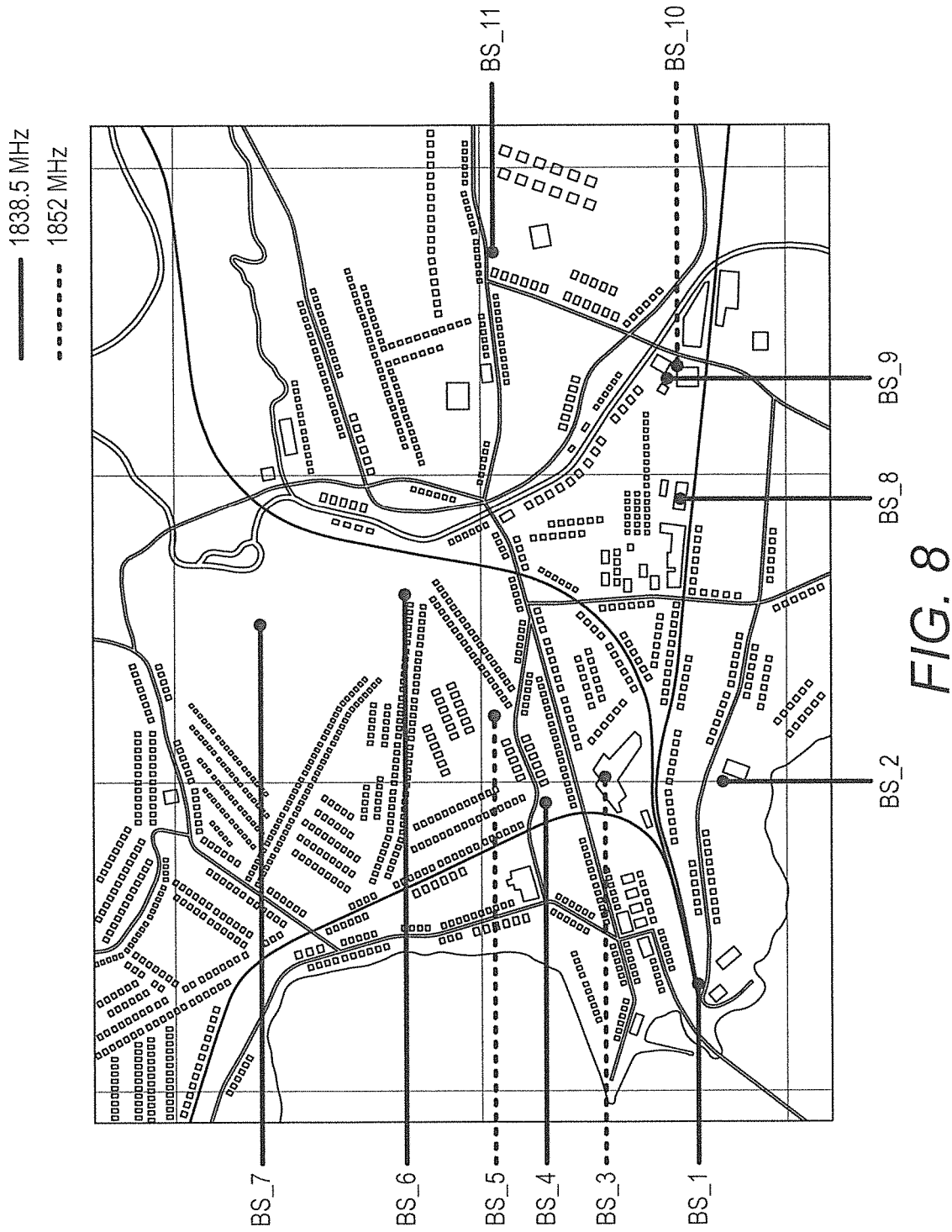
FIG. 8 is a map of LTE base stations in Rapperswil, Switzerland.

An example deployment of Long Term Evolution (LTE) base stations is shown in FIG. 8. At the time of the survey, two network operators had LTE cellular systems deployed in Rapperswil, with the two systems operating at frequencies of 1838.5 and 1852 MHz, respectively. Sometimes base stations on different frequencies, from the two operators, are placed close together, for example those indexed as BS_9 and BS_10, while sometimes there are base stations separated more widely, for example those indexed BS_1 and BS_3 which are separated by about 750 m. As users move around the town, their mobile electronic devices will be able to receive signals with carriers on both frequencies, and that the devices could therefore measure the difference of the phase of these various signals, in accordance with an embodiment. Note that, when measuring and using the phase-difference between transmitters, the timing stability (absolute and relative) of these base stations will affect accuracy. In particular, the timing stability will determine how the measurement-accuracy degrades over time after calibration.

Figure 9B:
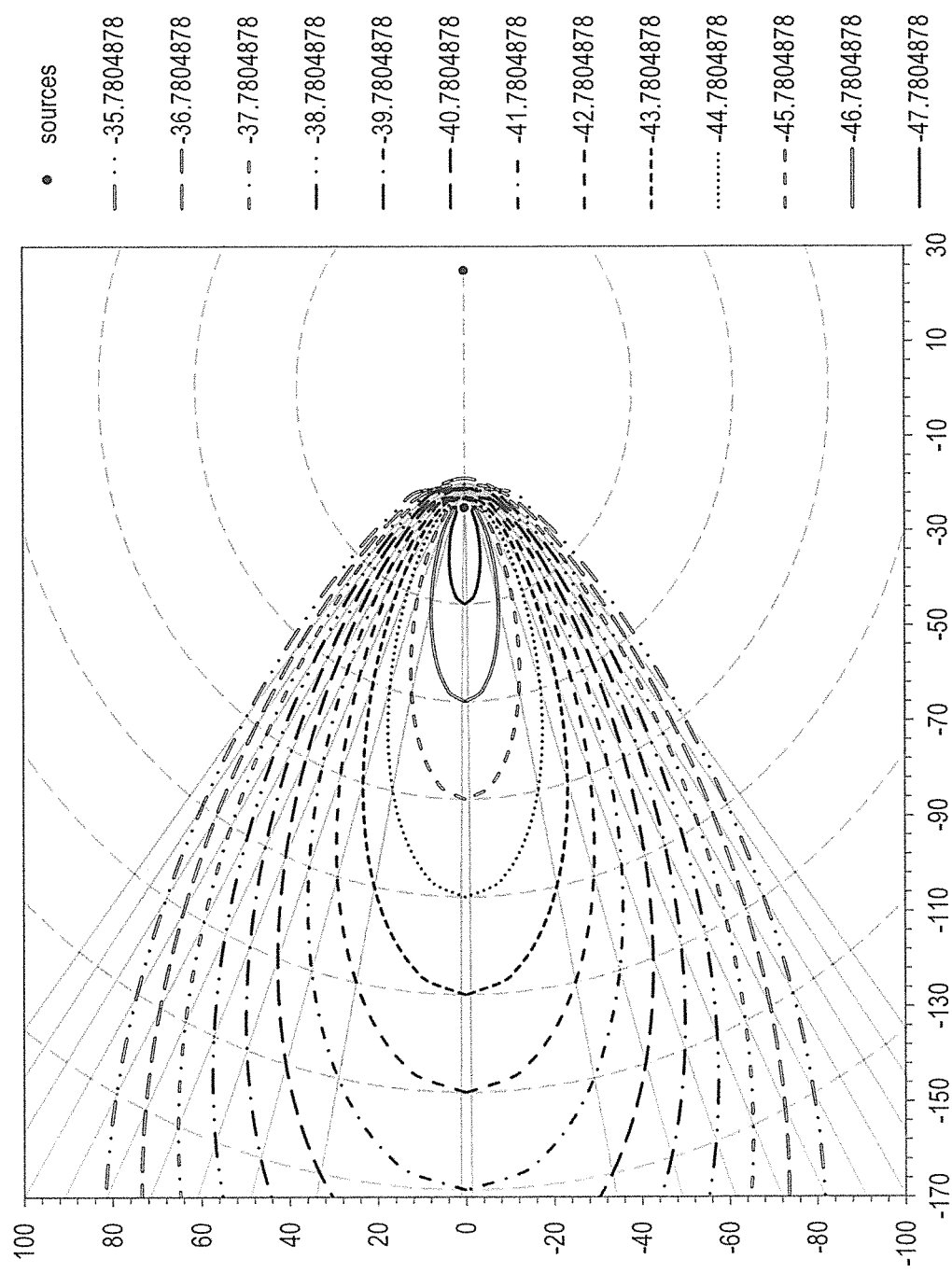
FIG. 9 shows a family of curves of constant phase-difference for transmitters with a frequency offset $r_{ij}$=1.05, sources at d=100$\lambda_j$.
Figure 9C:
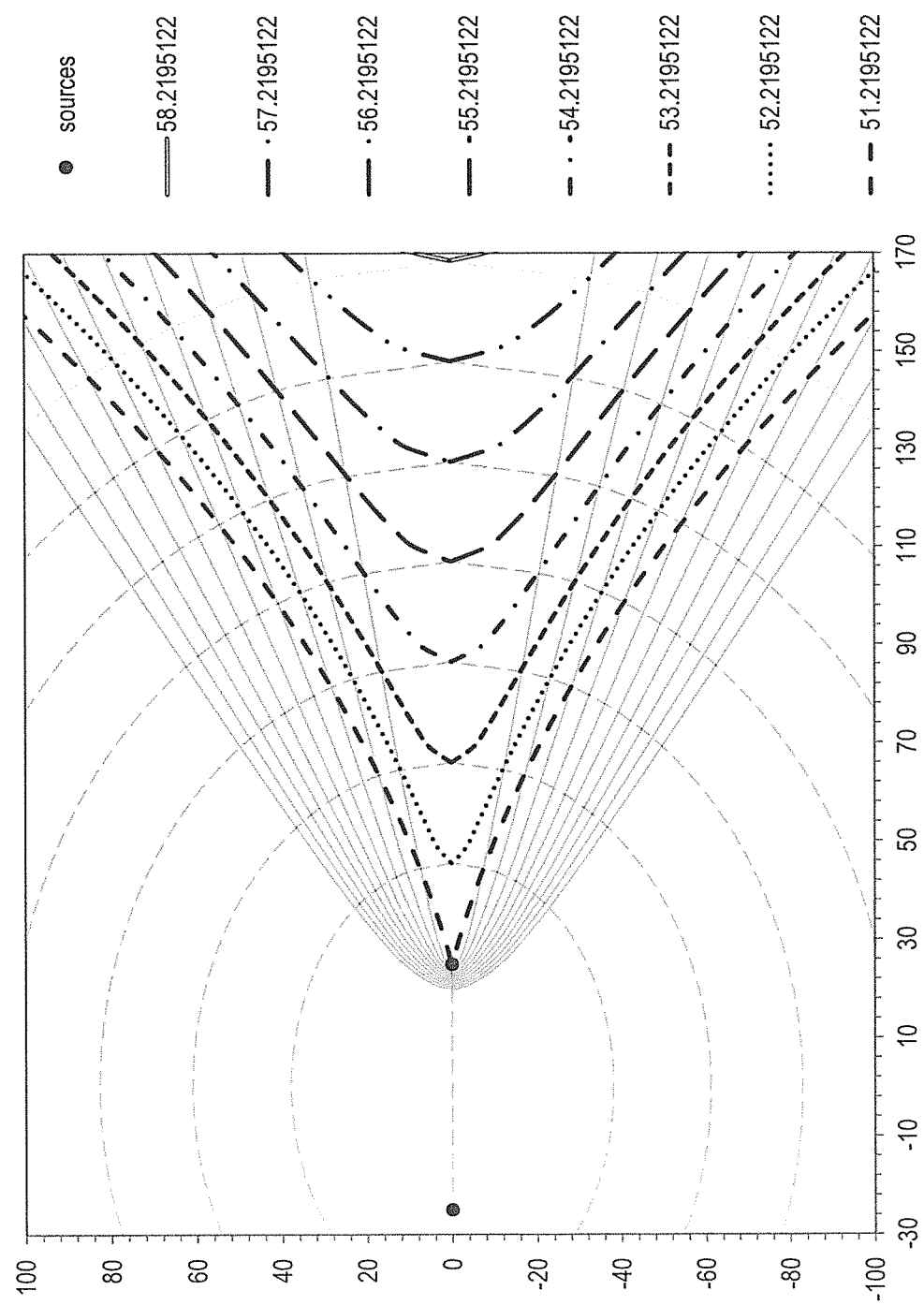
Figure 10A:
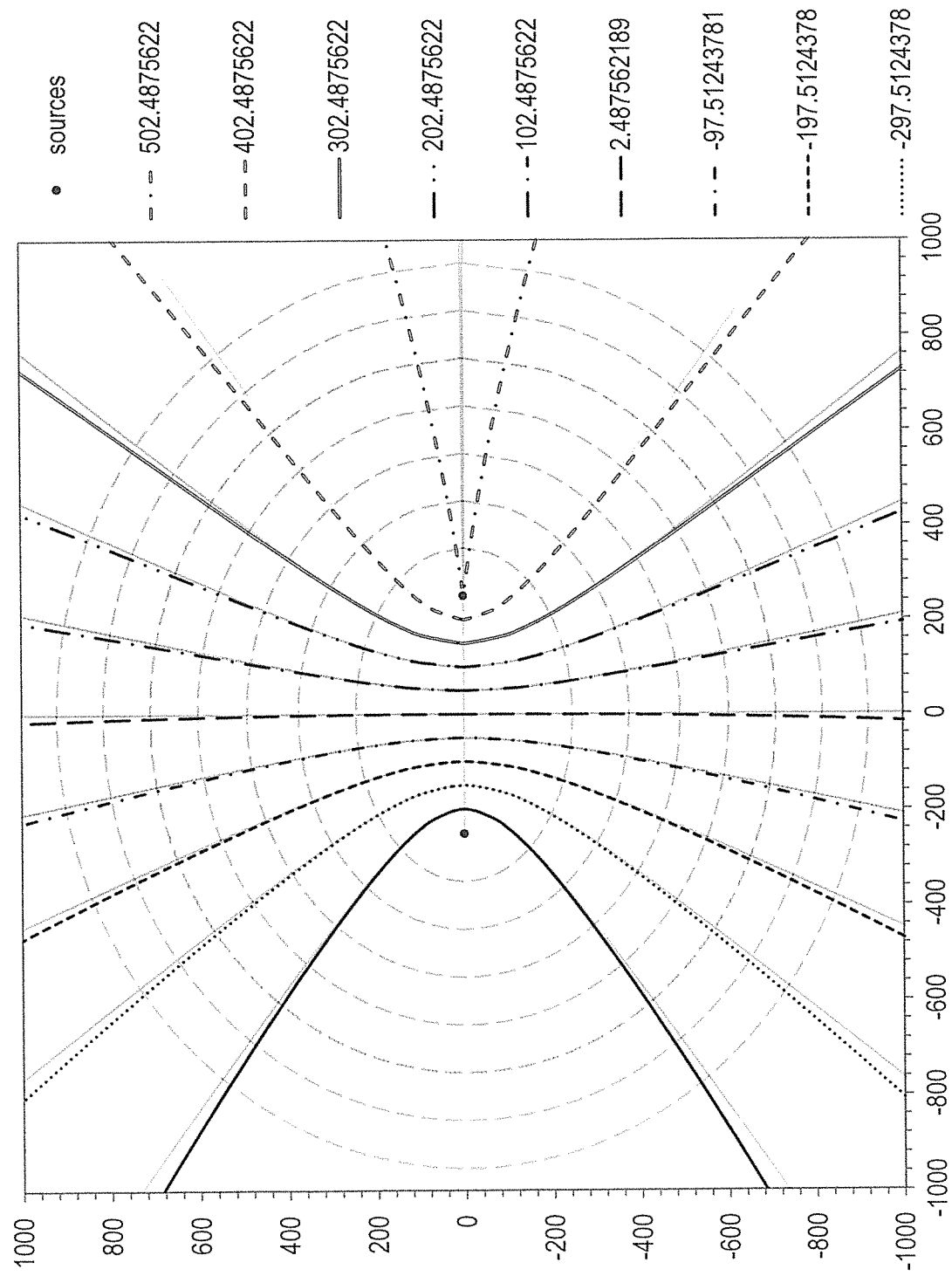
FIG. 10 shows a family of curves of constant phase-difference, representative of cellular transmitters with a frequency offset $r_{ij}$=1.01, with the sources at d=1000$\lambda_j$.
Figure 10B:
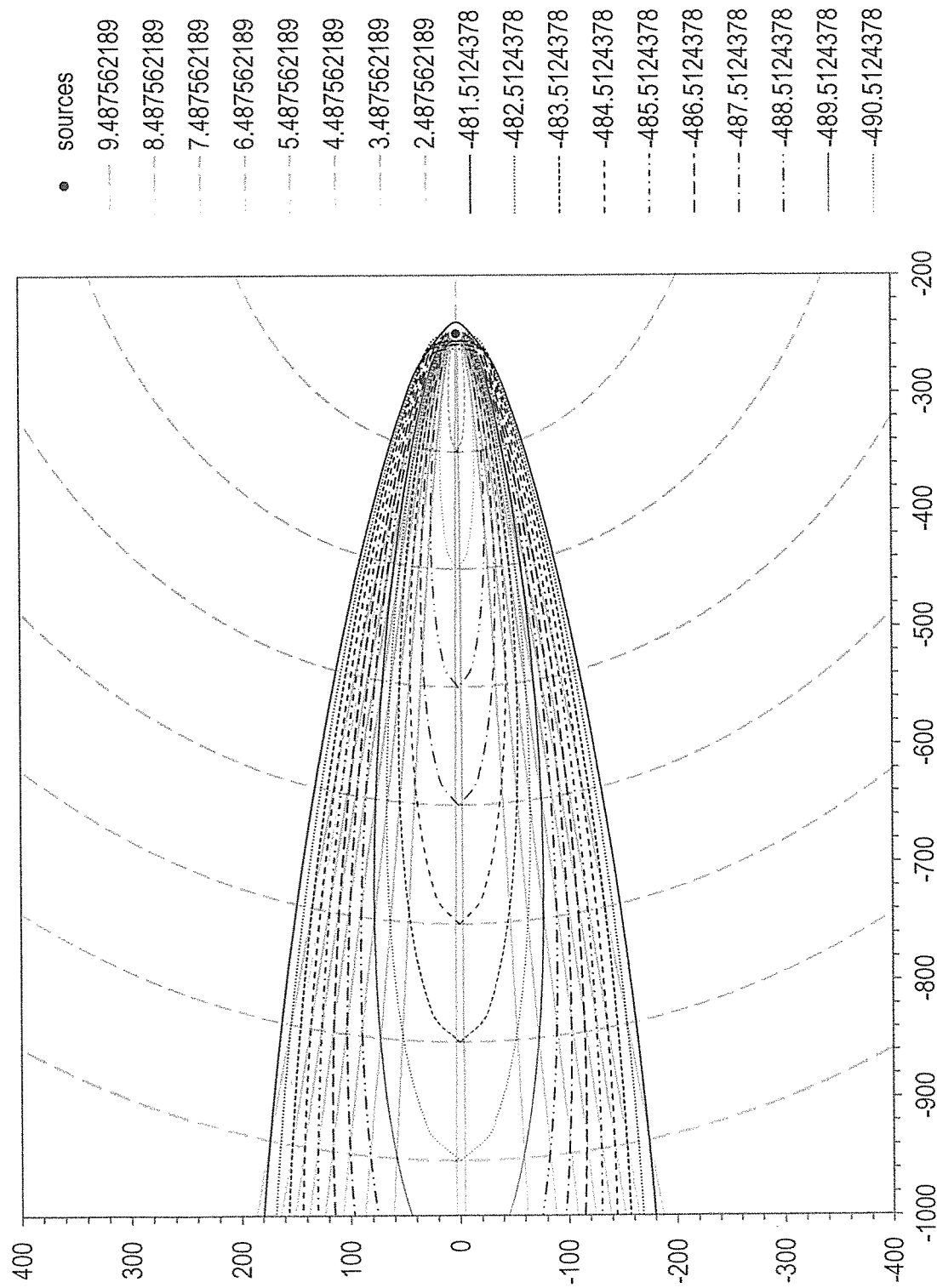
Figure 10C:
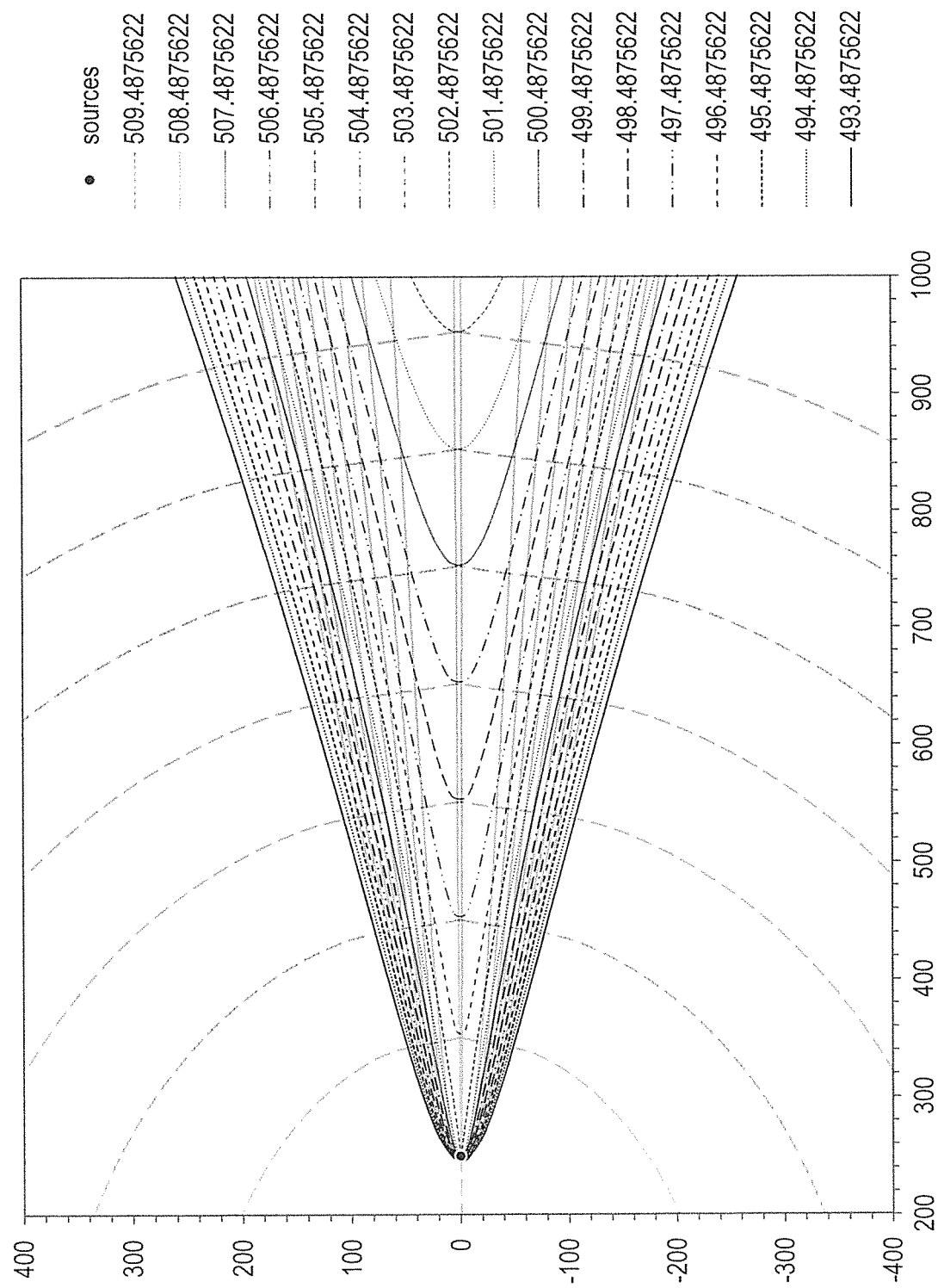

In the satellite example, discussed above, the receiving device was far from the transmitters but, for the terrestrial case, the receiver is usually placed among the transmitters. In the example shown in FIG. 8, the separation of the signals is just 1852-1838.5=13.5 MHz (a difference of <1%) and the base stations visible at the receiver are usually separated by no more than 750 m (or several thousand wavelengths). The behaviour of the phase-difference however follows the same principles that were described previously above. This is shown firstly in FIG. 9, for a slightly simpler example for ease of illustration, with a frequency ratio $r_{ij}$=1.05 (a difference of 5%, 90 MHz) and a separation between the sources of 100 carrier wavelengths (about 16 m). The receiver could be located in a central region, between the two base stations, or outside them, to the left or right. The central region is shown in FIG. 9(*a*) with lines of constant phase every 10*2π, with a correspondingly wider spaced set of hyperbolae to show the underlying framework. The regions either side are shown in FIGS. 9(*b*) and 9(*c*) with single-cycle ambiguity of phase 2π, again with a corresponding set of hyperbolae in each case. There are some small irregularities in the smooth curves but these are due to numerical limitations in the curve plotting. This will be discussed in greater detail later, below. Turning now to a more representative example, FIG. 10 shows the family of constant-phase-difference curves for a smaller frequency offset of just 1% (i.e., $r_{ij}$=1.01) and a wider spacing between the cellular base stations of 1,000 wavelengths. This corresponds to a frequency offset of 18 MHz and a separation of about 160 m. The scale this time is different, and the central region is plotted in FIG. 10(*a*) with lines of constant phase every 100*2π. The end regions are also shown in more detail, in FIGS. 10(*b*) and 10(*c*). Although it is slightly more difficult to see, as the variation is stronger, the behaviour and characteristics are the same as in the intermediate example of FIG. 9.

Uncertainties

Recall the decomposed difference equation for phase-difference processing:

$$\frac{f_i+f_j}{2c}(d_i-d_j) + \frac{f_i-f_j}{2c}(d_i+d_j) = \frac{\Delta\phi_{ij}}{2\pi} - \frac{\Delta\alpha_{ij}}{2\pi} - N_{ij}$$

From this, it can be seen that the measurement precision is determined by the following factors:

The precision with which the phase-difference $\Delta\varphi_{ij}$ is measured. This is based on the measurement of the time, or equivalently the phase of the difference signal, and depends on the signal to noise ratio and the frequency difference $\Delta f_{ij}$ (that is, the bandwidth occupied). In a simple noisy environment, the measurement performance is governed by the Cramer Rao bound, and the measurement precision in time will improve as the bandwidth $\Delta f_{ij}$ increases.

Timing errors in the receiver, which affect the derivation of $\Delta\varphi_{ij}$. These might be knowable and corrected, and small errors in the time domain will probably have negligible effect on the precision of the end result.

Systematic timing errors in the sources, which affect $\Delta\alpha_{ij}$. These might also be knowable and corrected. Small errors in the time domain will probably again have negligible effect on the precision of the end result.

The accuracy with which the transmitter phase-offset $\Delta\alpha_{ij}$ is calibrated; this will be discussed further below.

The accuracy with which the ambiguity $N_{ij}$ is reliably resolved. Depending on the use case, the ambiguity resolution has to be performed by other means, and other measurements. The accuracy with which this has to be done is the local effective wavelength, $\lambda_{ij}$, which describes the $2\pi$ periodicity of phase-difference in space. The shorter the effective wavelength, the better the ambiguity resolution needs to be in order to obtain a unique accurate solution.

The conversion of the measured phase-difference into a distance error, which is determined by the local effective wavelength $\lambda_{ij}$ that describes the conversion of the phase-difference into distance. The shorter the effective wavelength, the sharper the spatial resolution that is achieved, proportionately.

Based on the above considerations, the following conclusions can be drawn:

The precision is at its best in configurations where the sources are well separated.

The accuracy is limited by the accuracy to which the phase-offset between the sources is calibrated.

Usage

The measurement of the difference in phase can lead to the estimation of the differential pseudorange for position and/or time estimation; position and/or time can be estimated for the target device or for the sources, and position and/or time can be estimated in absolute terms or relative to previous position and/or time estimates. The phase-difference metric according to embodiments of the present invention is suitable for combination with other conventional metrics used for positioning, such as time of arrival and time difference of arrival, using multiple sources, and multiple signals from the sources to additionally constrain the position solution.

Because of its properties as a phase measurement at an effective "difference frequency", $\Delta f_{ij}$, which leads to good accuracy with moderate ambiguity, the phase-difference metric may be particularly suitable for improving the accuracy of an estimated position. The technique might be particularly useful when the carrier phase measurement of each signal on its own is not available. This may arise when:

The carrier phase is not measured by the receiver.

The noise or multipath conditions make the measurement and tracking of the carrier phase unreliable.

The ambiguity in the carrier phase measurement is not available or not reliable.

In these cases, the use of the phase-difference might offer improved performance, compared with the use of code measurements for each signal separately. In practice, a combination of measurements might be desirable to resolve the ambiguities and benefit from the improved precision that comes from the measurement of the phase-difference.

Measurement of Phase-Difference and Frequency in Practice

The measurement of the phase-difference between two signals can be done either directly, by comparing the two signals, or indirectly, by measuring the phase of each signal compared to a reference (as in a conventional carrier measurement by a receiver) and then subtracting the result for the two signals.

This is an implementation choice. An example for the direct approach is the complex cross-multiplication and combination of the two signals using the trigonometric identities and removing the component at $(f_i+f_j)$ by filtering, which leaves:

$$\sin(\alpha_i+2\pi f_i(t-d_i/c))\cos(\alpha_j+2\pi f_j(t-d_j/c))=\tfrac{1}{2}\sin(\Delta\theta_{ij}(t))$$

and $$\cos(\alpha_i+2\pi f_i(t-d_i/c))\cos(\alpha_j+2\pi f_j(t-d_j/c))=\tfrac{1}{2}\cos(\Delta\theta_{ij}(t))$$

from which the difference measurements can be made.

Measurement of phase for individual satellite signals will be familiar to those skilled in the art. Further details about the measurement of phase for terrestrial cellular signals may be found in: Carlemalm and Poor (C. Carlemalm and H. V. Poor "Joint Carrier Phase and Frequency Offset Tracking in OFDM Systems", Proceedings of the 10th European Signal Processing Conference, Tampere, Finland, 4-8 Sep. 2000); and Huq et al. (A. T. Huq, E. Panayirci, and C. N. Georghiades, "ML NDA Carrier Phase Recovery for OFDM Systems", Proceedings of the IEEE International Conference on Communications (ICC), vol. 2, p. 786-790, 6-10 Jun. 1999).

Measurement of frequency (rate of change of phase) is also derived in the above papers and frequency demodulation techniques and circuitry are similarly familiar to those skilled in the art. The rate of change of phase can be used to assist in the calculation of the velocity or timing drift of one of the devices. This can be done either in combination with, or independently of, the use of phase-difference to assist in the calculation of position or time. Examples of how to use the rate of change of phase in this way will be described in more detail below.

In practice, each signal source is not a continuous wave signal, but has modulation on a carrier. In some cases, it may be beneficial to remove this modulation by signal processing as part of (or before) the measurement of the phase-difference between the two carrier signals.

A typical receiver only has one antenna and front end, and will receive multiple signals of different signal amplitudes, and frequencies (and phases) in combination together; these should then be separated into the available signals for finding position.

With more than two signals present, the set of pairs of signals will each give difference information that is available to be measured by the signal processing and combined by the positioning algorithms.

Potential Benefits

The approach of using sources (transmitters) with different signal-frequencies may be useful for a variety of reasons:

More terrestrial base stations are becoming better controlled. Their frequency is usually stable, and possibly locked to UTC via GPS. This has an indirect positive effect on the stability of the frequency-offset between transmitters.

More sources (transmitters) are becoming available:

Firstly, through widespread deployment of high quality cellular base stations and femto-cells, to increase communication network capacity.

Secondly, through multiple satellite navigation systems and satellites. Embodiments of the present invention can exploit not only each signal individually, but also the differences between them.

As mentioned previously above, it is expected that the present phase-difference approach will be useful for satellite positioning. The GPS signals and the GLONASS signals in the L1 band are transmitted on 1.575 GHz and in a band around 1.602 GHz respectively, so they are separated by around 27 MHz. The bandwidth of the combined signal is a factor of ten greater than the bandwidth of a GPS signal, offering the potential for much higher accuracy and resolution than the use of the code signals of either GPS or GLONASS on its own. This is true even though the receiver is still operating solely within the L1 band, and is not calling upon the additional capability (and additional satellites) of the wideband signal E5a+E5b, which will be offering a similar bandwidth signal when it is transmitted in due course by Galileo satellites.

As remarked, since the bandwidth of the combined signal is a higher frequency than the code modulation of GPS (or of GLONASS), it gives additional measurement and positioning possibilities for the receiver. Because it relies on a difference measurement it also carries information about the distance from the satellites. This may offer improved precision, vertically as well as horizontally.

Compared with (or complementing) measurement of each carrier phase, the approach might bring advantages in:

The calibration and ambiguity resolution of just one parameter—namely, the phase-difference between the GPS and GLONASS signals—without requiring the ambiguity resolution of the phase of each satellite separately (two parameters).

The ease and robustness of the measurement of the phase-difference between the signals (at an effective bandwidth of ~27 MHz), compared with the precise measurement of the phase of each carrier individually (at ~1.5 GHz).

Together with the normal code measurements, convenient precision in the estimation of the distance from the satellites to help resolve ambiguity in the carrier measurements.

The present examples consider the FDMA GLONASS signals that are currently available. The new generation of GLONASS-K2 satellites scheduled for launch over the period 2015-2024 will continue to support these FDMA signals, but will also transmit a CDMA signal at 1.601 GHz. The phase-differencing approach could also be applied to these new satellites and signals.

It is also expected that the present phase-difference approach will be useful for positioning based on radio signals from terrestrial base stations.

Cellular systems are constructed with multiple base stations, some of which are on the same frequency (for example, in the case of Code Division Multiple Access, CDMA, systems) and some of which are on different frequencies (to avoid interference). Typically, different network operators purchase and use different bandwidth in the spectrum and have their own set of base station frequencies. By exploiting the signals from base stations which are on different frequencies, embodiments can assist positioning using signals in FDMA systems and can combine signals from multiple base stations and multiple network operators. This can increase the availability of measurements compared with those that can be used by any single network operator, which in turn can improve the likelihood of an electronic device being able to calculate a position estimate, and/or potentially improves the precision of such an estimate. The use of phase-difference can be considered as exploiting a notional combined signal, whose bandwidth is equal to the frequency difference between the two underlying signals. This can be a large bandwidth, because it is that of the separation between cellular base stations across a band, and even between bands—not just the bandwidth of the individual channel or single base station transmitter. Again, the increased bandwidth of the phase-difference measurement compared with that of each signal on its own can offer increased resolution, increased accuracy, and improved ability to combat multipath.

Embodiments can also allow measurements to be combined among signals transmitted by satellites and signals transmitted by terrestrial base stations. This can provide many more sources that can be used to support positioning. As mentioned already above, it may be particularly helpful for vertical positioning, as the vertical range of angle (and Dilution of Precision) will be much greater when combining satellites and terrestrial sources, than achievable with any one system on its own. The satellite signals and terrestrial signals are comfortably spaced in separate bands to avoid interference, providing a useful bandwidth for the phase-difference measurement. The potential high precision of using the phase-difference may be particularly desirable for finding the altitude of an electronic device and—in the case of indoor positioning—which floor of a building the user is on.

Use of Time Information in Measurement and Calibration

In the discussion above, it was assumed that all phases and phase differences were specified relative to a common time reference $t_0=0$. Accordingly, for simplicity, the dependence on this reference time could be dropped from the equations. In practice, as those skilled in the art will appreciate, the time at which measurements are made and the reference time (or times) to which they are referred are important. We will now present a modified form of the equations in which time is handled explicitly.

Figure 17:
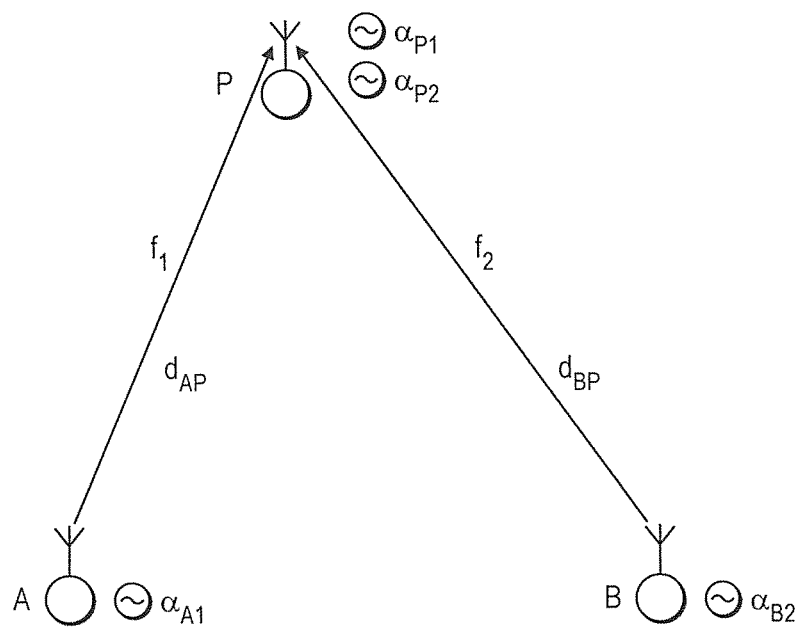
FIG. 17 shows a general case of two transmitters transmitting at different frequencies to one receiver.

FIG. 17 shows a general case of two transmitters transmitting at different frequencies to one receiver.

In the general concept we have two wireless devices, A and B, each transmitting on a different frequency. Signals are sent to a third device P which receives on both frequencies. The difference in the phase shift due to the propagation of the signals at the different frequencies over the different respective path distances is measured. This is then used to assist in the estimation of the position and/or timing of one of the devices.

Equally, the estimation of the position/timing or the rate of change of position/timing may be assisted by measurement of the rate of change of phase difference. This will be discussed further below.

To analyse the transmission and reception of a signal we separately identify the phase offset in device X and frequency i at some arbitrary general time $t_0$ as $\alpha_{Xi}$. Then the phase of the signal output (from the modulator, local oscillator and power amplifier) of the transmitter at frequency $f_i$, wavelength $\lambda_i$, from transmitter X is $\theta_{Xi}(t)$ $$\theta_{Xi}(t)=\alpha_{Xi}+2\pi f_i(t-t_0)$$

The signal then travels a distance $d_{XY}$ to receiver Y and is received and measured by a receiver with a (local oscillator, front end phase, filtering and signal processing) phase offset of $\alpha_{Yi}$ at the same general arbitrary time $t_0$. The phase of the measured signal by the receiver from X and frequency i is then $\theta_{Yi}(t)$ with ambiguity $N_{Yi}$.

$$\theta_{Yi}(t)=\alpha_{Xi}+2\pi f_i((t-t_0)-d_{XY}/c)+\alpha_{Yi}+2\pi\cdot N_{Yi}$$

This is made up of
- a fixed phase offset term, which depends on the phases of the transmitting and receiving devices when operating at the signal frequency, at the reference time $t_0$
- the time varying phase term, corresponding to the signal frequency with zero at the reference time $t_0$
- a location-dependent phase term which is produced by the separation of the receiver from the transmitter, scaled by the frequency factor $2\pi f_i/c$ or a wavelength factor $2\pi/\lambda_i$
- the integer $2\pi$ ambiguity If we consider now the pair of observations when A and B are transmitting (on frequencies $f_1$ and $f_2$), and P is receiving on both frequencies $f_1$ and $f_2$.

The receiver receives the signals $$\theta_{P1}(t) = \alpha_{A1} + 2\pi f_1((t-t_0) - d_{AP}/c) + \alpha_{P1} + 2\pi \cdot N_{P1}$$

$$\theta_{P2}(t) = \alpha_{B2} + 2\pi f_2((t-t_0) - d_{BP}/c) + \alpha_{P2} + 2\pi \cdot N_{P2}$$

and forms the difference measurement of the phase $$\theta_{P1}(t) - \theta_{P2}(t) = \alpha_{A1} - \alpha_{B2} + 2\pi(f_1 - f_2)(t-t_0) + 2\pi(f_2 d_{BP}/c - f_1 d_{AP}/c) + \alpha_{P1} - \alpha_{P2} + 2\pi(N_{P1} - N_{P2})$$

So that if a receiver P makes a measurement referred to time $t=t_P$ of this phase difference $$\frac{\theta_{P1-P2}(t_P)}{2\pi} = \frac{\alpha_{A1} - \alpha_{B2} + \alpha_{P1} - \alpha_{P2}}{2\pi} + (f_1 - f_2)(t_P - t_0) + \left(\frac{d_{BP}}{\lambda_2} - \frac{d_{AP}}{\lambda_1}\right) + (N_{P1} - N_{P2})$$

This is made up of
- The observed phase $\theta_{P1-P2}(t_P)$ is that physically observed and measured by the receiver measurement time referred to $t_P$. It does not vary with the arbitrarily chosen general reference time $t_0$. (Note that we do not assume that the measurements are actually made at $t_P$—they may be made at different times and through knowledge of the frequencies referred to the phase measurement that would be observed by the receiver at $t_P$)
- The phase offsets (biases) of the transmitters $\alpha_{A1}$ and $\alpha_{B2}$ and for the receiver at the two measurement frequencies $\alpha_{P1}$ and $\alpha_{P1}$. These depend on the choice of general reference time $t_0$
- The variation of the signal phase as a consequence of the difference frequency ($f_1-f_2$), and the difference between the measurement reference time $t_P$ and the general reference time $t_0$.
- The variation of phase with location, according to the elliptic-hyperbolic relationship $$\left(\frac{d_{BP}}{\lambda_2} - \frac{d_{AP}}{\lambda_1}\right)$$

- The integer ambiguity arising from the pair of measurements ($N_{P1} - N_{P2}$), which might also be affected by the choice of reference time.

The difference in the phase offset $\alpha_{P1} - \alpha_{P2}$ at $t_0$ may be known as it is a consequence of the receiver modem design, with appropriate design of the synthesiser circuitry and operation at the two frequencies which are typically derived from a common reference oscillator in the receiver by means of divider circuitry, such as is known in the art.

To use the spatial term we need to calibrate the phase offsets (referred to the general reference time $t_0$), for the difference in phase for the common device, on the two frequencies of operation $$\alpha_{P1} - \alpha_{P2}$$

and for the difference between the other two devices on their respective frequencies of operation.

$$\alpha_{A1} - \alpha_{B2}$$

Figure 18:
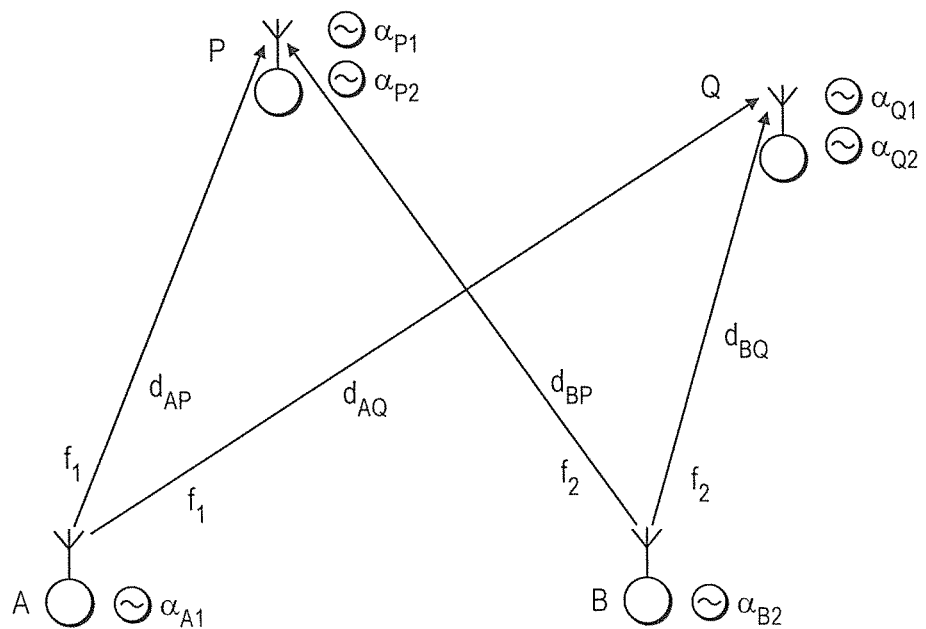
FIG. 18 augments the case shown in FIG. 17 with a further receiver being used for calibration.

This may conveniently be solved by performing a set of multi-frequency measurements in a calibration location, as illustrated in FIG. 18.

For the calibration set of measurements, considering again the case of a receiver P and now an additional reception measurement Q, we have $$\frac{\theta_{Q1-Q2}(t_P)}{2\pi} = \frac{\alpha_{A1} - \alpha_{B2} + \alpha_{Q1} - \alpha_{Q2}}{2\pi} + (f_1 - f_2)(t_P - t_0) + \left(\frac{d_{BQ}}{\lambda_2} - \frac{d_{AQ}}{\lambda_1}\right) + (N_{Q1} - N_{Q2})$$

In the case of the calibration, the locations of device Q as well as the devices A, B are known, so the distances $d_{BQ}$ and $d_{AQ}$ are known so the phase offsets term $$\frac{\alpha_{A1} - \alpha_{B2} + \alpha_{Q1} - \alpha_{Q2}}{2\pi}$$

can be established. There is integer ambiguity, but this ambiguity is anyway present in the measurement at P, so does not make the ambiguity situation worse.

As the internal relationship in the difference in the phase offset ($\alpha_{Q1} - \alpha_{Q2}$) at $t_0$ is known by design, the offset difference of the phases of the transmitters A and B at the respective frequencies ($\alpha_{A1} - \alpha_{B2}$) at $t_0$ can be determined.

This may then be used for positioning for one or more target locations and devices P, using the relationship described above.

Also the transmitter may report the phase, relative to some reference.

The two expressions can then be differenced to remove the uncertainties in the phase offsets ($\alpha_{A1} - \alpha_{B2}$), giving a convenient relationship between the phase difference observed by the target together with that of the calibration device, and the locations and relative time of each.

$$\frac{\theta_{P1-P2} - \theta_{Q1-Q2}(t_Q)}{2\pi} = \frac{(\alpha_{P1} - \alpha_{P2}) - (\alpha_{Q1} - \alpha_{Q2})}{2\pi} + (f_1 - f_2)(t_P - t_Q) + \left(\frac{d_{BP}}{\lambda_2} - \frac{d_{AP}}{\lambda_1}\right) - \left(\frac{d_{BQ}}{\lambda_2} - \frac{d_{AQ}}{\lambda_1}\right) + (N_{P1} - N_{P2}) - (N_{Q1} - N_{Q2})$$

This is made up of:
- The differences in the observed phase differences $\theta_{P1-P2}(t_P)$ and $\theta_{Q1-Q2}(t_Q)$ in the target and calibration locations respectively. Note that these measurements may be made at and referred to different times.

The change in phase due to any difference in the measurement reference times for the target and calibration measurements, as a consequence of the difference frequency.

The variation of phase with location, according to the difference in the elliptic-hyperbolic relationships for the pair of locations $$\left(\frac{d_{BP}}{\lambda_2} - \frac{d_{AP}}{\lambda_1}\right) - \left(\frac{d_{BQ}}{\lambda_2} - \frac{d_{AQ}}{\lambda_1}\right)$$

An aggregate integer ambiguity

Doppler Shift

As is well-known, the rate of change in phase—the so-called Doppler shift in the carrier frequency—may be used to estimate movement. We establish here that we can use the combination of measurements of signals at different frequencies to estimate movement.

In this case the received signal phase is continuously changing, at the difference frequency between the carrier signals from the two sources. Nevertheless, in addition any movement introduces an additional Doppler shift and phase change as a result of the movement and change in location, resulting in a change in the phase of the difference signal.

We will speak here about the estimation of movement of the receiver, however the concept can be generalised to include movement by one of the sources (that is, transmitters) or estimation of timing-drift or frequency offsets.

When the sources are at different frequencies, the observed signals from each source are affected by movement, and the receiver observes a Doppler shift. As discussed above, each signal can be measured:

$$\frac{\varphi_i}{2\pi} = \frac{d_i}{\lambda_i} + N_i$$

$$\frac{\varphi_j}{2\pi} = \frac{d_j}{\lambda_j} + N_j$$

We could analyse this in terms of the change in distance to each source, and the corresponding change in phase, using $$\frac{\partial \Delta\varphi_{ij}}{\partial (d_i)} = \frac{2\pi}{\lambda_i}$$

and $$\frac{\partial \Delta\varphi_{ij}}{\partial (d_j)} = \frac{2\pi}{\lambda_j}$$

These phase measurements may be combined and used by a positioning engine to estimate the change in range to the base station, the receiver position, and hence its movement.

Following the same approach as above when using the phase for positioning purposes, the variation can be decomposed into an elliptical sum variation and a hyperbolic difference variation. This then provides us with a local orthogonal basis for understanding the variation in phase according to the movement, depending on direction.

The received phase depends on the distance from the source, so to analyse the way in which the phase and phase difference change with location, we need to establish the way in which the distance to the sources changes with location. We will consider this, resolved into the components of constant distance difference, along the hyperbolae of constant distance sum, along the ellipses.

Figure 19C:
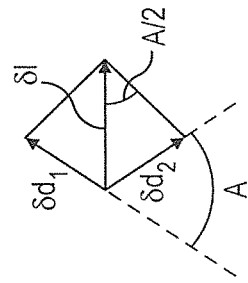
FIG. 19 illustrates the geometrical situation for Doppler measurements from two sources.
Figure 19B:
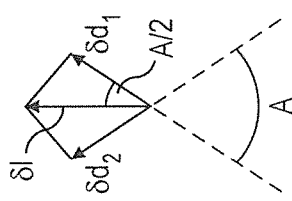
Figure 19A:
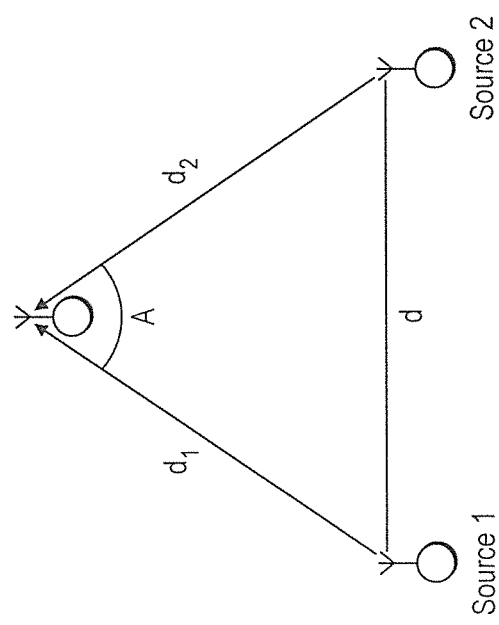

At any particular location the hyperbolic and elliptic curves cross at 90°, and so provide an orthogonal basis. The geometrical situation in a particular location is as shown in FIG. 19, and we consider movement by a distance δl in each of two orthogonal directions—along the hyperbola and along the ellipse.

As will be seen, the angle of separation A between the signals from the two sources plays an important role. The general geometrical situation, for a receiver at an arbitrary measurement point P, is described by the triangular relationship $$d^2 = d_1^2 + d_2^2 - 2d_1 d_2 \cos A$$

with a separation angle A, so that $$\cos A = \frac{d_1^2 + d_2^2 - d^2}{2 d_1 d_2}$$

As will be seen, the separation angle decreases when the receiver is distant from the sources, and when the sources are in line. Consider now a small movement, and the distance moved from the sources in each of the two cases.

For the case of constant difference, the movement is along the hyperbola, with $\delta d_1 = \delta d_2$. Then the situation is as shown in FIG. 19(b), and $$\delta d_1 = \delta d_2 = \delta l \cos\frac{A}{2}$$

and, as we shall use later $$\delta(d_1 + d_2) = 2 \cdot \delta l \cos\frac{A}{2}$$

For the case of constant sum, the movement is along the ellipse, with $\delta d_1 = -\delta d_2$. Then the situation is then as shown in FIG. 19(c), and $$\delta d_1 = -\delta d_2 = \delta l \sin\frac{A}{2}$$

and, as we shall use later $$\delta(d_1 - d_2) = 2 \cdot \delta l \sin(A/2)$$

We are now able to include the effect of the phase change of the signal from each source. Our starting point, putting on one side the calibration and ambiguity terms (which anyway drop out due to the difference taken) is $$\frac{\Delta\varphi_{ij}}{2\pi} = \frac{f_i + f_j}{2c}(d_i - d_j) + \frac{f_i - f_j}{2c}(d_i + d_j)$$

For convenience we define the wavelength $\overline{\lambda}_{ij}$ for the average frequency $$\overline{\lambda}_{ij} = \frac{c}{(f_i + f_j)/2}$$

and the wavelength $\lambda_{ij}^\Delta$ for the half difference frequency $$\lambda_{ij}^\Delta = \frac{c}{(f_i - f_j)/2}$$

so that $$\frac{\Delta \varphi_{ij}}{2\pi} = \frac{(d_i - d_j)}{\overline{\lambda}_{ij}} + \frac{(d_i + d_j)}{\lambda_{ij}^\Delta}$$

Using the sum and difference approach, Doppler shift caused by motion can be expressed in the orthogonal radial and transverse directions. Radially along the hyperbolae (so orthogonal to the ellipses) this gives $$\frac{\partial \Delta \varphi_{ij}}{\partial (d_i + d_j)} = \frac{2\pi}{\lambda_{ij}^\Delta}$$

with $(d_i - d_j)$ held constant
so then the radial variation of phase difference with movement along the hyperbola is $$\frac{\partial \Delta \varphi_{ij}}{\partial l} = \frac{\partial \Delta \varphi_{ij}}{\partial (d_i + d_j)} \cdot \frac{\partial (d_i + d_j)}{\partial l}$$

$$\frac{\partial \Delta \varphi_{ij}}{\partial l} = \frac{2\pi}{\lambda_{ij}^\Delta} \cdot 2\cos\frac{A}{2}$$

The radial change as a result of movement along a hyperbola therefore is fundamentally that of the wavelength of the difference frequency, $$\lambda_{ij}^\Delta = \frac{f_i - f_j}{2c},$$

scaled by a factor which varies somewhat according to the angle of separation to the sources, according to $$2\cos\frac{A}{2}.$$

The source separation factor is unity at small separation angles between the sources, dropping to a factor A and ultimately to zero as the receiver comes between the two sources and the angle of separation to increases $A \rightarrow \pi$. This effect only occurs because there is a difference in frequency.

Meanwhile, transversely, along the ellipses (and orthogonal to the hyperbolae) the change is $$\frac{\partial \Delta \varphi_{ij}}{\partial (d_i - d_j)} = \frac{2\pi}{\overline{\lambda}_{ij}}$$

with $d_i + d_j$ held constant
so that the transverse variation of phase difference with movement along the ellipse is $$\frac{\partial \Delta \varphi_{ij}}{\partial l} = \frac{2\pi}{\overline{\lambda}_{ij}} \cdot 2\sin\frac{A}{2}$$

The transverse change as a result of movement along an ellipse, across the hyperbolae, is fundamentally that of the wavelength of the average frequency, $$\overline{\lambda}_{ij} = \frac{f_i + f_j}{2c},$$

scaled with a factor 2 sin $$\frac{A}{2}$$

which vanes according to the angle of the separation of the sources. At large angles $A \rightarrow \pi$ between the sources the variation is a factor of 2, as both the sources contribute to the variation, while at small angles it decreases to a factor of A and ultimately to zero as the two sources become close together and effectively indistinguishable. This effect only occurs because the sources are separated in distance.

Figure 20:
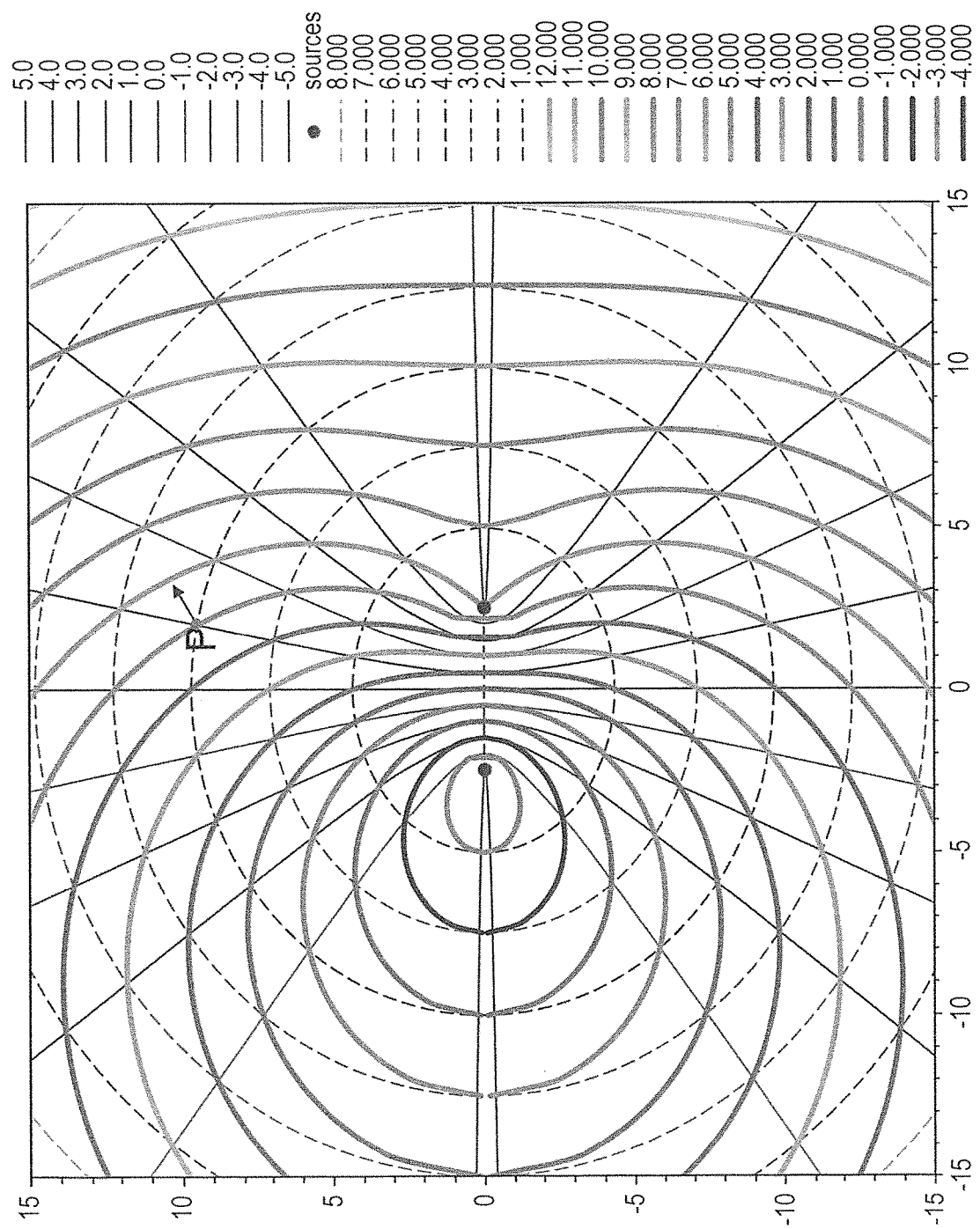
FIG. 20 is a plot showing a combination of radial and transverse variations in phase.
Figure 21:
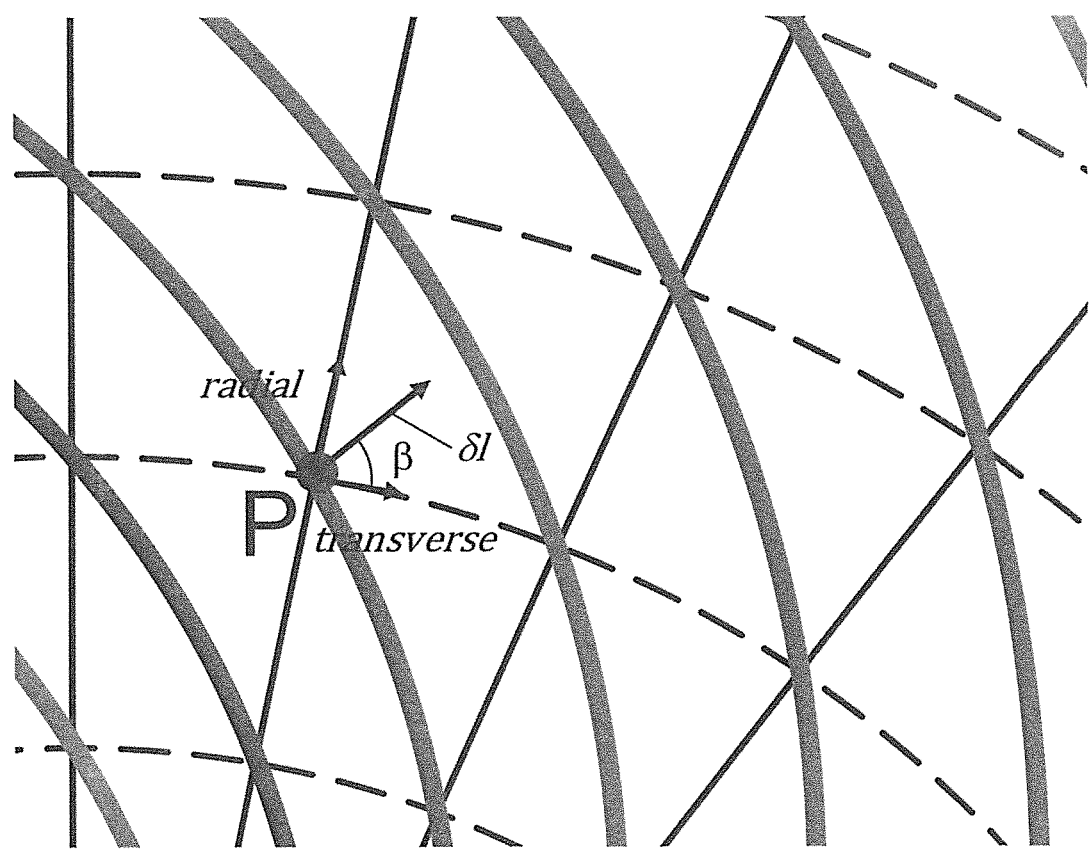
FIG. 21 shows the change in phase difference at $t_0$ due to the radial and transverse components along the hyperbolic and elliptic curves respectively.

The combination of the radial and transverse variations is illustrated in FIG. 20, together with an indication of the direction of maximum rate of change of phase at point P. This plot is an example of the curves of constant phase offset at the measurement reference time $t_P$. In general the change in phase due to a movement $\delta l$ at location P is a combination of the radial and the transverse components, which we can set up as shown in FIG. 21.

If the receiver moves along the curve of constant phase for the combination at the measurement reference time, then there is zero net Doppler. This occurs when the direction is such that the radial and transverse changes balance, that is in a direction $\beta_0$ relative to the ellipse curves, $$\frac{1}{\lambda_{ij}^\Delta} \cdot \cos\frac{A}{2} \cdot \sin\beta_0 = -\frac{1}{\overline{\lambda}_{ij}} \cdot \sin\frac{A}{2} \cdot \cos\beta_0.$$

$$\tan\beta_0 = -\frac{\lambda_{ij}^\Delta}{\overline{\lambda}_{ij}} \tan\frac{A}{2}$$

Note that, over time, a receiver moving along this curve will still experience a rate of change of phase. This rate of change of phase corresponds to the difference frequency between the sources, just as is experienced by a device which is stationary. As long as the receiver moves along a particular elliptic-hyperbolic curve it is unaffected by the movement of the receiver. However, movement off this elliptic-hyperbolic curve, in a direction towards or away from the higher frequency source, will respectively increase the observed rate of change (positive net Doppler) or decrease it (negative net Doppler).

Normally the wavelength of the average signal is much smaller than the wavelength of the difference signal, so $\overline{\lambda_{ij}} \ll \lambda_{ij}^\Delta$ and $\beta_0$ approaches $$\frac{\pi}{2}.$$

As the separation angle between the sources decreases, at a distance from the sources or towards the end zones, either side of the sources, then the angle of the equal phase curve decreases and becomes progressively closer to the line of the ellipses.

The maximum rate of change of phase at P is along the direction perpendicular to the curve of equal phase, i.e. at $$\beta_{max} = \beta_0 + \frac{\pi}{2}.$$

The maximum rate of change is then $$\frac{\partial \Delta \varphi_{ij}}{\partial l} = \frac{2\pi}{\lambda_{ij}^\Delta} \cdot 2\cos\frac{A}{2} \cdot \sin\left(\beta_0 + \frac{\pi}{2}\right) + \frac{2\pi}{\overline{\lambda_{ij}}} \cdot 2\sin\frac{A}{2} \cdot \cos\left(\beta_0 + \frac{\pi}{2}\right)$$

$$\frac{\partial \Delta \varphi_{ij}}{\partial l} = \frac{2\pi}{\lambda_{ij}^\Delta} \cdot 2\cos\frac{A}{2} \cdot \cos(\beta_0) - \frac{2\pi}{\overline{\lambda_{ij}}} \cdot 2\sin\frac{A}{2} \cdot \sin(\beta_0)$$

In the region between the sources, where $A \to \pi$, and also $$\beta_0 \to \frac{\pi}{2},$$

the maximum is $$\frac{\partial \Delta \varphi_{ij}}{\partial l} = 2\frac{2\pi}{\overline{\lambda_{ij}}},$$

while when the angle of separation A is small then also $\beta_0 \to 0$ and $$\frac{\partial \Delta \varphi_{ij}}{\partial l} = 2\frac{2\pi}{\lambda_{ij}^\Delta}.$$

Having information from:
measurements of observed change in phase difference, $$\frac{\partial \Delta \varphi_{ij}}{\partial t}$$

and
knowledge of the variation of $\Delta \varphi_{ij}$ with location and in particular the variation of $$\frac{\partial \Delta \varphi_{ij}}{\partial l}$$

at P, and the direction $\beta_0$
the positioning engine can solve for $\partial l$ and $\beta$ in the period $\partial t$ and estimate the movement of the receiver, both the speed $$\frac{\partial l}{\partial t}$$

and the direction $\beta$, relative to the direction of the ellipse at P. This assumes that the drift in the source and receiver oscillators is small, compared with the effect of movement, and this assumption will often be true. However, it is not a necessary condition, and in a similar manner as for position and time estimation, and as is normal for Doppler processing with sources on the same frequency, with sufficient measurements and sufficiently numerous sources, parameters such as the drift in the local oscillator and in the sources can also be estimated.

EMBODIMENTS

Figure 11:
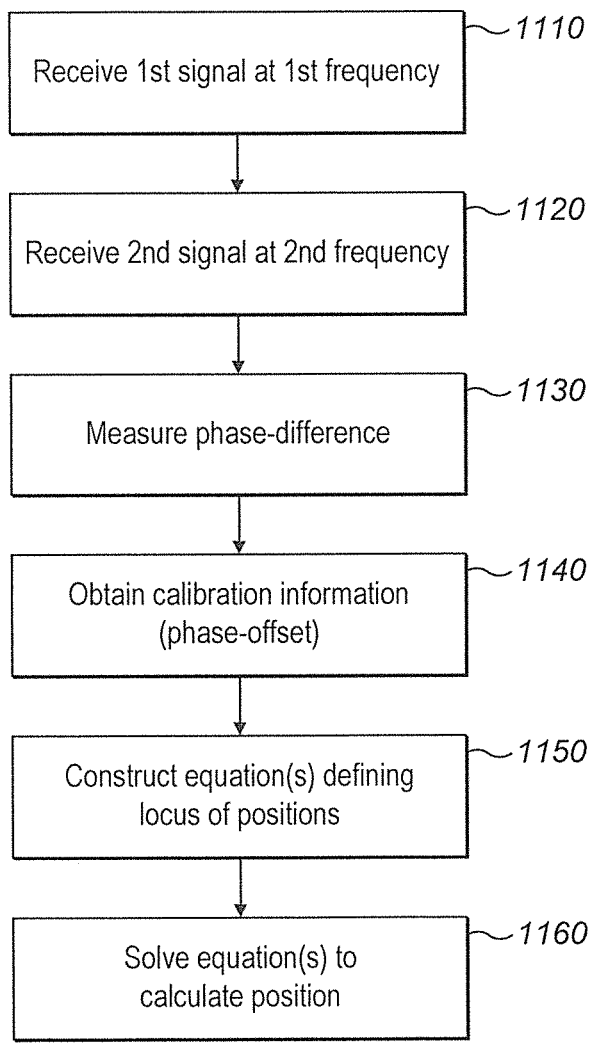
FIG. 11 is a flowchart illustrating a method for assisting a determination of a position of a receiver, according to an embodiment of the first aspect.
Figure 12:
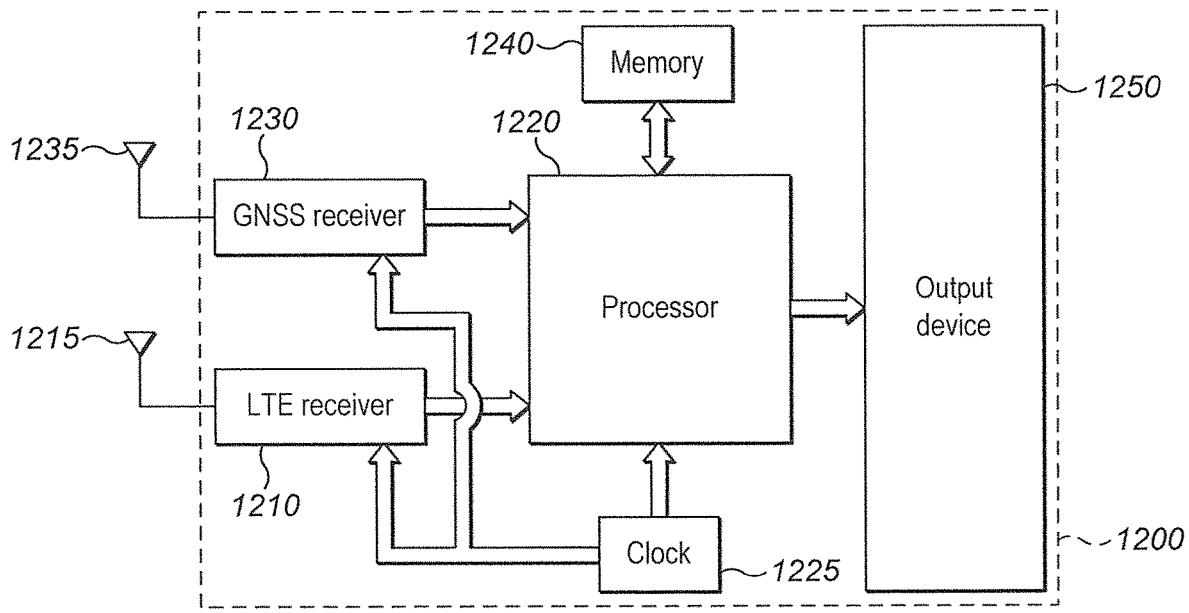
FIG. 12 is a block diagram illustrating an electronic device configured to be used in embodiments of various aspects.

FIG. 11 is a flowchart illustrating a method for assisting a determination of the position of a receiver, according to an embodiment of the first aspect. According to this embodiment, the method is performed by an electronic device 1200. FIG. 12 is a block diagram of this device. The electronic device 1200 comprises a receiver 1210 that is adapted to receive signals from LTE base stations. It is coupled to an associated antenna 1215. The electronic device 1200 also comprises a GNSS receiver 1230, adapted to receive satellite positioning signals via the associated antenna 1235. Both of the receivers 1210 and 1230 are coupled to a processor 1220, which is adapted to process and analyse the received signals. A clock 1225 is provided, coupled to the processor 1220, for providing a local timing reference for measurements of time and phase of the received signals. The reference oscillator of the clock 1225 preferably also drives frequency synthesisers (not shown) in the GNSS receiver 1230 and LTE receiver 1210. This means that the phases of the local oscillators in the respective receivers are linked and have a predictable relationship over time. The processor 1220 is also coupled to a memory 1240, which can be used to store calibration information for use in the position calculation. The electronic device 1200 further comprises an output device 1250, such as a display screen, for outputting the calculated position information. The electronic device 1200 may be a portable electronic device such as a portable navigation device or a mobile communications device (for example, a smart phone).

For the purposes of the following description, the LTE receiver 1210 and the GNSS receiver 1230 will be considered as a single, combined "receiver" that is capable of receiving both cellular communication signals and satellite positioning signals. Thus, references to "receiving" signals at the "receiver" can refer to either type of signal received by either receiver and references to the "position of the receiver" refer to the position of the electronic device 1200 since both the LTE receiver 1210 and the GNSS receiver 1230 are located within this device. In other words, the small difference in position between the LTE antenna 1215 and the GNSS antenna 1235 can be neglected for the present purposes.

At step 1110, the receiver 1210, 1230 receives, at a first time, a first radio signal transmitted by a first transmitter 110 (see FIG. 1). At step 1120, the receiver 1210, 1230 receives, at a second time, a second radio signal transmitted by a second transmitter 120. The first transmitter 110 and the second transmitter 120 are at different locations and the first signal is transmitted at a first frequency that is different from a second frequency of the second signal. The first and second signals may be two satellite positioning signals from different satellites transmitting at different frequencies (both received by the GNSS receiver 1230). Alternatively, the first and second signals may be two LTE signals received from different base stations operating on different channels (both received by the LTE receiver 1210). In still another alternative, one signal is received via the LTE receiver 1210 and the other signal is received via the GNSS receiver 1230.

In step 1130, the processor 1220 compares a first phase of the first signal with a second phase of the second signal to produce a phase-comparison referred to a measurement reference time. In the present embodiment, this comprises measuring or calculating the phase-difference between the two received signals. In step 1140, the processor 1220 obtains calibration information to be used in the position calculation. The calibration information comprises a phase-offset between the signal transmitted by the first transmitter 110 and the signal transmitted by the second transmitter 120, at a calibration reference time. The calibration information therefore defines a phase relationship between the two transmitters' signals at the calibration reference time. To the extent that the two transmitters are stable with respect to one another (that is, to the extent that their timing and frequency do not drift relative to one another) the phase relationship will evolve in a predictable way. Therefore, knowing the phase relationship at the calibration reference time effectively allows it to be predicted at a future (or past) time. The calibration information may be stored in the memory 1240 of the electronic device 1200 or it may be retrieved from a remote server 1500, where it is stored in a database 1510. The electronic device 1200 can communicate with the server 1500 over a suitable communications network, including but not limited to a mobile communications network such as an LTE network or the internet.

In step 1150, the processor 1220 constructs a first equation that relates the measured phase-difference to the distances between the receiver and the respective transmitters. This equation defines a locus of positions at which the receiver 1210, 1230 could be located, based on the phase-difference that has been measured. The first equation includes a term relating to time—that is, relating to the measurement reference time. In the present embodiment, it is assumed that the two signals are received by the measurement receiver at the same instant; therefore, the first time and second time are the same time (which can conveniently be used as the measurement reference time). The first equation preferably also includes a term relating to the calibration information (phase-offset) and its calibration reference time.

In step 1160, the processor 1220 solves the first equation to calculate the position of the receiver 1210, 1230. Typically, the first equation cannot be solved in isolation—some additional information is needed to produce a unique solution. This additional information may be obtained by measuring phase-differences for other pairs of transmitters whose signals are received by the receiver 1210, 1230. In other words, steps 1110 to 1150 may be repeated for other pairs of transmitters. This leads to a set of simultaneous equations which may be solved together to calculate a unique position solution. Alternatively or in addition, the phase-difference information may be supplemented by or combined with other sources of positioning information, including but not limited to: satellite pseudoranges; beacon-based position information (in which position information can be deduced by detecting signals from one or more radio beacons such as wireless network base stations); and ranging information or direction of arrival information from so-called "signals of opportunity", such as digital video or digital audio broadcasts or mobile communication signals. Other suitable sources of positioning information and means of combining positioning information will be known to those skilled in the art.

The first equation (and optionally any further equations based on phase-differences between other pairs of transmitters) is/are preferably based on one of the difference equations discussed in detail already, above. Note that it is not essential that the first signal and the second signal are received concurrently (because the first equation can take account of the first time and the second time being different). However, since the method relies on comparing the phases of the two signals, their relative timing should be recorded implicitly or explicitly—particularly if the signals were not received concurrently. This means that the first time and the second time (and/or a difference between them) are preferably recorded and used in the calculation.

Figure 13:
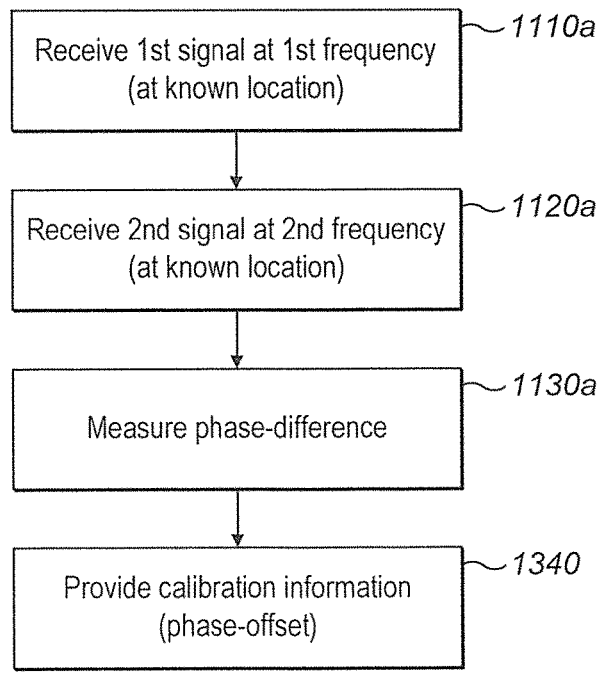
FIG. 13 is a flowchart illustrating a method of producing calibration information, according to an embodiment of the second aspect.

FIG. 13 is a flowchart of a method according to an embodiment of the second aspect. This is a method of producing calibration information (such as phase-offsets) for use in the method of FIG. 11. In step 1110a, the receiver 1210, 1230 receives, at a first time, a first radio signal transmitted by a first transmitter 110. In step 1120a, the receiver 1210, 1230 receives, at a second time, a second signal from a second transmitter 120. These steps are substantially similar to steps 1110 and 1120 in the method of FIG. 11, with the principle difference being that, in the method of FIG. 13, the position of the receiver 1210, 1230 (that is, the position of the electronic device 1200) is known. Furthermore, the time at the receiver is known relative to the times at the two transmitters. Thus, the signals are received at a known calibration location at a known calibration time.

In step 1130a, the processor 1220 compares a first phase of the first signal with a second phase of the second signal to determine a phase-offset between the signals at the known calibration time. Again, this step is similar to step 1130 of FIG. 11. In step 1130, the phase-difference was measured in order to determine the position of the electronic device 1200; in step 1130a the phase-difference is measured to determine the phase-offset between the two transmitters at the calibration reference time (which, in this embodiment, can conveniently be chosen to be the known calibration time at which the signals were received). In step 1340, the processor provides the calibration information for subsequent use in a method according to FIG. 11. The calibration information may be stored by the processor 1220 in the memory 1240 or it may be submitted to a server 1500 for storage in a database 1510 of calibration information. If it is stored in the memory 1240 it may be available for use by the same electronic device 1200 by which is was created. If it is stored in the remote database 1510, it may be available for use by other electronic devices. Preferably, the calibration information explicitly includes the calibration reference time to which the phase-offset refers. As mentioned above, the calibration reference time may be the time at which the phase-offset was observed—that is, the calibration reference time may be the same as the known calibration time—although this is not essential. Alternatively, in some embodiments, all phase-offsets may be referred to a universally fixed reference time—for example, GPS time zero. In this case, it may not be necessary to record the calibration reference time explicitly, because it is understood implicitly.

The calibration information may be produced by the same receiver 1200 that makes the phase measurements in the method of FIG. 11. Alternatively, these may be different receivers (like the receivers P and Q in FIG. 18). The calibration location and time may be determined in any suitable way—including but not limited to the use of GNSS positioning techniques. In some embodiments, the known calibration location is also included in the calibration information.

Figure 14:
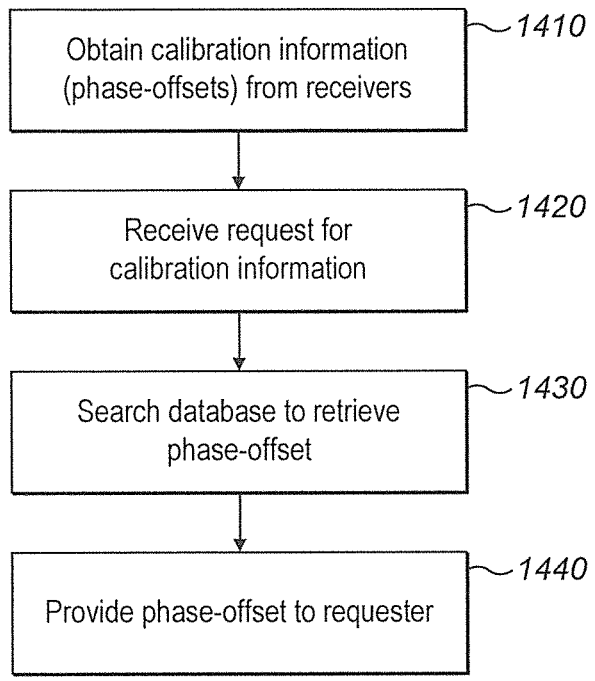
FIG. 14 is a flowchart illustrating a method of providing calibration information, according to an embodiment of the third aspect.
Figure 15:
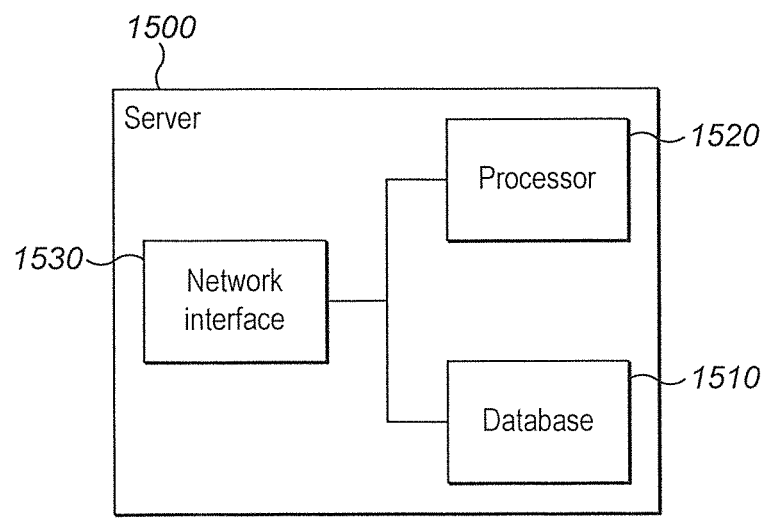
FIG. 15 is a block diagram of a server computer configured to be used in an embodiment of the third aspect.

FIG. 14 is a flowchart illustrating a method of maintaining and providing calibration information according to an embodiment of the third aspect. FIG. 15 is a block diagram of a server 1500 adapted to perform the method of FIG. 14. The server 1500 comprises a database 1510; a processor 1520; and a network interface 1530, coupled to one another via a bus. The network interface is coupled to a communications network (not shown) for obtaining calibration information from electronic devices and providing calibration information to those devices (or other devices), upon request. The calibration information is stored in the database 1510. The processor 1520 is configured to process the calibration information and search the database 1510 for calibration information, in response to receipt of a request.

In step 1410, the processor maintains the database 1510 of calibration information. The calibration information comprises phase-offsets between pairs of transmitters with associated calibration reference times, as described already above. This calibration information can be produced by a plurality of receivers in electronic devices operating according to the method of FIG. 13. The step 1410 of maintaining the database 1510 comprises obtaining calibration information (that is, phase-offsets, optionally together with their associated calibration reference times) from the electronic devices, along with information identifying the respective pairs of transmitters to which the phase-offsets relate. In step 1420, the processor 1520 receives a request for calibration information from one of the electronic devices 1200 via the network interface 1530. The request identifies a pair of transmitters whose phase-offset is required in order to calculate the position of the electronic device 1200. In response to the request, at step 1430, the processor 1520 searches the database 1510 to retrieve the requested phase-offset information. Once retrieved, the phase-offset information is provided to the requesting electronic device 1200 in step 1440 (preferably together with the calibration reference time that is associated with the phase-offset, which is preferably recorded in the database as part of the calibration information).

The database 1510 may store calibration information for pairs of transmitters of a variety of diverse types. These may include mobile communications base stations controlled by various different network operators as well as satellites of multiple different GNSS constellations. In general, the greater the diversity of transmitters and transmitter types, the more useful the calibration information may be for positioning. Therefore, the database 1510 is preferably not limited to describing transmitters of a single network operator or a single satellite positioning system.

Figure 16:
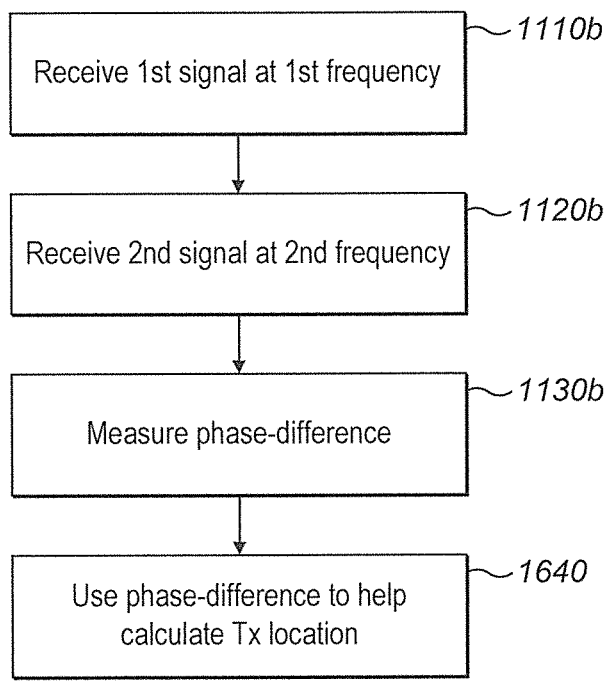
FIG. 16 is a flow chart illustrating a method for assisting a calculation of the location of a transmitter, according to an embodiment of the first aspect.

In the method of FIG. 11, described above, it is assumed that the locations of the first and second transmitters 110, 120 are known. This is not essential in all circumstances; however, it is desirable in many situations. FIG. 16 illustrates a method of assisting in the calculation of transmitter locations according to an embodiment of the first aspect. The calculated transmitter locations can then be used in embodiments of the method of FIG. 11.

In step 1110*b*, the receiver 1210, 1230 receives, at a first time, a first radio signal transmitted by the first transmitter 110. In step 1120*b*, the receiver 1210, 1230 receives, at the second time, a second signal transmitted by the second transmitter 120. The steps 1110*b* and 1120*b* are similar to the steps 1110 and 1120, respectively, in the method of FIG. 11. In step 1130*b*, the processor 1220 compares a phase of the first signal with a phase of the second signal by measuring or calculating the phase-difference between them at a measurement reference time. This may be the first time, the second time, or another convenient time such as the midpoint time or some other reference, with the difference phase adjusted accordingly. This step is similar to step 1130 in the method of FIG. 11. In step 1640, the processor 1220 uses the measured phase-difference from step 1130*b*, together with the measurement reference time, to calculate the location of the first transmitter 110. This is similar to the method used to calculate the position of the receiver in the embodiment of FIG. 11. A similar set of equations is constructed (as discussed in greater detail above) and the set of equations is then solved. The principle difference is that instead of the position of the receiver 1210, 1230 being unknown, the location of the first transmitter 110 is unknown. When calculating the location of a transmitter in this way, it may be preferable for the location of the receiver 1210, 1230 (of the electronic device 1200) to be known. However, this is not essential, provided that sufficient sources of information are available. In general, the set of simultaneous equations will be possible to solve if there are more equations than unknown variables in the equations. Although the foregoing example refers to calculating the location of the first transmitter, those skilled in the art will appreciate that the location of the second transmitter may be calculated in a similar way.

Thus, methods according to the first aspect can be used to calculate the position of the receiver or to calculate the position of either one of the transmitters.

In the embodiments described above, the ultimate goal of each method was to calculate the position of a receiver 1210, 1230 in an electronic device 1200 or to calculate the location of a transmitter 110, 120, with the time being known in each example embodiment. However, it is also possible to calculate time in a similar way. For example, the method of FIG. 11 can be adapted so that the time is one of the unknown variables in the system of simultaneous equations constructed in step 1150. This may be instead of or in addition to the position of the receiver 1210, 1230 being unknown. Likewise, the method of FIG. 16 can be adapted to calculate the time at the transmitter. In the same way that methods of calculating position are useful, to determine the precise position of an electronic device 1200 or transmitter 110, 120, methods of calculating time are also useful for precise time-synchronisation—both to support accurate positioning and to support other applications. The use of a number of such measurements and equations to jointly estimate both the position and time of the receiver is particularly helpful when the time at the receiver is not known accurately. The value of this can be appreciated when it is realised that, for precise positioning, a clock accuracy comparable to the desired position accuracy (scaled by the speed of light) would be required, which is a demanding and often unrealistic requirement for a small, inexpensive or mobile device.

The embodiments described above have each used phase difference as the operative measurement for assisting positioning or timing calculations. This may be advantageous—as explained already above, it may be possible in certain circumstances to measure phase-difference without needing to directly measure the individual phases of the carrier signals concerned—however, it is not essential. In other embodiments, individual phase measurements may be used instead of phase differences. In these embodiments, the comparison of phases may be implicit rather than explicit. An implicit comparison may involve individual phase measurements being incorporated in a system of equations that may be solved for position and/or time, without needing to explicitly form a phase difference or other phase comparison.

One example of such an embodiment is a variant of the method illustrated in FIG. 11. In this variant, instead of producing a phase difference in step 1130, the processor 1220 forms phase information comprising the first phase of the first signal and the second phase of the second signal. This phase information, together with an associated measurement reference time, is used in steps 1150 and 1160 to calculate the position.

The calibration information obtained by the processor 1220 in step 1140 may comprise a phase of the first wireless signal and a phase of the second wireless signal at respective calibration reference times, instead of a phase-offset.

This type of calibration information can be produced, according to the second aspect, in a variant of the method of FIG. 13. In this variant, instead of determining a phase-offset between the signals, the processor 1220 simply records the first phase of the first signal and the second phase of the second signal, along with the calibration reference time at which they were measured (or with respective first and second calibration reference times, if they were measured at two different times).

Similarly, this type of calibration information can be shared, according to a third aspect, using a variant of the method illustrated in FIG. 14. Instead of the calibration information in the database 1510 comprising phase-offsets, it comprises the individual phases of the respective transmitted signals at respective calibration reference times. In step 1430, when the processor 1520 searches the database 15 tend to retrieve the calibration information, it retrieves the individual phases for the respective transmitters, instead of the phase-offset between their signals.

Subject to these variations, the embodiments using individual phases operate in substantially the same way as their counterparts using phase comparisons, described previously above.

Figure 22:
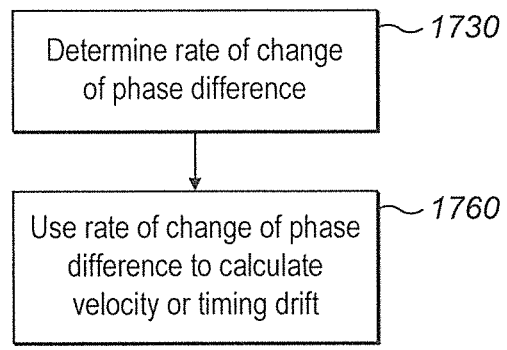
FIG. 22 is a flowchart of a method using Doppler shift to assist in the calculation of velocity or timing drift.

FIG. 22 illustrates a method according to a further aspect, which uses Doppler information to assist in the calculation of a velocity or timing drift. This method is related to the method of the first aspect, in that it uses measurements of phase to determine spatial or temporal information. It may be used in conjunction with the first aspect or may be used independently.

The steps illustrated in FIG. 22 assume that the receiver 1210, 1230 has already received the first wireless signal and second wireless signal (see steps 1110 and 1120 of FIG. 11). In step 1730, the processor 1220 determines the rate of change of the difference between the first phase and second phase. This can be done by determining the rate of change of each phase and determining the difference between these rates. Alternatively, the phase difference between the two phases may be formed, followed by determining the rate of change of the phase difference. Conventional Doppler processing would use only the individual rates of change and normalise these with the wavelength of each signal to obtain expressions for the rate of change of distance for each of the sources. The present inventors have discovered that the application of Doppler techniques to the phase difference, in particular, can produce additional information useful for estimating velocity or timing drift.

In step 1760, the processor 1220 uses the determined rate of change of the phase difference to calculate the velocity or timing drift. This may comprise determining the velocity or timing drift of the receiver, or the velocity or timing drift of one of the transmitters. Instead of normalising according to wavelength, the calculation remains in the phase domain by using the elliptic-hyperbolic relationship and the techniques and equations described previously above for phase difference Doppler processing.

Note that, in general, the method illustrated in FIG. 22 does not require any phase calibration information, or an accurate measurement reference time, because it relies on the change in (derivative of) phase, rather than the phase itself.

An embodiment according to a fourth aspect will now be described with reference to FIG. 23.

In the embodiment of the second aspect (FIG. 13), a method of producing calibration information was described which relied on phase measurements at a known calibration location at a known calibration time. The embodiment of the fourth aspect can be seen as an alternative to the gathering of calibration information as described in the context of the second aspect. However, it is noted that the aspects can also be combined and used together.

Underlying the fourth aspect is the recognition that, instead of making measurements to determine the phase (or phase offset) of a signal that has been transmitted, it is possible to control the phase with which it is transmitted. In a system in which phase is controlled, the calibration information (phase or phase-offset) can be known in advance, and there may be no need for calibration measurements.

Figure 23:
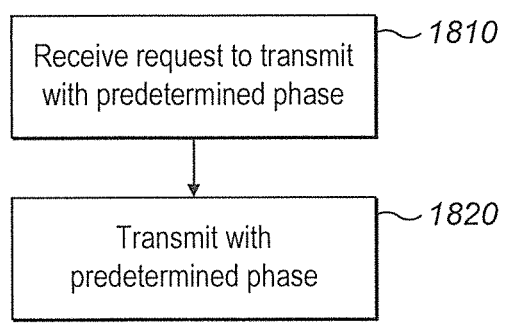
FIG. 23 is a flowchart of a method for transmitting a wireless signal according to an embodiment of the fourth aspect.

FIG. 23 is a method for a transmitter, for transmitting a wireless signal suitable for assisting the determination of position and/or time. In step 1810, the transmitter receives a request to transmit the wireless signal. This request includes a predetermined phase with which the signal is to be transmitted and a predefined time at which the signal is to be transmitted. In step 1820, the transmitter transmits the wireless signal with the requested predetermined phase at the predefined time. Two different transmitters into different locations may be requested to transmit respective wireless signals with respective predetermined phases, in order to support a method of calculating a position and/or time according to the first aspect (see the method of FIG. 11).

The request to transmit the signals may come from a wireless communication device 1200 which wishes to use them for positioning and/or timing calculations. Alternatively, the request may come from a coordinating service supporting a wider system for positioning and/or timing. Such services will be described in greater detail below.

Particularly useful embodiments of the present invention relate to wireless infrastructure networks. As used herein, a "wireless infrastructure network" is defined as a wireless network that is organised in a hierarchical manner, comprising one or more instances of User Equipment (UE), wherein each UE communicates with and is served by a Base Station (BS). The communications between each UE and its serving BS are controlled by the BS. Typically, access to the wireless medium is strictly controlled by the BS, which is responsible for coordinating and orchestrating the PHY and MAC layers. Direct, spontaneous, radio communication between UEs is typically not allowed. Types of wireless infrastructure networks include but are not limited to cellular networks.

Figure 24:
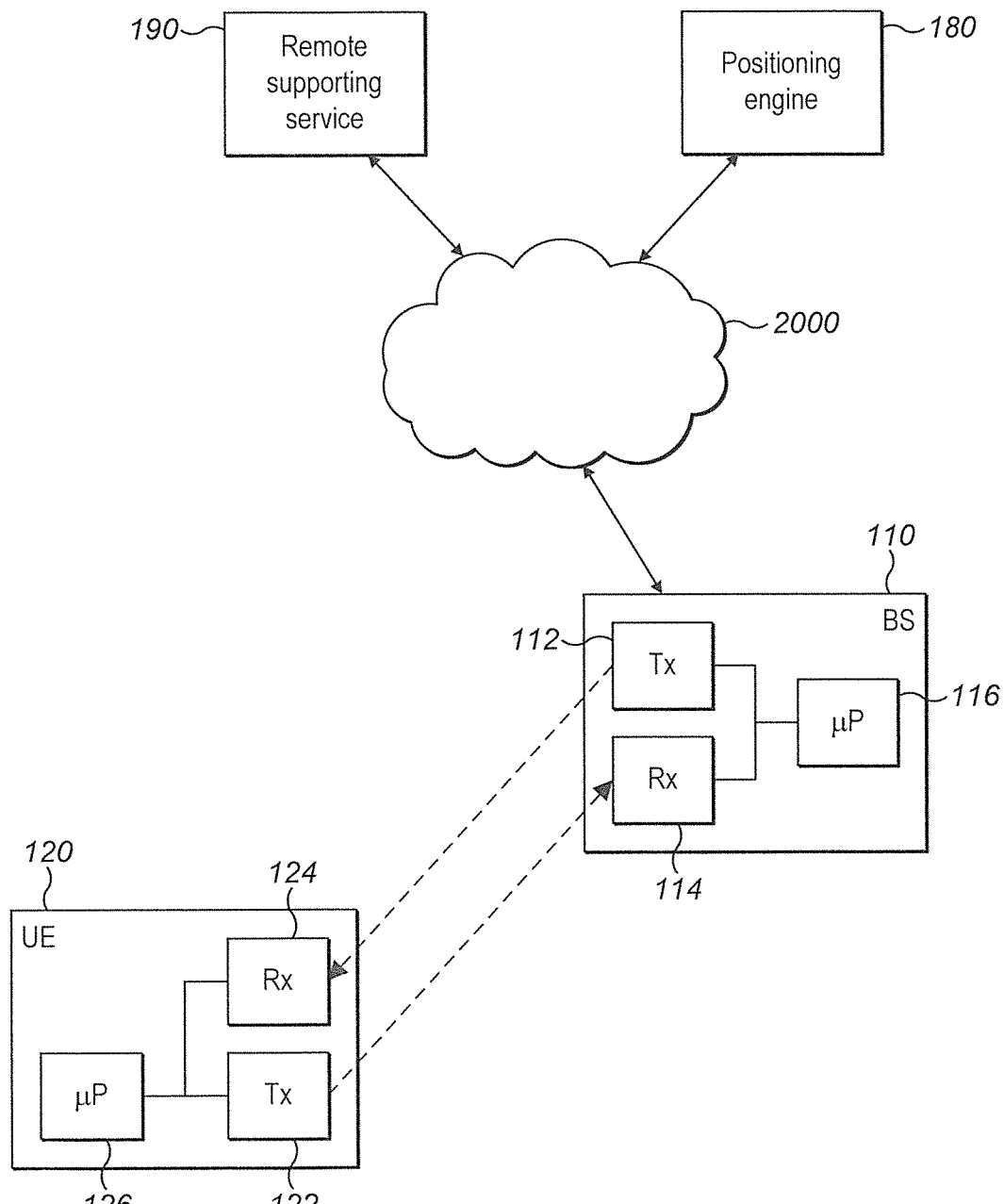
FIG. 24 is a block diagram of a wireless infrastructure network in which embodiments of various aspects are implemented.

Embodiments of various aspects in the context of wireless infrastructure to networks will now be described with reference to FIGS. 24-27. FIG. 24 is a simplified block diagram of a wireless infrastructure network. The present inventors have recognised that the transmitters 110 and 120 in FIG. 1 need not both be BSs. It is also possible to use measurements of phase on an uplink signal from a UE in positioning/timing calculations according to embodiments. In the following description, we describe an example in which the first transmitter 110 is a BS and the second transmitter 120 is a UE. FIG. 24 shows a wireless infrastructure network comprising the BS 110 and UE 120. In many wireless infrastructure networks, the uplink and downlink signals are transmitted on different frequencies. This can provide the frequency separation needed to use the presently described techniques.

The BS 110 comprises a transmitter 112 for transmitting a downlink signal to the UE; a receiver 114 for receiving an uplink signal from the UE; and a processor 116. The UE 120 comprises a transmitter 122 for transmitting the uplink signal to the BS 110; a receiver 124 for receiving the downlink signal from the BS 110; and a processor 126.

The wider system illustrated in FIG. 24 also includes a positioning engine 180, which is a remote server computer configured to calculate a position and/or time. It further includes a remote supporting service 190, which is a remote server computer configured to provide a supporting service for the other devices in the system. Note that, although shown separately, the positioning engine 180 and the remote supporting service 190 may be provided by the same server computer.

In the example shown in FIG. 24, the positioning engine 180 and remote supporting service 190 are coupled to a network 2000. In different embodiments, this may be a public or private, wired or wireless network, or a combination of different networks of different types. For example, the network 2000 may comprise parts of the infrastructure of one or more cellular networks and/or may comprise part of the Internet.

The BS 110 is also coupled to network 2000. The UE 120 is communicatively coupled to the network 2000, the remote supporting service 190, and the positioning engine 180, via the BS 110. In this example, the UE 120 communicates with the remote supporting service 190 and positioning engine 180 using user plane data transmitted via a cellular data connection with the base station 110 and via the network 2000.

According to the present embodiment, a wireless communication device 1200 (not shown in FIG. 24) can intercept the uplink signal from the UE 120 and the downlink signal from the BS 110 and can use phase measurements of these signals in positioning and/or timing calculations according to an embodiment of the first aspect (see FIG. 11). The wireless communication device 1200 can use assistance information to help it intercept these signals. The assistance information may also be useful in the positioning and/or timing calculations. Techniques for generating, sharing, and using assistance information for intercepting signals in wireless infrastructure networks are described in the present applicant's earlier international patent application no. PCT/EP2016/079507, which is incorporated herein by reference.

Figure 25:
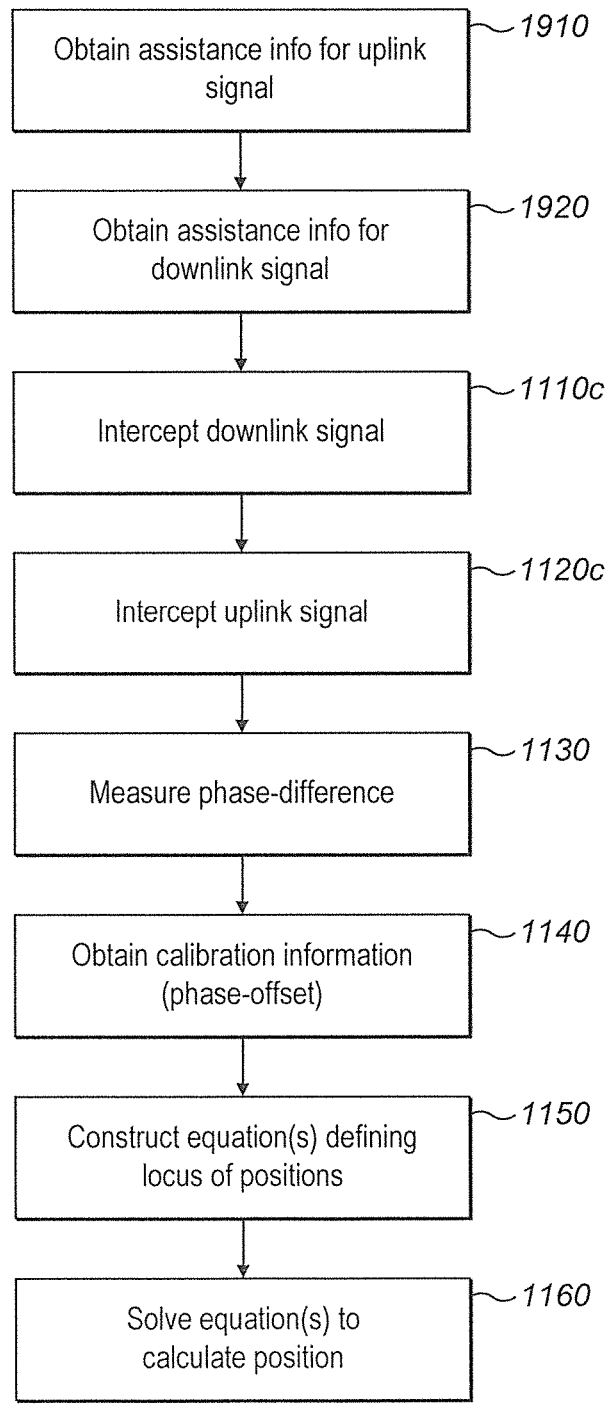
FIG. 25 is a flowchart of a method according to an embodiment of the first aspect, in a wireless infrastructure network.

FIG. 25 is a flowchart of a method according to the first aspect in which the first transmitter is a BS and the second transmitter is a UE. This method is similar to the method of FIG. 11. The following description will focus on the differences. In step 1910, the wireless communication device 1200 receives assistance information to assist the receiver 1210 to intercept the uplink signal transmitted by the transmitter 122 of the UE 120. In step 1920, the wireless communication device 1200 receives assistance information to assist the receiver 1210 to intercept the downlink signal transmitted by the transmitter 112 of the BS 110. General types of assistance information for intercepting uplink and downlink signals are described in PCT/EP2016/079507 and the assistance information obtained in step 1910 and 1920 may include these types. In addition, in particular, the assistance information in the present embodiment comprises phase of the uplink signal at a reference time and a phase of the downlink signal at a reference time. This phase-assistance information may be generated in a number of ways:

> It may be measured—for example, the receiver 114 of the BS 110 may measure the phase of the uplink signal from the UE; and/or the receiver 124 of the UE 120 may measure the downlink signal from the BS.
>
> It may be reported—for example, the UE 120 may report the phase with which it transmitter 122 transmits the uplink signal; and/or the BS 110 may report the phase with which its transmitter 112 transmits the downlink signal.
>
> It may be provided from a controlling service—for example, the remote supporting service 190 may instruct the UE 120 and BS 110 to transmit the uplink and downlink signals, with specific predetermined respective phases at the transmission time.

The phase-assistance information may also be obtained by the wireless communication device 1200 in a number of ways—for example:

> From the remote supporting service 190; or
>
> From the UE 120 and/or BS 110.

Some or all of the phase-assistance information may be sent to the wireless communication device 1200 using user plane data. Alternatively or in addition, some or all of the phase-assistance information may be sent as a control plane message by the wireless infrastructure network. This may be appropriate, in particular, when the wireless communication device 1200 is itself a UE.

In step 1110c, the receiver 1210 of the wireless communication device 1200 intercepts the downlink signal using the assistance information obtained in step 1920. Likewise, in step 1120c, the receiver 1210 intercepts the uplink signal using the assistance information obtained in step 1910. Once the signals have been successfully intercepted, the method proceeds as before in FIG. 11, using phase measurements to calculate a position/time. Note that the assistance information may also be used in steps 1150 and 1160, when calculating the position/time. Indeed, in some cases, the assistance information may include or consist of the calibration information described previously above.

Various adaptations may be made to a conventional UE or BS, to facilitate their use in the present embodiments.

According to an embodiment of a fifth aspect, the processor 126 of the UE 120 is preferably configured to share assistance information with other devices, for use in calculating position and/or time. This assistance information may comprise a phase of the uplink signal transmitted by its transmitter 122. This may be reported either before or after the signal is transmitted. It is preferably accompanied by a reference time, which may be the time at which the transmitter 122 transmitted (or will transmit) the uplink signal having that phase. The assistance information shared by the UE 120 may also include a phase of the downlink signal, as measured at the receiver 124 of the UE 120. Again, this is preferably accompanied by a reference time, indicating the time at which this phase was observed. Alternatively or in addition, the assistance information may comprise a phase offset between the uplink signal and the downlink signal (again, preferably accompanied by the relevant reference time). The individual phases may be used to assist interception of the uplink/downlink signals and/or for positioning/timing calculations. The phase offset may be used for positioning/timing calculations.

According to an embodiment of a sixth aspect, the processor 126 of the UE 120 is configured to receive a request to transmit the uplink signal. The request may include a predetermined phase with which the uplink signal is to be transmitted. The processor 126 is further configured to control the transmitter 122 to transmit the uplink signal in response to the received request with the predetermined phase included in the request. The request preferably also includes a predefined time, which may be the time at which the transmitter 122 is to transmit the uplink signal with the predetermined phase.

Embodiments of the fifth and sixth aspects may be combined. For example, the new UE 120 may have a first mode in which it operates according to the fifth aspect, reporting assistance information for use by other devices; and it may have the second mode in which it operates according to the sixth aspect, receiving instructions to transmit an uplink signal with a predetermined phase. Even when instructed, as in the sixth aspect, it may be beneficial for the UE 120 to share the phase of the signal it has transmitted, as assistance information—for example, as a confirmation to other devices that the signal was indeed transmitted as instructed.

According to an embodiment of a seventh aspect, the processor 116 of the BS 110 is configured to share assistance information with other devices, for use in calculating position and/or time. This assistance information may comprise a phase of the downlink signal transmitted by its transmitter 112. This may be reported either before or after the signal is transmitted. It is preferably accompanied by a reference time, which may be the time at which the transmitter 112 transmitted (or will transmit) the downlink signal having that phase. The assistance information shared by the BS 110 may also include a phase of the uplink signal, as measured at the receiver 114 of the BS 110. Again, this is preferably accompanied by a reference time, indicating the time with which this phase is associated. Alternatively or in addition, the assistance information may comprise a phase offset between the uplink signal and the downlink signal (again, preferably accompanied by the relevant reference time). The individual phases may be used to assist interception of the uplink/downlink signals and/or for positioning/timing calculations. The phase offset may be used for positioning/timing calculations.

According to an embodiment of an eighth aspect, the processor 116 of the BS 110 is configured to receive a request to transmit the downlink signal. The request may include a predetermined phase with which the downlink signal is to be transmitted. The processor 116 is further configured to control the transmitter 112 to transmit the downlink signal in response to the received request with the predetermined phase included in the request. The request preferably also includes a predefined time, which may be the time at which the transmitter 112 is to transmit the downlink signal with the predetermined phase.

As with the fifth and sixth aspects, embodiments of the seventh and eighth aspects may be combined.

Figure 26:
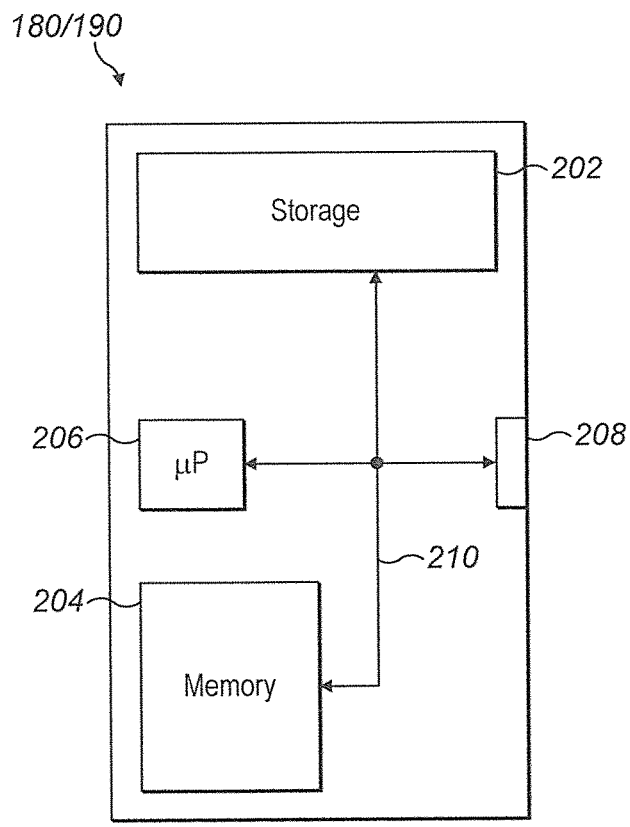
FIG. 26 is a block diagram of an exemplary server computer according to an embodiment.

FIG. 26 is a block diagram of an exemplary server computer according to an embodiment. This may implement the functions of the positioning engine 180 and/or the remote supporting service 190. For simplicity, it will be assumed below that both the remote server 180 and the remote supporting service 190 are implemented by the same server computer. Of course, this is not essential and the scope of the invention is not limited in this way.

The exemplary server 180/190 comprises a computer-readable storage medium 202, a memory 204, a processor 206 and one or more interfaces 208, which are all linked together over one or more communication busses 210. The exemplary server 180/190 may take the form of a conventional computer system, such as, for example, a desktop computer, a personal computer, a laptop, a server, a mainframe computer, and so on.

The computer-readable storage medium 202 and/or the memory 204 may store one or more computer programs (or software or code) and/or data. The computer programs stored in the computer-readable storage medium 202 may include an operating system for the processor 206 to execute in order for the server 180/190 to function. The computer programs stored in the computer-readable storage medium 202 and/or the memory 204 may include computer programs according to embodiments of the invention or computer programs that, when executed by the processor 206, cause the processor 206 to carry out a method according to an embodiment of the invention The processor 206 may be any data processing unit suitable for executing one or more computer readable program instructions, such as those belonging to computer programs stored in the computer-readable storage medium 202 and/or the memory 204. As part of the execution of one or more computer-readable program instructions, the processor 206 may store data to and/or read data from the computer-readable storage medium 202 and/or the memory 204. The processor 206 may comprise a single data processing unit or multiple data processing units operating in parallel or in cooperation with each other.

The one or more interfaces 208 may comprise a network interface enabling the server 180/190 to communicate with the BS 110 across the network 2000. The network may be any kind of network suitable for transmitting or communicating data from one computer system to another. For example, the network could comprise one or more of a local area network, a wide area network, a metropolitan area network, the internet, a wireless communications network, and so on. The server 180/190 may communicate with other computer systems over the network via any suitable communication mechanism/protocol. The processor 206 may communicate with the network interface via the one or more communication busses 210 to cause the network interface to send data and/or commands to another computer system over the network 100. Similarly, the one or more communication busses 210 enable the processor 206 to operate on data and/or commands received by the server 180/190 via the network interface from other computer systems over the network.

It will be appreciated that the architecture of the server 180/190 illustrated in FIG. 2 and described above is merely exemplary and that systems having different architectures using alternative components or using more components (or fewer) may be used instead.

Figure 27:
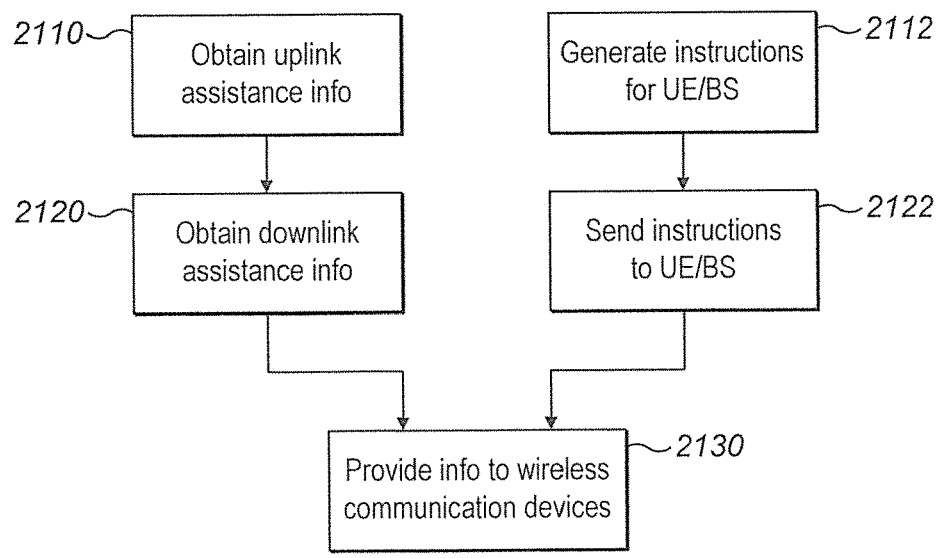
FIG. 27 shows a flowchart of a combined method according to embodiments of the ninth and tenth aspects.

FIG. 27 is a flowchart illustrating methods according to embodiments of ninth and tenth aspects. A method according to an embodiment of the ninth aspect will now be described, with reference to FIGS. 26 and 27.

In step 2110 the processor 206 of the remote supporting service 190 obtains assistance information relating to an uplink signal to be transmitted by the UE 120. In step 2120, the processor 206 obtains assistance information relating to a downlink signal to be transmitted by the BS 110. The contents of the assistance information are as described already above. In step 2130, the processor 206 provides the assistance information to a wireless communication device 1200, to assist it in intercepting the uplink and downlink signals and to assist it in calculating a position or time from phase measurements of those signals. In this example, the processor 206 of the remote supporting service 190 obtains the assistance information from the UE 120 and BS 110. In particular, the remote supporting service 190 may communicate with the UE 120 and BS 110 to request them to send the assistance information to it. Preferably, the remote supporting service 190 requests and collates assistance information from a plurality of UEs and a plurality of BSs, and provides this information to a plurality of wireless communication devices.

Alternatively or in addition to the method of the ninth aspect, the remote supporting service 190 may implement a method according to an embodiment of the tenth aspect. In step 2112, the processor 206 of the remote supporting service 190 generates an instruction for at least one station in a wireless infrastructure network, to cause that station to transmit a wireless signal. In step 2122, the processor 206 sends the instruction to the station. The station may be a BS 110 or a UE 120; and the wireless signal may be a downlink signal or an uplink signal, respectively. The instruction comprises a request to transmit the signal, a predefined time, and a predetermined phase. In response to receiving the instruction, the relevant BS or UE will transmit a downlink or uplink signal having the predetermined phase at the predefined time. In step 2130, the remote supporting service 190 provides the predetermined phase and predefined time to a plurality of wireless communication devices 1200, as assistance information. Preferably, the assistance information is shared with the wireless communication devices before the predefined time at which the uplink or downlink signal is to be transmitted, so as to allow the wireless communication devices to use the assistance information to help intercept the signal.

The positioning engine 180 in FIG. 24 may operate according to an embodiment of an eleventh aspect. As explained already above, the positioning engine 180 may have the exemplary architecture shown in FIG. 26. According to this embodiment, the processor 206 of the positioning engine 180 obtains phase information that has been gathered by wireless communication devices 1200 and uses this phase information, along with the measurement reference time or times with which the phase information is associated, to calculate a position and/or a time. For example, a wireless communication device 1200 that has implemented steps 1110, 1120, and 1130 of FIG. 11 may send a measured phase-difference, along with an associated measurement reference time, to the positioning engine 180. The positioning engine then implements steps 1150 and 1160 of FIG. 11, constructing and solving equations to calculate a position (or time). Thus, a positioning engine 180 according to the eleventh aspect can be used in a distributed implementation of a method according to the first aspect. The positioning engine 180 preferably gathers phase information from a plurality of wireless communication devices 1200. The processor 206 is preferably also configured also obtain calibration information (of the kind described already above) and to use the calibration information together with the phase information and time information to calculate the position or time fix. That is, the positioning engine 180 preferably also implements step 1140 of the method of FIG. 11.

The positioning engine 180 may also implement (in part or in full) the method illustrated in FIG. 22, using Doppler information to calculate a velocity or timing-drift. This may be done independently of the implementation, described above, of positioning and/or timing calculations. In some embodiments the implementation of both calculations may be combined.

According to an embodiment, the processor 206 of the positioning engine 180 obtains information about the rate of change of a phase difference between first and second wireless signals. In other words, the processor 206 obtains the result of step 1730 in FIG. 22. The processor 206 uses the obtained rate of change of phase difference to calculate the velocity or timing drift. That is, the processor 206 implements step 1760. Thus, the positioning engine 180 can be used in a distributed implementation of the method illustrated in FIG. 22.

As used herein, a wireless communication device is an electronic device enabled for wireless communication. The wireless communication device may be a UE for a wireless infrastructure network, but this is not essential.

In general, assistance information, calibration information, and the like may be obtained by the wireless communication device via either wired or wireless communication. Therefore, the wireless communication device preferably comprises a wired or wireless communication interface for receiving assistance information, calibration information, and/or other data. Suitable wired communication interfaces include but are not limited to a Local Area Network (LAN) interface. Suitable wireless communication interfaces include but are not limited to: a wireless LAN (WLAN) interface; and a cellular data communications interface.

When the wireless communication device is a UE, this UE may make phase measurements and produce phase information according to an embodiment of the first aspect, and may make calibration measurements and produce calibration information according to an embodiment of the second aspect. It may obtain assistance information to assist it in intercepting signals and making measurements. It may report the phase of an uplink signal that it transmits or a downlink signal that it receives (or a phase-difference between them), according to an embodiment of the fifth aspect. And it may receive instructions and transmit its uplink signal with an instructed predetermined phase, according to an embodiment of the sixth aspect.

The embodiments described above have referred to LTE networks and LTE signals. However, other embodiments may use signals from other types of mobile communication networks, or signals from terrestrial transmitters other than cellular base stations. In general, any kind of signal from any transmitter can be exploited, provided that its timing and phase is relatively stable and provided that some information is available about the source and content of the signal.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The invention claimed is:

1. A method for assisting a calculation of at least one of a position or a time, based on wireless signals received by a receiver from a first and a second transmitter, the position comprising a position of at least one of the receiver, the first transmitter, or the second transmitter; and the time comprising a time at at least one of the receiver, the first transmitter, or the second transmitter, the method comprising:
   receiving at the receiver a first wireless signal transmitted at a first frequency by the first transmitter;
   receiving at the receiver a second wireless signal transmitted at a second frequency by the second transmitter, the second transmitter being at a different location from the first transmitter and the second frequency being different from the first frequency;
   obtaining phase information, the phase information comprising at least one of first phase information or second phase information, and obtaining the phase information comprising at least one of:
      measuring at the receiver a first phase of the first wireless signal and a second phase of the second wireless signal, the first phase information comprising the first phase and the second phase; or
      determining, at the receiver, a phase comparison between the first phase and the second phase, the second phase information comprising the phase comparison; and
   using the phase information and at least one associated measurement reference time to assist in the calculation of the at least one of the position or the time.

2. The method of claim 1, wherein using the phase information and the associated measurement reference time to assist in the calculation of the at least one the position or the time comprises using a first equation that defines a locus in position and time.

3. The method of claim 1, wherein the first frequency differs from the second frequency by at least 10 MHz.

4. The method of claim 1, further comprising:
   obtaining Doppler information by determining, at the receiver, a rate of change of a phase difference between the first phase and the second phase, the Doppler information comprising the rate of change of the phase difference; and
   using the Doppler information to assist in the calculation of at least one of a velocity or a timing drift, the velocity comprising a velocity of at least one of the receiver, the first transmitter, or the second transmitter; and the timing drift comprising a drift in a timing at at least one of the receiver, the first transmitter, or the second transmitter.

5. The method of claim 1, wherein using the phase information to assist in the calculation of the at least one of the position or the time comprises:
   obtaining and employing calibration information, the calibration information comprising at least one of:
      a phase of the first wireless signal and a phase of the second wireless signal at associated calibration reference times; or
      a phase offset between the first wireless signal and the second wireless signal at an associated calibration reference time.

6. The method of claim 5, wherein the calibration information comprises information obtained from a database.

7. The method of claim 1, further comprising:
   measuring a first time of arrival of the first wireless signal;
   measuring a second time of arrival of the second wireless signal; and using the first and second times of arrival to calculate the at least one of the position or the time.

8. An electronic device operable to assist in a calculation of at least one of a position or a time, the electronic device comprising:
  a receiver configured to:
    receive a first wireless signal transmitted at a first frequency by a first transmitter; and
    receive a second wireless signal transmitted at a second frequency by a second transmitter, the second transmitter being at a different location from the first transmitter and the second frequency being different from the first frequency; and
  a processor configured to:
    obtain phase information, the phase information comprising at least one of first phase information or second phase information, and the processor obtaining the phase information by at least one of:
      measuring at the receiver a first phase of the first wireless signal and a second phase of the second wireless signal, the first phase information comprising the first phase and the second phase; or
      determining, at the receiver, a phase comparison between the first phase and the second phase, the second phase information comprising the phase comparison; and
    use the phase information and at least one associated measurement reference time to assist in the calculation of the at least one of the position or the time;
  wherein:
    the position comprises a position of at least one of the receiver, the first transmitter, or the second transmitter; and
    the time comprises a time at at least one of the receiver, the first transmitter, or the second transmitter.

9. The electronic device of claim 8, wherein the processor is further configured to:
  obtain calibration information; and
  employ the calibration information when using the phase comparison to assist in the calculation of the at least one of the position or the time;
  wherein:
    the processor is configured to obtain the calibration information from a database; and
    the calibration information comprises at least one of:
      a phase of the first wireless signal and a phase of the second wireless signal at associated calibration reference times; or
      a phase offset between the first wireless signal and the second wireless signal at an associated calibration reference time.

10. User equipment for use in a wireless infrastructure network, the UE comprising:
  a transmitter configured to transmit an uplink signal to a base station (BS) serving the UE in the wireless infrastructure network;
  a receiver configured to receive a downlink signal from the BS; and
  a processor configured to:
  receive a request for transmitting the uplink signal; and
  control the transmitter to transmit the uplink signal in response to the request;
  wherein:
    the request includes a predetermined phase and a predefined time; and
    the transmitter is configured to transmit the uplink signal to the BS with the predetermined phase at the predefined time.

* * * * *